US012701578B2

(12) United States Patent
Yeo et al.

(10) Patent No.: US 12,701,578 B2
(45) Date of Patent: Aug. 4, 2026

(54) METHOD AND DEVICE FOR ESTIMATING TIME AND FREQUENCY OFFSETS IN COMMUNICATION SYSTEM

(71) Applicant: Samsung Electronics Co., Ltd., Suwon-si (KR)

(72) Inventors: Jeongho Yeo, Suwon-si (KR); Jinkyu Kang, Suwon-si (KR); Younsun Kim, Suwon-si (KR); Hyunseok Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 577 days.

(21) Appl. No.: 17/998,923

(22) PCT Filed: May 14, 2021

(86) PCT No.: PCT/KR2021/006097
§ 371 (c)(1),
(2) Date: Nov. 15, 2022

(87) PCT Pub. No.: WO2021/230718
PCT Pub. Date: Nov. 18, 2021

(65) Prior Publication Data
US 2023/0319891 A1    Oct. 5, 2023

(30) Foreign Application Priority Data

May 15, 2020    (KR) ........................ 10-2020-0058649

(51) Int. Cl.
*H04W 72/23*        (2023.01)
*H04B 7/01*        (2006.01)
(Continued)

(52) U.S. Cl.
CPC .............. *H04W 72/23* (2023.01); *H04B 7/01* (2013.01); *H04W 74/0833* (2013.01); *H04W 84/06* (2013.01)

(58) Field of Classification Search
CPC . H04W 74/0833; H04W 72/23; H04W 84/06; H04W 56/0045; H04W 56/0035;
(Continued)

(56) References Cited

U.S. PATENT DOCUMENTS

2012/0287874 A1*  11/2012  Oketani .............. H04L 27/0014
                                                370/329
2015/0131426 A1    5/2015  Wan
(Continued)

FOREIGN PATENT DOCUMENTS

CN        111083080 A      4/2020
KR    10-2012-0085891 A      8/2012
(Continued)

OTHER PUBLICATIONS

Supplementary European Search Report dated Oct. 5, 2023, in connection with European Application No. 21804486.5, 13 pages.
(Continued)

*Primary Examiner* — Kwang B Yao
*Assistant Examiner* — Patrick Yipao Pei

(57)        ABSTRACT

The present disclosure relates to: a communication technique merging IoT technology with a 5G communication system for supporting a data transmission rate higher than that of a 4G system; and a system therefor. The present disclosure can be applied to intelligent services (for example, smart homes, smart buildings, smart cities, smart cars or connected cars, healthcare, digital education, retail, security- and safety-related services, and the like), emergency communication services (emergency rescue signal transmission services), and the like on the basis of 5G
(Continued)

- Doppler shift within a beam footprint $$\Delta\beta = \frac{d}{R} \text{ (rad)} \qquad \gamma = \frac{R+h}{R}$$

UE 1's Doppler shift $= f_c \frac{v}{c} \cos\alpha = f_c \frac{v}{c} \frac{\sin\beta}{\sqrt{1+\gamma^2 - 2\gamma\cos\beta}}$ UE 2's Doppler shift $= f_c \frac{v}{c} \cos\alpha' = f_c \frac{v}{c} \frac{\sin(\beta+\Delta\beta)}{\sqrt{1+\gamma^2 - 2\gamma\cos(\beta+\Delta\beta)}}$ fc = 2 GHz
h = 700 km
d = 50 km (cell size)
UE speed = 0
Max ΔDoppler = 3.57 kHz communication technology, IoT-related technology and satellite communication. Proposed in the present disclosure is a method for performing a correlation operation on the basis of a reception signal and a PRACH preamble, and estimating a frequency offset on the basis of a first peak value and/or a second peak value in accordance with the correlation operation result.

20 Claims, 35 Drawing Sheets

(51) Int. Cl.
  *H04W 74/0833* (2024.01)
  *H04W 84/06* (2009.01)
(58) Field of Classification Search
  CPC ........... H04W 56/004; H04W 56/0055; H04W 72/231; H04W 72/232; H04W 74/002; H04B 7/01; H04B 7/18513; H04B 7/1855; H04L 27/2671; H04L 27/2675; H04L 27/2657
  See application file for complete search history.

(56) References Cited

U.S. PATENT DOCUMENTS

| | | | |
|---|---|---|---|
| 2016/0226696 A1* | 8/2016 | Zhang | H04L 27/2663 |
| 2017/0048093 A1 | 2/2017 | Huang et al. | |
| 2017/0373907 A1 | 12/2017 | Tan et al. | |
| 2021/0099329 A1* | 4/2021 | Hellfajer | H04L 27/2657 |
| 2021/0385877 A1* | 12/2021 | Matsuda | H04B 7/1851 |
| 2022/0408384 A1* | 12/2022 | Määttanen | H04W 74/0833 |

FOREIGN PATENT DOCUMENTS

| | | |
|---|---|---|
| KR | 10-2021-0133109 A | 11/2021 |
| WO | 2020/089471 A1 | 5/2020 |

OTHER PUBLICATIONS

International Search Report dated Aug. 24, 2021 in connection with International Patent Application No. PCT/KR2021/006097, 3 pages.
Written Opinion of the International Searching Authority dated Aug. 24, 2021 in connection with International Patent Application No. PCT/KR2021/006097, 5 pages.

* cited by examiner

FIG.7

| Orbit type | Height | Period |
|---|---|---|
| LEO | 00~1000 km | 90~120 min |
| MEO | 5000~15000 km | Approx 6 hours |
| GEO | Approx 36,000km | Approx 24 hours |

- Case: LEO 1200, uplink

| | |
|---|---|
| Freq [GHz] | 2 |
| bandwidth [MHz] | 0.36 |
| SNR [dB] | -2.63 |
| SIR [dB] | 2.0 |
| SINR [dB] | -3.92 |
| MCS index | 2 |
| required repetition | 0 |
| TBS [bits] | 56 |
| TTI [ms] | 0.5 |
| approx. throughput | 112 kbps |

Noise figure: 5dB

Achievable SNR
-2.63 dB

Thermal Noise = -119.1 dBm

Rx antenna gain
30 dBi

- Free space path loss: 164.5 dB
- Atmospheric path loss: 0.1 dB
- Shadowing margin: 3 dB
- Scintillation loss: 2.2 dB
- Additional loss: 0 dB Path loss
169.8 dB EIRP: 23 dBm

LEO 1,200 km

- Case: GEO, uplink

| | |
|---|---|
| Freq [GHz] | 2 |
| bandwidth [MHz] | 0.36 |
| SNR [dB] | -10.8 |
| SIR [dB] | 2.0 |
| SINR [dB] | -11 |
| gap to MCS 0 [dB] | 4.8 |
| required repetition | 3.0 |
| TBS [bits] | 32 |
| TTI [ms] | 1.5 |
| approx. throughput | 21 kbps |

- Link budget between UE and satellite

- Path loss~1600

$FSPL(d, f_c) = 32.45 + 20\log_{10}(f_c) + 20\log_{10}(d)$

- RX antenna gain for UL:24 dBi(LEO), 45.5 dBi (GEO)

- Link budget between UE and terrestrial gNB

- Path loss (LOS)~1610

$PL_2 = 28.0 + 40\log_{10}(d_{3D}) + 20\log_{10}(f_c) - 9\log_{10}((d'_{BP})^2 + (h_{BS} - h_{UT})^2)$

- Path loss(NLOS)~1620

$PL'_{UMa-NLOS} = 13.54 + 39.08 \log_{10}(d_{3D}) + 20 \log_{10}(f_c) - 0.6(h_{UT} - 1.5)$

- RX antenna gain for UL:~12 dBi $$\text{Doppler shift} = f_c \frac{v}{c} \cos \alpha$$

$$f_c \frac{v}{c} \cos \alpha = f_c \frac{v}{c} \frac{\sin \beta}{\sqrt{1+\gamma^2 - 2\gamma \cos \beta}}, \quad \gamma = \frac{R+h}{R}$$

fc = 2 GHz
UE speed = 0

| Satellite Orbit | Link | Frequency [GHz] | Bandwidth [MHz] | TX: EIRP [dBm] | RX: G/T [dB/T] | Free space path loss [dB] | Additional loss [dB] | SNR [dB] | SIR [dB] | SINR [dB] | Data rate |
|---|---|---|---|---|---|---|---|---|---|---|---|
| LEO 780km | DL | 1.6 | 10 | 84.78 | -31.62 | 159.22 | 5.3 | 17.24 | 1 | 0.90 | 7.4 Mbps |
| | UL | 1.6 | 0.36 | 23.00 | 1.10 | 159.22 | 5.3 | 2.62 | 2 | -0.71 | 228.4 kbps |
| LEO 1,200km | DL | 1.6 | 10 | 84.78 | -31.62 | 162.55 | 5.3 | 13.91 | 1 | 0.78 | 7.2 Mbps |
| | UL | 1.6 | 0.36 | 23.00 | 1.10 | 162.55 | 5.3 | -0.71 | 2 | -2.58 | 156.7 kbps |
| LEO 2,000km | DL | 1.6 | 10 | 84.78 | -31.62 | 166.39 | 5.3 | 10.07 | 1 | 0.49 | 6.9 Mbps |
| | UL | 1.6 | 0.36 | 23.00 | 1.10 | 166.39 | 5.3 | -4.55 | 2 | -5.42 | 79.2 kbps |

| Terrestrial network | ~100 km | RTT = ~0.67 ms |
| Satellite network | Low earth orbit satellite: ~2,000 km | |

| Satellite altitude 700 km | | | | | |
| --- | --- | --- | --- | --- | --- |
| Elevation angle θ | 0° | 45° | 90° | 135° | 180° |
| UE-satellite distance, d | 3069 km | 945 km | 700 km | 945 km | 3069 km |
| UE-base station Radio RTT | 40.9 ms | 12.6 ms | 9.3 ms | 12.6 ms | 40.9 ms |

· Assume that UE-satellite distance is equal to satellite-base station distance
· UE-base station round-trip delay=2×UE-satellite round-trip delay

| Terrestrial network | Cell radius | |
|---|---|---|
| Maximum RTT difference | 10 km | 0.067 ms |
| | 50 km | 0.33 ms |
| | 100 km | 0.67 ms |

| Satellite altitude 700 km | | Elevation angle | |
|---|---|---|---|
| Satellite network | Beam diameter | 0° | 90° |
| Maximum RTT difference | 500 km | 0.003 ms | 0.33 ms |
| | 100 km | 0.013 ms | 0.67 ms |
| | 1000 km | 1.17 | 6.67 ms |

| Satellite altitude 700 km | | | | | | |
|---|---|---|---|---|---|---|
| Time (sec) | 0 | 200 | 400 | 600 | 800 |
| Elevation angle θ | 0° | 16.9° | 76.1° | 156.4° | 177.0° |
| UE-base station Radio RTT | 40.9 ms | 23.1 ms | 9.6 ms | 19.2 ms | 36.8 ms |

Movement of satellite according to trajectory
(846sec, based on 700km satellite)

Horizon

METHOD AND DEVICE FOR ESTIMATING TIME AND FREQUENCY OFFSETS IN COMMUNICATION SYSTEM

CROSS-REFERENCE TO RELATED APPLICATIONS

This application is a 371 of International Application No. PCT/KR2021/006097 filed on May 14, 2021, which claims priority to Korean Patent Application No. 10-2020-0058649 filed on May 15, 2020, the disclosures of which are herein incorporated by reference in their entirety.

BACKGROUND

1. Field

The disclosure relates to a communication system. In particular, when a UE transmits/receives signals with a base station through a satellite, the time and frequency may be varied, so that correction of the time and frequency offset may be required. To correct the time and frequency offset, a process of estimating the time and frequency offset values is required first. To that end, there may be provided a method for estimating time and frequency offset information by a base station or UE.

2. Description of Related Art

In order to meet the demand for wireless data traffic soring since the 4G communication system came to the market, there are ongoing efforts to develop enhanced 5G communication systems or pre-5G communication systems. For the reasons, the 5G communication system or pre-5G communication system is called the beyond 4G network communication system or post LTE system. For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna. Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation. There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet is evolving from the human-centered connection network by which humans create and consume information to the Internet of Things (IoT) network by which information is communicated and processed between things or other distributed components. Another arising technology is the Internet of Everything (IoE), which is a combination of the Big data processing technology and the IoT technology through, e.g., a connection with a cloud server. To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC). In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, healthcare, or smart appliance industry, or state-of-art medical services, through conversion or integration of existing information technology (IT) techniques and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network (RAN) as a Big data processing technique may be said to be an example of the convergence of the 5G and IoT technologies.

Meanwhile, as the cost of launching satellites drastically went down in the late 2010s and 2020s, more and more companies have attempted to provide communication services through satellites. Accordingly, the satellite network has emerged as a next-generation network system that complements the existing terrestrial network. This provides the advantage of being able to provide communication services in area where terrestrial network is difficult to establish or in disastrous situations although not able to provide a user experience equivalent to that of the terrestrial network and, as mentioned above, secures economic feasibility thanks to a sharp reduction in satellite launching costs. Further, several companies and 3GPP standards organizations are proceeding with direct communication between smartphones and satellites.

When the UE attempts to connect with the base station through the satellite, a large delay occurs in the arrival of radio waves due to the long distance, which reaches hundreds of km, thousands of km or more, between the UE and the satellite and between the satellite and the base station on the ground. This large delay is much larger than in the situation in which the UE and the base station communicate directly over the terrestrial network. Further, this delay changes over time because the satellite is constantly moving. All UEs have different delays with satellites or base stations. Further, as the satellite moves, the frequency of the transmission/reception signal may shift, which may be attributed to the Doppler shift due to the movement of the satellite.

The disclosure relates to a communication system and, in particular, provides a method and device for estimating the delay time and frequency offset value which vary over time, due to the movement of the satellite and the far distance to the satellite when the UE transmits/receives signals with the base station through the satellite.

SUMMARY

According to an embodiment of the disclosure, a method for estimating a frequency offset by a device in a wireless communication system comprises receiving a first signal, receiving a physical random access channel (PRACH) preamble from a user equipment (UE), obtaining correlation values by performing a correlation operation based on the first signal and the PRACH preamble and identifying a first peak value which is the largest among the correlation values and a second peak value which is the second largest among the correlation values, and estimating a frequency offset based on at least one of the first peak value and the second peak value.

According to an embodiment, the method may further comprise transmitting a second signal obtained by correcting a frequency by the frequency offset to the UE during communication with the UE through a satellite.

According to an embodiment, the first peak value may be a value with the largest absolute value among the correlation values, and the second peak value may be a value with the second largest absolute value among the correlation values.

According to an embodiment, the frequency offset may be calculated based on at least one of the first peak value and the second peak value and the length of the PRACH preamble.

According to an embodiment, the method may further comprise transmitting at least one of the frequency offset, a unit of the frequency offset, and a change rate of the frequency offset to the UE through medium access control control element (MAC CE) or radio resource control (RRC) signaling.

According to an embodiment, the method may further comprise transmitting, to the UE, downlink control information (DCI) including at least one of the frequency offset, a unit of the frequency offset, and a change rate of the frequency offset.

According to an embodiment, the method may further comprise transmitting, to the UE, a random access response (RAR) message or msg B including at least one of the frequency offset, a unit of the frequency offset, and a change rate of the frequency offset.

According to an embodiment of the disclosure, a method for receiving a frequency offset by a user equipment (UE) in a wireless communication system comprises transmitting a physical random access channel (PRACH) preamble to a device and receiving, from the device, information about a frequency offset estimated based on at least one of a first peak value and a second peak value obtained through a correlation operation on the PRACH preamble. According to an embodiment, the first peak value may be the largest value among the correlation values obtained through the correlation operation, and the second peak value may be the second largest value among the correlation values obtained through the correlation operation.

According to an embodiment, the method may further comprise transmitting, to the device, a signal obtained by correcting a frequency by the frequency offset based on the information about the frequency offset during communication with the device through a satellite.

According to an embodiment, the first peak value may be a value with the largest absolute value among the correlation values, and the second peak value may be a value with the second largest absolute value among the correlation values. According to an embodiment, the frequency offset may be calculated based on at least one of the first peak value and the second peak value and the length of the PRACH preamble.

According to an embodiment, the information about the frequency offset may include at least one of the frequency offset, a unit of the frequency offset, and a change rate of the frequency offset and be received through medium access control control element (MAC CE) or radio resource control (RRC) signaling.

According to an embodiment, the information about the frequency offset may include at least one of the frequency offset, a unit of the frequency offset, and a change rate of the frequency offset and be received through downlink control information (DCI).

According to an embodiment, the information about the frequency offset may include at least one of the frequency offset, a unit of the frequency offset, and a change rate of the frequency offset and be received through a random access response (RAR) message or msg B According to an embodiment of the disclosure, a device configured to estimate a frequency offset in a wireless communication system comprises a transceiver and a controller connected with the transceiver and controlling the transceiver. The controller may control to receive a first signal, control to receive a physical random access channel (PRACH) preamble from the user equipment (UE), obtain correlation values by performing a correlation operation based on the first signal and the PRACH preamble, identify a first peak value which is the largest among the correlation values and a second peak value which is the second largest among the correlation values, and estimate the frequency offset based on at least one of the first peak value and the second peak value.

According to an embodiment of the disclosure, a user equipment (UE) configured to receive a frequency offset in a wireless communication system comprises a transceiver and a controller connected with the transceiver and controlling the transceiver. The controller may control to transmit a physical random access channel (PRACH) preamble to the device and may control to receive, from the device, information about the frequency offset estimated based on at least one of a first peak value and a second peak value obtained through a correlation operation on the PRACH preamble. According to an embodiment, the first peak value may be the largest value among the correlation values obtained through the correlation operation, and the second peak value may be the second largest value among the correlation values obtained through the correlation operation.

As described above, according to the disclosure, the UE may access the base station through the satellite, the base station may estimate the time and frequency offsets based on the signal transmitted from the UE and previously correct the estimated offset values or instruct the UE to correct the offsets, and signals may be exchanged between the base station and the UE.

BRIEF DESCRIPTION OF THE DRAWINGS

FIG. 7 is a view illustrating a symbol in which an SS/PBCH block may be transmitted according to a subcarrier spacing;

DETAILED DESCRIPTION

Figure 1:
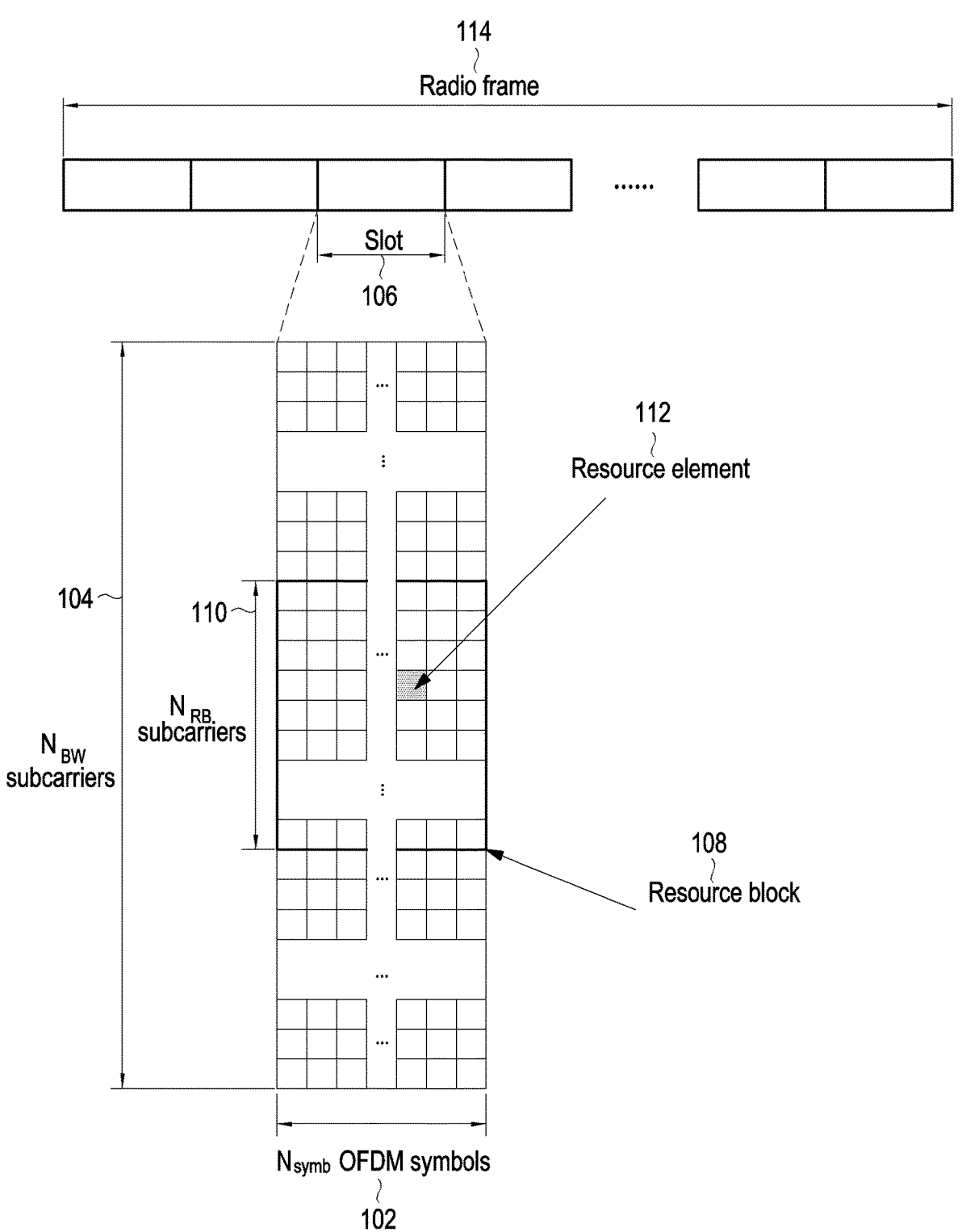
FIG. 1 is a view illustrating a basic structure of time-frequency domain which is radio resource domain where the data or control channel is transmitted on downlink or uplink in the NR system.

New radio (NR) access technology, a new 5G communication technology, is designed to be able to freely multiplex various services in time and frequency resources and, accordingly, waveforms/numerology and reference signals may be allocated dynamically or freely as necessary in services. To provide an optimal service to a UE in wireless communication, it is critical to provide data transmission optimized via measurement of interference and the quality of channel, and thus, accurate measurement of the channel state is essential. However, unlike 4G communication in which no significant change occurs in channel and interference characteristics depending on frequency resources, 5G channels experience drastic changes in channel and interference characteristics depending on services and thus need support of a subset in light of frequency resource group (FRG) that allows them to be divided and measured.

Meanwhile, types of services supported in the NR system may be divided into categories, such as enhanced mobile broadband (eMBB), massive machine type communications (mMTC), and ultra-reliable and low-latency communications (URLLC). eMBB, mMTC, and URLLC are services targeting high-rate transmission of high-volume data, minimized UE power consumption and access by multiple UEs, and high reliability and low latency, respectively. Different requirements may be applied depending on types of services applied to the UE.

As such, a plurality of services may be provided to users in the communication system and, to that end, there are required a method for providing the services in the same time interval according to characteristics and a device using the method.

Hereinafter, embodiments of the present invention are described in detail with reference to the accompanying drawings.

In describing embodiments, the description of technologies that are known in the art and are not directly related to the present invention is omitted. This is for further clarifying the gist of the present disclosure without making it unclear.

For the same reasons, some elements may be exaggerated or schematically shown. The size of each element does not necessarily reflects the real size of the element. The same reference numeral is used to refer to the same element throughout the drawings.

Advantages and features of the present disclosure, and methods for achieving the same may be understood through the embodiments to be described below taken in conjunction with the accompanying drawings. However, the present invention is not limited to the embodiments disclosed herein, and various changes may be made thereto. The embodiments disclosed herein are provided only to inform one of ordinary skilled in the art of the category of the present invention. The present invention is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card. According to embodiments of the disclosure, a " . . . unit" may include one or more processors.

Wireless communication systems evolve beyond voice-centered services to broadband wireless communication systems to provide high data rate and high-quality packet data services, such as 3rd generation partnership project (3GPP) high speed packet access (HSPA), long term evolution (LTE) or evolved universal terrestrial radio access (E-UTRA)), LTE-advanced (LTE-A), 3GPP2 high rate packet data (HRPD), ultra-mobile broadband (UMB), and institute of electrical and electronics engineers (IEEE) 802.16e communication standards. Further, for fifth generation (5G) wireless communication systems, 5G or new radio (NR) communication is being standardized.

As a representative broadband wireless communication system, the NR system adopts orthogonal frequency division multiplexing (OFDM) for downlink (DL) and uplink (UL). More specifically, the NR system employs cyclic-prefix OFDM (CP-OFDM) for downlink and two schemes, i.e., CP-OFDM and discrete Fourier transform spreading OFDM (DFT-S-OFDM) for uplink. Uplink means a wireless link where the user equipment (UE) (or mobile station (IVIS) transmits data or control signals to the base station (BS, or eNode B), and download means a wireless link where the base station transmits data or control signals to the UE. Such multiple access scheme allocates and operates time-frequency resources carrying data or control information per user not to overlap, i.e., to maintain orthogonality, to thereby differentiate each user's data or control information.

The NR system adopts hybrid automatic repeat request (HARQ) scheme that re-transmits corresponding data through the physical layer in case decoding fails at the initial stage of transmission. By the HARQ scheme, if the receiver fails to precisely decode data, the receiver transmits information (negative acknowledgement (NACK)) indicating the decoding failure to the transmitter so that the transmitter may re-transmit the corresponding data through the physical layer. The receiver raises the data reception capability by combining the data re-transmitted by the transmitter with the data for which decoding has failed before. Further, in case the receiver precisely decode data, the receiver may transmit information (acknowledgment (ACK)) indicating decoding succeeds to the transmitter so that the transmitter may transmit new data.

FIG. 1 is a view illustrating a basic structure of time-frequency domain which is radio resource domain where the data or control channel is transmitted on downlink or uplink in the NR system.

In FIG. 1, the horizontal axis refers to the time domain, and the vertical axis refers to the frequency domain. The minimum transmission unit in the time domain is the OFDM symbol, and Nsymb (102) OFDM symbols together form one slot 106. The length of the subframe is defined as 1.0 ms, and the radio frame 114 is defined as 10 ms. In the frequency domain, the minimum transmission unit is subcarrier, and the bandwidth of the overall system transmission band consists of a total of NBW (104) subcarriers. One frame may be defined as 10 ms. One subframe may be defined as 1 ms, and thus, one frame may consist of a total of 10 subframes. One slot may be defined as 14 OFDM symbols (that is, the number $$\left(N_{symb}^{slot}\right)$$

of symbols per slot=14). One subframe may be composed of one or more slots, and the number of the slots included in one subframe may vary according to μ which is a value set for subcarrier spacing.

Figure 2A:
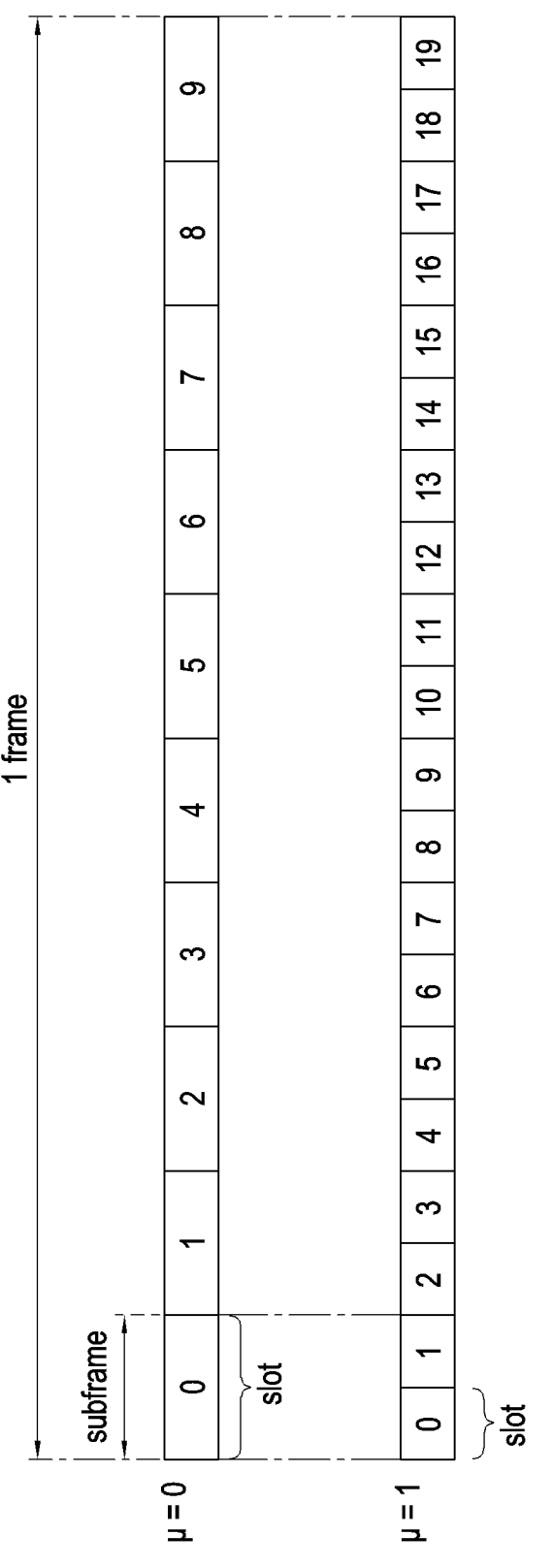
FIG. 2A is a view illustrating an example of a slot structure used in a 5G wireless communication system according to an embodiment of the disclosure.

FIG. 2A is a view illustrating an example of a slot structure used in a 5G wireless communication system according to an embodiment of the disclosure.

FIG. 2A illustrates an example in which the subcarrier spacing is set to μ=0 (204) and an example in which the subcarrier spacing is set to μ=1. When μ=0, one subframe may consist of one slot, and when μ=1, one subframe may consist of two slots. In other words, according to the set subcarrier spacing value μ, the number $$\left(N_{slot}^{subframe,\mu}\right)$$

of slots per subframe may vary, and accordingly, the number $$\left(N_{slot}^{frame,\mu}\right)$$

of slots per frame may differ. According to each subcarrier spacing μ, $$N_{slot}^{subframe,\mu}$$

and $$N_{slot}^{frame,\mu}$$

may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Before radio resource control (RRC) connected, the UE may be configured with an initial bandwidth part (BWP) for initial access by the base station via a master information block (MIB). More specifically, the UE may receive configuration information for a search space and control resource set (CORESET) in which physical downlink control channel (PDCCH) may be transmitted to receive system information (remaining system information, RMSI or system information block 1 which may correspond to SIB 1) necessary for initial access through the MIB in the initial access phase. Each of the control region and search space configured with the MIB may be regarded as identity (ID) 0. The base station may provide the UE with configuration information, such as frequency allocation information, time allocation information, and numerology for control region #0, via the MIB. Further, the base station may provide the UE with configuration information for occasion and monitoring period for control region #0, i.e., configuration information for search space #0, via the MIB. The UE may regard the frequency range set as control region #0 obtained from the MIB, as the initial BWP for initial access. In this case, the identity (ID) of the initial BWP may be regarded as 0.

The MIB may include contain the following information.

```
MIB
ASN1START
TAG-MIB-START
MIB ::=                          SEQUENCE {
    systemFrame Number           BIT STRING (SIZE (6)),
    subCarrierSpacingCommon      ENUMERATED {scs15or60, scs30or120},
    ssb-SubcarrierOffset         INTEGER (0 .. 15),
    dmrs-TypeA-Position          ENUMERATED {pos2, pos3},
    pdcch-ConfigSIB1             PDCCH-ConfigSIB1,
    cellBarred                   ENUMERATED {barred, notBarred} ,
    intraFreqReselection         ENUMERATED {allowed, notAllowed} ,
    spare                        BIT STRING (SIZE (1))
}
TAG-MIB-STOP
ASN1STOP
MIB field descriptions
    cellBarred
    Value barred means that the cell is barred, as defined in TS 38.304 [ 20] .
    dmrs-TypeA-Position
    Position of (first) DM-RS for downlink (see TS 38.211 [16], clause 7.4.1.1.2) and uplink (see TS
        38.211 [16], clause 6.4.1.1.3).
```

-continued intraFreqReselection
Controls cell selection/reselection to intra-frequency cells when the highest ranked cell is
　barred, or treated as barred by the UE, as specified in TS 38.304 [20].
pdcch-ConfigSiB1
Determines a common ControlResourceSet (CORESET), a common search space and necessary
PDCCH
　parameters. If the field ssb-Subcarrier Offset indicates that SIB1 is absent, the field pdcch-
　ConfigSIB1 indicates the frequency positions where the UE may find SS/PBCH block with SIB1 or
　the frequency range where the network does not provide SS/PBCH block with SIB1 (see TS 38.213
　[13], clause 13)
ssb-SubcarrierOffset
Corresponds to kSSB (see TS 38.213 [13]), which is the frequency domain offset between SSB and
　the overall resource block grid in number of subcarriers. (See TS 38.211 [16], clause
　7.4.3.1).
The value range of this field may be extended by an additional most significant bit encoded
　within PBCH as specified in TS 38.213 [13].
This field may indicate that this cell does not provide SIB1 and that there is hence no CORESET#0
　configured in MIB (see TS 38.213 [13], clause 13) . In this case, the field pdcch-ConfigSIB1
　may indicate the frequency positions where the UE may (not) find a SS/PBCH with a control
　resource set and search space for SIB1 (see TS 38.213 [ 13], clause 13).
subCarrierSpacingCommon
Subcarrier spacing for SIB1, Msg. 2/4 for initial access, paging and broadcast SI-messages. If the
　UE acquires this MIB on an FRI carrier frequency, the value scs15or60 corresponds to 15 kHz
　and the value scs30or120 corresponds to 30 kHz. If the UE acquires this MIB on an FR2 carrier
　frequency, the value scs15or60 corresponds to 60 kHz and the value scs30or120 corresponds to
　120 KHz .
systemFrameNumber
The 6 most significant bits (MSB) of the 10-bit System Frame Number (SEN), The 4 LSB of the SEN
　are conveyed in the PBCH transport block as part of channel coding (i.e. outside the MIB
　encoding), as defined in clause 7.1 in TS 38.212 [17] .

In a method for configuring a bandwidth part, UEs before RRC connected may receive configuration information for the initial BWP via MIB in the initial access phase. Specifically, the UE may be configured with a control region for a downlink control channel where downlink control information (DCI) for scheduling SIB may be transmitted from the MIB of the physical broadcast channel (PBCH). In this case, the bandwidth of the configured by the MIB may be regarded as the initial BWP, and the UE may receive the physical downlink shared channel (PDSCH), which transmits the SIB, via the configured initial BWP. The initial BWP may be utilized for other system information (OSI), paging, and random access as well as for receiving SIB.

If the UE is configured with one or more BWPs, the base station may indicate, to the UE, a change in BWP using the BWP indicator in the DCI.

The basic resource units in the time-frequency domains are the resource elements (REs) 112 (RE), and may be represented with the OFDM symbol index and the subcarrier index. The resource block (RB) 108 or physical resource block (PRB) is defined as Nsymb (102) contiguous OFDM symbols in the time domain. Generally, the minimum transmission unit of data is the RB. Generally in the NR system, Nsymb=14, NRB=12, and, NBW is proportional to the bandwidth of system transmission band. Data rate may increase in proportion to the number of RBs scheduled for the UE.

In the NR system, in the case of FDD system in which downlink and uplink are distinguished with frequencies, the downlink transmission bandwidth and the uplink transmission bandwidth may differ from each other. The channel bandwidth refers to an RF bandwidth corresponding to the system transmission bandwidth. Tables 2 and 3 show some system transmission bandwidths and the relationship between subcarrier spacing and channel bandwidth defined in NR system, for frequency bands lower than 6 GHz and frequency bands higher than 6 GHz, respectively. For example, in an NR system with a channel bandwidth of 100 MHz and a subcarrier spacing of 30 kHz, the transmission bandwidth is composed of 273 RBs. In the following, N/A may be a bandwidth-subcarrier combination not supported by the NR system.

TABLE 2

| | Configuration of frequency range 1 (FR1) | | | | | | | | | | | |
|---|---|---|---|---|---|---|---|---|---|---|---|---|
| | 5 | 10 | 15 | 20 | 25 | 30 | 40 | 50 | 60 | 80 | 190 | 100 |
| SCS | MHZ | MHz | MHz | MHz | MHz | MHZ | MHz | MHz | MHz | MHz | MHz | MHz |
| (kHz) | NRB | NRB | NRB | NRB | NRB | NRB | NRB | NRB | NRB | NRB | NRB | NRB |
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

TABLE 3

| Configuration of frequency range 2 (FR2) | | | | | |
|---|---|---|---|---|---|
| Channel bandwidth BWChannel [MHz] | Subcarrier spacing | 50 MHz | 100 MHz | 200 MHz | 400 MHz |
| Transmission bandwidth configuration NRB | 60 kHz | 66 | 132 | 264 | N/A |
| | 120 kHz | 32 | 66 | 132 | 264 |

In the NR system, the frequency range may be defined separately for FR1 and FR2 as in Table 4 below.

TABLE 4

| Frequency range designation | Corresponding frequency range |
|---|---|
| FR1 | 450 MHz-7125 MHz |
| FR2 | 24250 MHz-52600 MHz |

In the above, the ranges of FR1 and FR2 may be changed and applied. For example, the frequency range of FR1 may be changed from 450 MHz up to 6000 MHz.

Next, the synchronization signal (SS)/PBCH block in 5G is described.

The SS/PBCH block may mean a physical layer channel block composed of primary SS (PSS), secondary SS (SSS), and PBCH. Details are as follows.

PSS: A signal that serves as a reference for downlink time/frequency synchronization and provides part of the information for cell ID SSS: serves as a reference for downlink time/frequency synchronization, and provides the rest of the information for cell ID, which PSS does not provide. Additionally, it may serve as a reference signal for demodulation of PBCH.

PBCH: provides essential system information necessary for the UE to transmit and receive data channel and control channel. The essential system information may include search space-related control information indicating radio resource mapping information for a control channel and scheduling control information for a separate data channel for transmitting system information.

SS/PBCH block: The SS/PBCH block is composed of a combination of PSS, SSS, and PBCH. One or more SS/PBCH blocks may be transmitted within 5 ms, and each transmitted SS/PBCH block may be distinguished with an index.

The UE may detect the PSS and SSS in the initial access phase and may decode the PBCH. The UE may obtain the MIB from the PBCH and may be therefrom configured with control region #0 (which may correspond to a control region having a control region index of 0). The UE may perform monitoring on control region #0, assuming that the selected SS/PBCH block and the demodulation reference signal (DMRS) transmitted in control region #0 are quasi-co-located (QCLed).

The UE may receive system information as downlink control information transmitted in control region #0. The UE may obtain configuration information related to random access channel (RACH) required for initial access from the received system information. The UE may transmit the physical RACH (PRACH) to the base station considering the selected SS/PBCH index, and the base station receiving the PRACH may obtain information for the SS/PBCH block index selected by the UE. Through this process, the base station may know which block the UE has selected from the SS/PBCH blocks and monitors control region #0 related thereto.

Next, downlink control information (DCI) in the 5G system is described in detail.

Scheduling information for uplink data (or physical uplink shared channel (PUSCH) or downlink data (or physical downlink data channel (PDSCH) in the 5G system is transmitted from the base station through DCI to the UE. The UE may monitor the DCI format for fallback and the DCI format for non-fallback for PUSCH or PDSCH. The fallback DCI format may be composed of fixed fields predetermined between the base station and the UE, and the non-fallback DCI format may include configurable fields. The DCI may include other various formats and, it may be known whether the DCI is one for power control or one for slot format indicator (SFI) depending on the format.

DCI may be transmitted through the PDCCH, which is a physical downlink control channel, via channel coding and modulation. A cyclic redundancy check (CRC) is added to the DCI message payload, and the CRC is scrambled with the radio network temporary identifier (RNTI) that is the identity of the UE. Different RNTIs may be used for the purposes of the DCI message, e.g., UE-specific data transmission, power control command, or random access response. In other words, the RNTI is not explicitly transmitted, but the RNTI is included in the CRC calculation process and transmitted. Upon receiving the DCI message transmitted on the PDCCH, the UE identifies the CRC using the allocated RNTI, and when the CRC is correct, the UE may be aware that the message has been transmitted to the UE. The PDCCH is mapped and transmitted in a control resource set (CORESET) configured in the UE.

For example, DCI scheduling a PDSCH for system information (SI) may be scrambled to SI-RNTI. DCI scheduling a PDSCH for a random access response (RAR) message may be scrambled to RA-RNTI. DCI scheduling a PDSCH for a paging message may be scrambled with P-RNTI. DCI providing a slot format indicator (SFI) may be scrambled to SFI-RNTI. DCI providing transmit power control (TPC) may be scrambled to TPC-RNTI. The DCI for scheduling a UE-specific PDSCH or PUSCH may be scrambled with cell RNTI (C-RNTI).

DCI format 0_0 may be used as fallback DCI for scheduling PUSCH, and in this case, CRC may be scrambled to C-RNTI. DCI format 0_0 in which CRC is scrambled to C-RNTI may include, e.g., the following information.

TABLE 5

| |
|---|
| Identifier for DCI formats - [1] bit |
| Frequency domain resource assignment - |
| $\left[\left\lceil \log_2\left(N_{RB}^{UL,BWP}\left(N_{RB}^{UL,BWP}+1\right)/2\right)\right\rceil\right]$ bits |
| Time domain resource assignment - X bits |
| Frequency hopping flag - 1 bit. |
| Modulation and coding scheme - 5 bits |
| New data indicator - 1 bit |
| Redundancy version - 2 bits |
| HARQ process number - 4 bits |
| TPC(transmit power control) command for scheduled PUSCH - [2] bits |
| UL/SUL indicator (UL/supplementary UL indicator) - 0 or 1 bit |

DCI format 0_1 may be used as non-fallback DCI for scheduling PUSCH, and in this case, CRC may be scrambled to C-RNTI. DCI format 0_1 in which CRC is scrambled to C-RNTI may include, e.g., the following information.

TABLE 6

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
For resource allocation type 0, $\lceil N_{RB}^{UL,BWP} / P \rceil$ bits
For resource allocation type 1, $\lceil \log_2 (N_{RB}^{UL,BWP} (N_{RB}^{UL,BWP} + 1) / 2) \rceil$ bits
Time domain resource assignment - 1, 2, 3, or 4 bits
VRB-to-PRB mapping (VRB (virtual resource block)-to- PRB(physical resource block) mapping) - 0 or 1 bit, only for resource allocation type 1.
0 bit if only resource allocation type 0 is configured;
1 bit otherwise.
Frequency hopping flag - 0 or 1 bit, only for resource allocation type 1.
0 bit if only resource allocation type 0 is configured;
1 bit otherwise.
Modulation and coding scheme - 5 bits
New data indicator - 1 bit
Redundancy version - 2 bits
HARQ process number - 4 bits
1st downlink assignment index - 1 or 2 bits
1 bit for semi-static HARQ-ACK codebook(semi-static HARQ-ACK codebook case);
2 bits for dynamic HARQ-ACK codebook with single HARQ-ACK codebook(dynamic HARQ-ACK codebook with single HARQ-ACK codebook case).
2nd downlink assignment index - 0 or 2 bits
2 bits for dynamic HARQ-ACK codebook with two HARQ-ACK sub-codebooks(dynamic HARQ-ACK codebook with two HARQ-ACK sub-codebooks case);
0 bit otherwise.
TPC command for scheduled PUSCH - 2 bits SRS resource indicator $- \left\lceil \log_2 \left( \sum_{k=1}^{L_{max}} \binom{N_{SRS}}{k} \right) \right\rceil$ or $\lceil \log_2(N_{SRS}) \rceil$ bits $\left\lceil \log_2 \left( \sum_{k=1}^{L_{max}} \binom{N_{SRS}}{k} \right) \right\rceil$ bits for non−codebook based PUSCH transmission (non− codebook based PUSCH transmission case);
$\lceil \log_2 (N_{SRS}) \rceil$ bits for codebook based PUSCH transmission(codebook based PUSCH transmission case).
Precoding information and number of layers - up to 6 bits
Antenna ports - up to 5 bits
SRS request - 2 bits
CSI request - 0, 1, 2, 3, 4, 5, or 6 bits
CBG(code block group) transmission information - 0, 2, 4, 6, or 8 bits
PTRS-DMRS association - 0 or 2 bits.
beta_offset indicator - 0 or 2 bits
DMRS sequence initialization - 0 or 1 bit DCI format 1_0 may be used as fallback DCI for scheduling PDSCH, and in this case, CRC may be scrambled to C-RNTI. DCI format 1_0 in which CRC is scrambled to C-RNTI may include, e.g., the following information.

TABLE 7

Identifier for DCI formats - [1] bit

Frequency domain resource assignment -

$\left[ \lceil \log_2 (N_{RB}^{DL,BWP} (N_{RB}^{DL,BWP} + 1)/2) \rceil \right]$ bits Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits

TABLE 7-continued

TPC command for scheduled PUCCH - [2] bits
PUCCH(physical uplink control channel)
resource indicator - 3 bits
PDSCH-to-HARQ feedback timing indicator-
[3] bits DCI format 1_1 may be used as non-fallback DCI for scheduling PDSCH, and in this case, CRC may be scrambled to C-RNTI. DCI format 1_1 in which CRC is scrambled to C-RNTI may include, e.g., the following information.

TABLE 8

Carrier indicator - 0 or 3 bits
Identifier for DCI formats - [1] bits
Bandwidth part indicator - 0, 1 or 2 bits
Frequency domain resource assignment TABLE 8-continued For resource allocation type 0, $\lceil N_{RB}^{DL,BWP}/P \rceil$ bits For resource allocation type 1, $\lceil \log_2(N_{RB}^{DL,BWP}(N_{RB}^{DL,BWP}+1)/2) \rceil$ bits Time domain resource assignment - 1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator (physical resource block bundling size
indicator) - 0 or 1 bit
Rate matching indicator - 0, 1, or 2 bits
ZP CSI-RS trigger - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits
SRS request - 2 bits TABLE 8-continued CBG transmission information - 0, 2, 4, 6, or 8 bits
CBG flushing out information - 0 or 1 bit
DMRS sequence initialization - 1 bit Hereinafter, a method for allocating time domain resources for a data channel in a 5G communication system is described.

The base station may configure the UE with a table for time domain resource allocation information for a downlink data channel (PDSCH) and an uplink data channel (PUSCH) via higher layer signaling (e.g., RRC signaling). For PDSCH, a table including up to maxNrofDL-Allocations=16 entries may be configured and, for PUSCH, a table including up to maxNrofUL-Allocations=16 entries may be configured. The time domain resource allocation information may include, e.g., PDCCH-to-PDSCH slot timing (which is designated K0 and corresponds to the time interval between the time of reception of the PDCCH and the time of transmission of the PDSCH scheduled by the received PDCCH) or PDCCH-to-PUSCH slot timing (which is designated K2 and corresponds to the time interval between time of PDCCH and the time of transmission of the PUSCH scheduled by the received PDCCH), information for the position and length of the start symbol where the PDSCH or PUSCH is scheduled in the slot, and the mapping type of PDSCH or PUSCH. For example, information as illustrated in Tables 9 and 10 below may be provided from the base station to the UE.

TABLE 9

PDSCH-TimeDomainResourceAllocationList information element
PDSCH-TimeDomainResourceAllocationList ::= SEQUENCE (SIZE(1..maxNrofDL-
Allocations)) OF PDSCH-TimeDomainResourceAllocation
PDSCH-TimeDomainResourceAllocation := SEQUENCE {
  k0 INTEGER(0..32) OPTIONAL, -- Need
S
  (PDCCH-to-PDSCH Timing, slot unit)
    mapping Type ENUMERATED { typeA, typeB},
  (PDSCH Mapping type)
    startSymbolAndLength INTEGER (0..127)
    (Start symbol and length of PDSCH)
}

TABLE 10

PUSCH-TimeDomainResourceAllocation information element
PUSCH-TimeDomainResourceAllocationList ::= SEQUENCE (SIZE(1 .. maxNrofUL-
Allocations)) OF PUSCH-TimeDomainResourceAllocation
PUSCH-TimeDomainResourceAllocation := SEQUENCE {
  k2 INTEGER(0 .. 32) OPTIONAL, -- Need S
  (PDCCH-to-PUSCH Timing, slot unit)
  mapping Type ENUMERATED {typeA, typeB},
  (PUSCH Mapping type)
  startSymbolAndLength INTEGER (0..127)
  (Start symbol and length of PUSCH)
}

The base station may provide the UE with one of the entries in the table for the time domain resource allocation information via L1 signaling (e.g., DCI) (e.g., it may be indicated with the 'time domain resource allocation' field in the DCI). The UE may obtain time domain resource allocation information for the PDSCH or PUSCH based on the DCI received from the base station.

A downlink control channel in the 5G communication system is described below in greater detail with reference to the drawings.

Figure 2B:
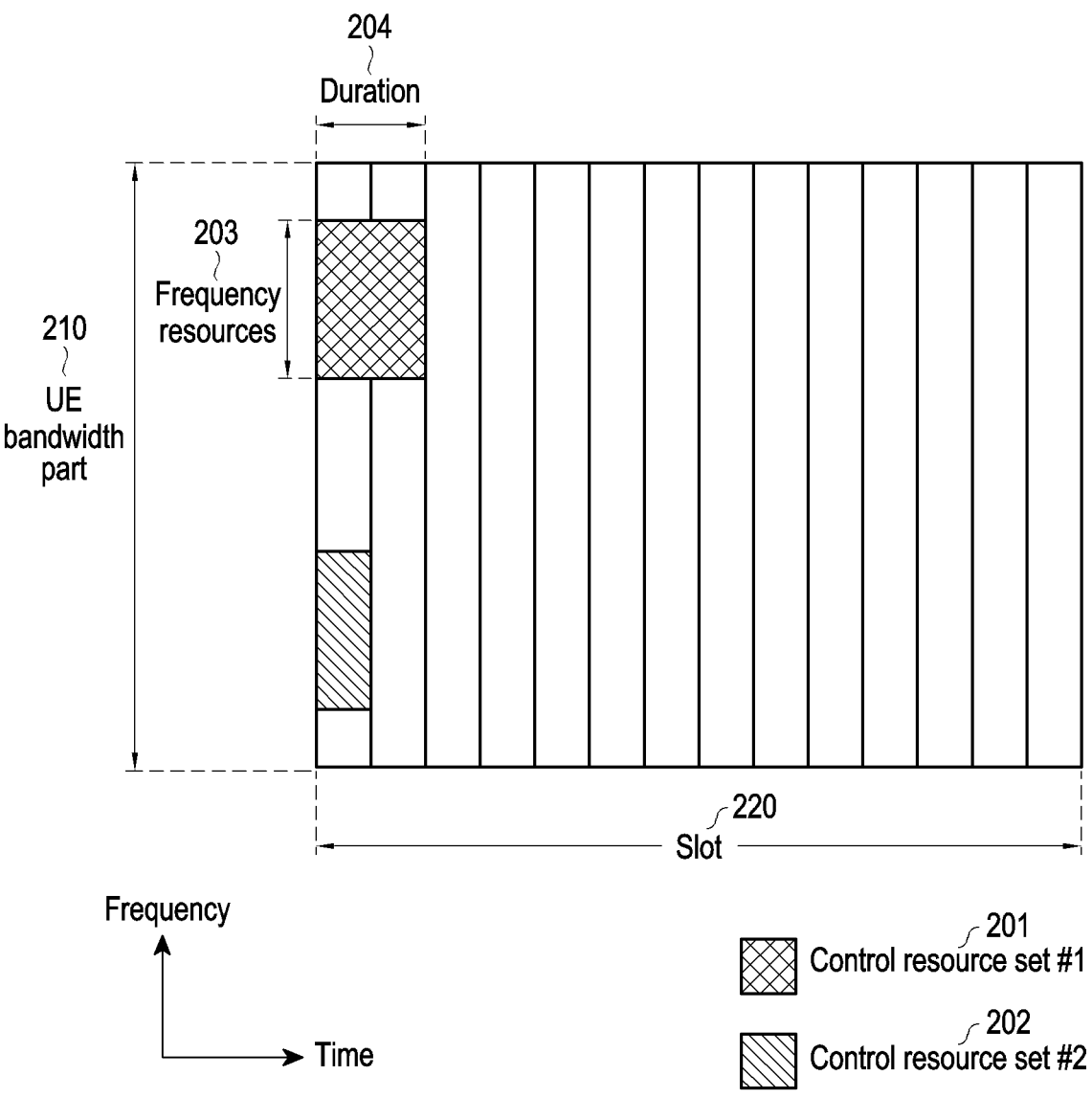
FIG. 2B is a view illustrating an example of a control resource set (CORESET)) where the download control channel is transmitted in a 5G wireless communication system according to an embodiment of the disclosure.

FIG. 2B is a view illustrating an example of a control resource set where the download control channel is transmitted in a 5G wireless communication system according to an embodiment of the disclosure.

Figure 5:
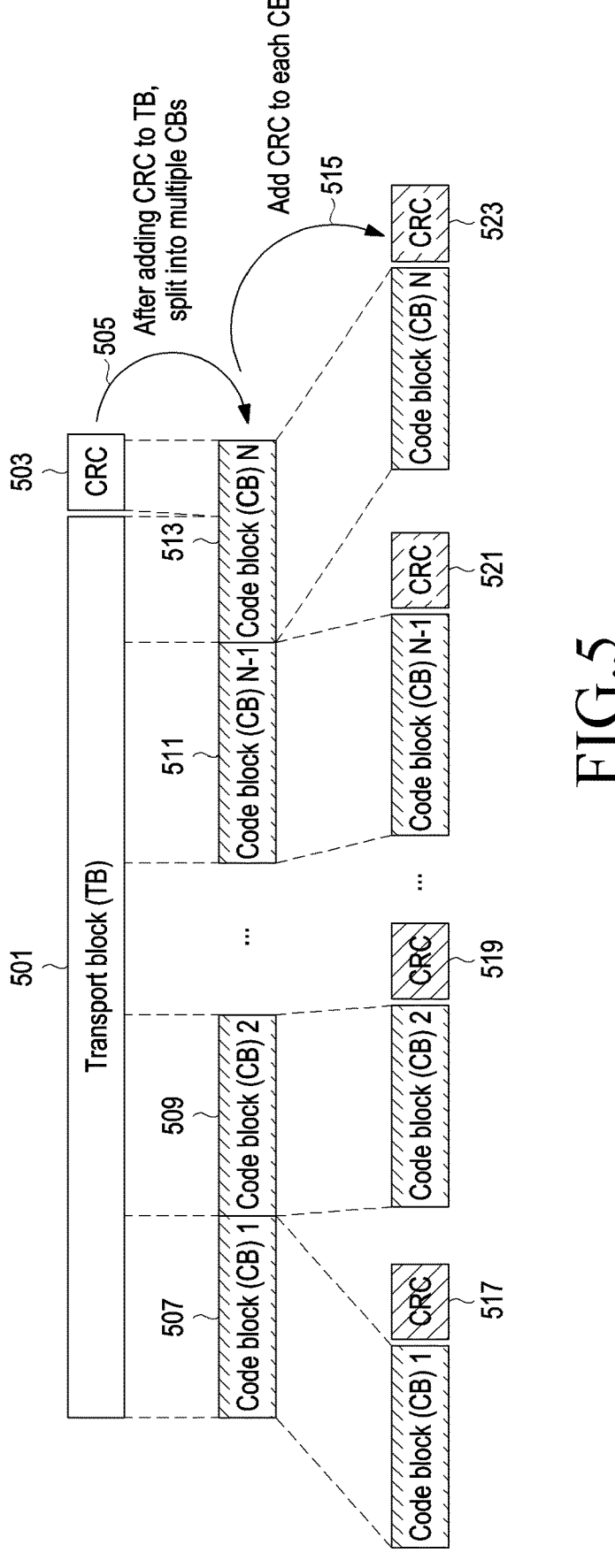
FIG. 5 is a view illustrating an example process in which one transport block is divided into several code blocks and a CRC is added.

FIG. 2 illustrates an example in which two control regions (control region #1 201 and control region #2 202) are configured in one slot 220 on the time axis, and a UE bandwidth part 210 is configured on the frequency axis. The control regions 201 and 202 may be configured to a particular frequency resource 203 in the overall system bandwidth part 210 on the frequency axis. One or more OFDM symbols may be configured on the time axis, which may be defined as control resource set duration 204. In the example of FIG. 5, control region #1 201 is configured as a control region length of two symbols, and control region #2 202 is configured as a control region length of one symbol.

The above-described 5G control region may be configured via higher layer signaling (e.g., system information, MIB, or RRC signaling) from the base station to the UE. Configuring a UE with a control region means providing the UE with such information as the identifier (ID) of the control region, the frequency position of the control region, and symbol length of the control region. For example, the higher layer signaling may include the information set forth in Table 11 below.

TABLE 11

```
ControlResourceSet ::= SEQUENCE {
    Corresponds to L1 parameter 'CORESET-ID'
    controlResourceSetId ControlResourceSetId,
    (Control region identity)
    frequency DomainResources BIT STRING (SIZE (45)),
    (Frequency axis resource allocation information)
    duration INTEGER (1 .. maxCoReSetDuration),
    (Time axis resource allocation information)
    cce-REG-MappingType CHOICE {
    (CCE-to-REG Mapping scheme)
        interleaved SEQUENCE {
        reg-BundleSize ENUMERATED {n2, n3, n6},
        (REG bundle size)
        precoderGranularity ENUMERATED {sameAsREG-bundle,
allContiguousRBs},
        interleaverSize ENUMERATED {n2, n3, n6}
        (Interleaver size)
        shiftIndex
    INTEGER(0 .. maxNrofPhysicalResourceBlocks-1)
    OPTIONAL
        (Interleaver shift)
    },
    nonInterleaved NULL
    },
    tci-StatesPDCCH SEQUENCE(SIZE (1 .. maxNrofTCI-
StatesPDCCH)) OF TCI-StateId OPTIONAL,
    (QCL Configuration information)
        tci-PresentInDCI ENUMERATED {enabled}
            OPTIONAL, -- Need S
```

In Table 11, tci-StatesPDCCH (simply referred to as transmission configuration indication (TCI) state) configuration information may include information for one or more SS/PBCH block indexes QCLed with the DMRS transmitted in a corresponding control region or channel state information reference signal (CSI-RS) index information.

For example, each piece of control information included in DCI format 1_1 that is scheduling control information (DL grant) for downlink data may be as follows.

Carrier indicator: indicates which carrier the data scheduled by DCI is transmitted on—0 or 3 bits Identifier for DCI formats: indicates the DCI format. Specifically, an indicator for identifying whether the corresponding DCI is for downlink or uplink.—[1] bits Bandwidth part indicator: indicates a change in bandwidth part, if any.—0, 1 or 2 bits Frequency domain resource assignment: Resource allocation information indicating frequency domain resource allocation. The resource expressed varies depending on whether the resource allocation type is 0 or 1.

Time domain resource assignment: Resource allocation information indicating time domain resource allocation. This may indicate one configuration of a predefined PDSCH time domain resource allocation list or higher layer signaling—1, 2, 3, or 4 bits VRB-to-PRB mapping: indicates a mapping relationship between the virtual resource block (VRB) and the physical resource block (PRB)—0 or 1 bit PRB bundling size indicator: indicates the size of physical resource block bundling assuming that the same precoding is applied—0 or 1 bit Rate matching indicator: indicates which rate match group is applied among the rate match groups configured via a higher layer applied to PDSCH—0, 1, or 2 bits ZP CSI-RS trigger: triggers the zero power channel state information reference signal—0, 1, or 2 bits Transport block (TB)-related configuration information: indicates modulation and coding scheme (MC S), new data indicator (NDI) and redundancy version (RV) for one or two TB s.

Modulation and coding scheme (MCS): indicates the coding rate and modulation scheme used for data transmission. In other words, this may indicate the coding rate value that may indicate TBS and channel coding information along with information for whether it is QPSK, 16QAM, 64QAM, or 256QAM.

New data indicator: indicates whether HARQ initial transmission or re-transmission.

Redundancy version: indicates the redundancy version of HARQ.

HARQ process number: indicates HARQ process number applied to PDSCH—4 bits

Downlink assignment index: An index for generating a dynamic HARQ-ACK codebook when reporting HARQ-ACK for PDSCH—0 or 2 or 4 bits TPC command for scheduled PUCCH: Power control information applied to PUCCH for HARQ-ACK report for PDSCH—2 bits PUCCH resource indicator: Information indicating the resource of PUCCH for HARQ-ACK report for PDSCH—3 bits PDSCH-to-HARQ feedback timing indicator: Configuration information for the slot in which PUCCH for HARQ-ACK report for PDSCH is transmitted—3 bits Antenna ports: Information indicating the antenna port of the PDSCH DMRS and the DMRS CDM group in which the PDSCH is not transmitted—4, 5 or 6 bits Transmission configuration indication: Information indicating beam-related information for PDSCH—0 or 3 bits SRS request: Information requesting SRS transmission—2 bits CBG transmission information: Information indicating which code block group (CBG) of data is transmitted through PDSCH when code block group-based retransmission is configured—0, 2, 4, 6, or 8 bits CBG flushing out information: Information indicating whether the code block group previously received by the UE may be used for HARQ combining—0 or 1 bit DMRS sequence initialization: indicates DMRS sequence initialization parameter—1 bit In the case of data transmission through PDSCH or PUSCH, time domain resource assignment may be transferred by information for a slot in which PDSCH/PUSCH is transmitted and the number L of symbols in which PDSCH/PUSCH is mapped with the start symbol position S in the slot. Here, S may be a relative position from the start of the slot, L may be the number of contiguous symbols, and S and L may be determined from a start and length indicator value (SLIV) defined as in Equation 1 below.

$$\text{if } (L-1) \le 7 \text{ then } SLIV = 14 \cdot (L-1) + S \qquad \text{[Equation 1]}$$
$$\text{else}$$
$$SLIV = 14 \cdot (14 - L + 1) + (14 - 1 - S)$$
$$\text{where } 0 < L \le 14 - S$$

In the NR system, the UE may be configured with information for the slot in which PDSCH/PUSCH is transmitted and PDSCH/PUSCH mapping type and SLIV value in one row via RRC configuration (e.g., the information may be configured in the form of a table). Thereafter, in the time domain resource allocation of the DCI, the base station may transfer, to the UE, the SLIV value, PDSCH/PUSCH mapping type, and information for the slot in which PDSCH/PUSCH is transmitted by indicating the index value in the configured table.

In the NR system, type A and type B are defined as PDSCH mapping types. In PDSCH mapping type A, the first symbol among DMRS symbols is located in the second or third OFDM symbol of the slot. In PDSCH mapping type B, the first symbol among DMRS symbols of the first OFDM symbol in the time domain resource allocated by PUSCH transmission is located.

Downlink data may be transmitted on PDSCH, which is a physical channel for downlink data transmission. PDSCH may be transmitted after the control channel transmission period, and the specific mapping position in the frequency domain, modulation scheme, or other scheduling information are determined based on the DCI transmitted through the PDCCH.

Through the MCS among the control information constituting the DCI, the base station notifies the UE of the modulation scheme that has applied to the PDSCH to be transmitted and the size of data to be transmitted (transport block size; TBS). In an embodiment, the MCS may be composed of 5 bits or more or fewer bits. The TB S corresponds to the size before applying channel coding for error correction to the data (transport block; TB) to be transmitted by the base station.

In the disclosure, a transport block (TB) may include a medium access control (MAC) header, a MAC control element, one or more MAC service data units (SDUs), and padding bits. Alternatively, TB may denote a unit of data delivered from the MAC layer to the physical layer or a MAC protocol data unit (PDU).

The NR system supports the following modulation schemes: quadrature phase shift keying (QPSK), 16 quadrature amplitude modulation (16QAM), 64QAM, and 256 QAM, and their respective modulation orders (Qm) are 2, 4, 6, and 8. In other words, QPSK, 16QAM, 64QAM, and 256QAM may transmit 2 bits per symbol, 4 bits per symbol, 6 bits per symbol, and 8 bits per symbol, respectively.

Figure 3:
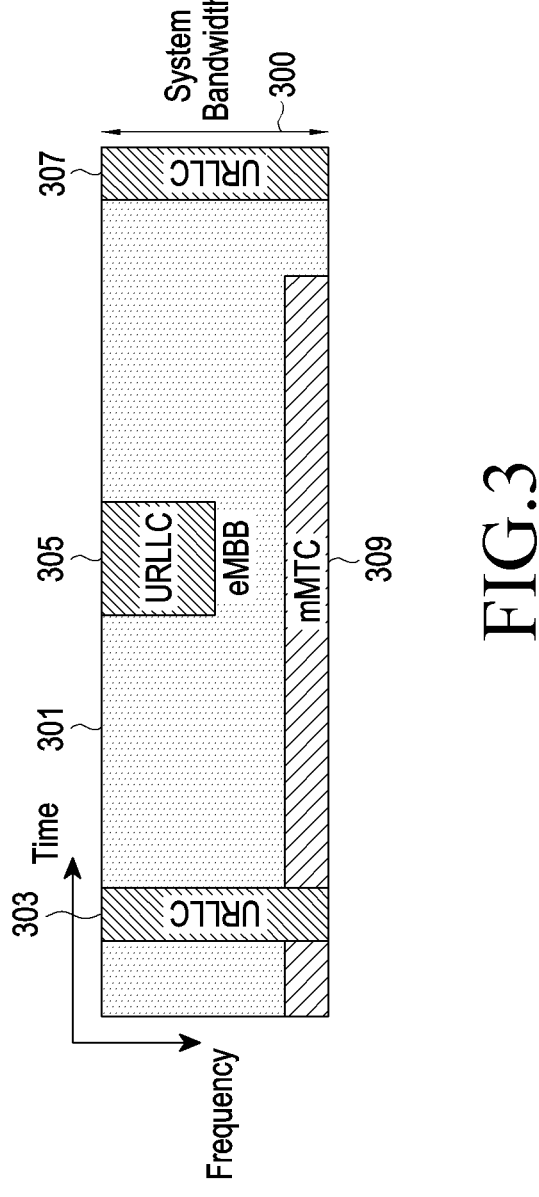
FIG. 3 is a view illustrating an example in which eMBB, URLLC, and mMTC data are allocated in the entire system frequency band.
Figure 4:
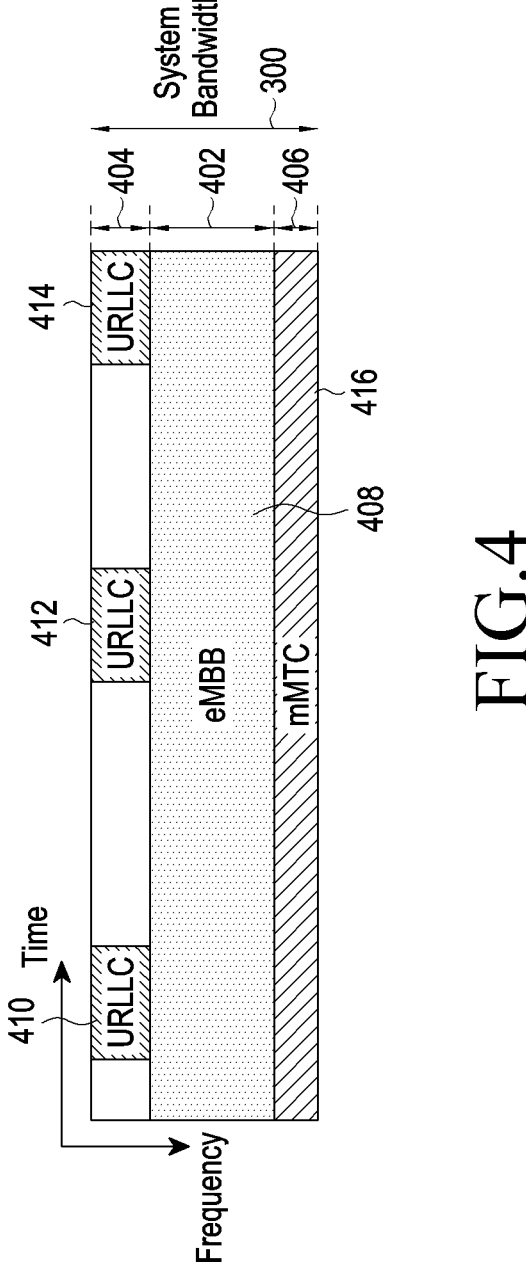
FIG. 4 is a view illustrating an example in which eMBB, URLLC, and mMTC data are allocated, with the system frequency band divided.

FIGS. 3 and 4 are views illustrating an example in which data of eMBB, URLLC, and mMTC data, which are services considered in 5G or NR systems, are allocated in frequency-time resources.

Referring to FIGS. 3 and 4, it may be identified how frequency and time resources are allocated for information transmission in each system.

FIG. 3 is a view illustrating an example in which eMBB, URLLC, and mMTC data are allocated in the entire system frequency band. FIG. 3 illustrates an example in which data for eMBB, URLLC, and mMTC are allocated in the entire system frequency band 300. If URLLC data 303, 305, and 307 needs to be generated and transmitted while eMBB 301 and mMTC 309 are allocated in a specific frequency band and transmitted, URLLC data 303, 305, and 307 may be transmitted with the portions, in which eMBB 301 and mMTC 309 have already been allocated, emptied or not transmitted. Among the above services, URLLC requires a decrease in latency time. Thus, URLLC data may be allocated (303, 305, and 307) in the portion of the resource 301, in which eMBB has been allocated. If URLLC is additionally allocated and transmitted in the eMBB-allocated resource, eMBB data may not be transmitted in the duplicate frequency-time resource, so that the transmission performance of eMBB data may be lowered. In other words, a failure to transmit eMBB data may occur due to the allocation of the URLLC.

FIG. 4 is a view illustrating an example in which eMBB, URLLC, and mMTC data are allocated, with the system frequency band divided. In FIG. 4, the entire system frequency band 400 may be divided into subbands 402, 404, and 406 which may be used for transmitting data and services. The information related to configuration of the subbands may be predetermined, and the information may be transmitted from the base station to the UE through higher level signaling. Alternatively, the system frequency band may be divided into the subbands by the base station or a network node in an arbitrary manner, so that services may be provided without transmitting separate subband configuration information to the UE. FIG. 4 illustrates an example in which subbands 402, 404, and 406 are used for transmission of eMBB data, URLLC data, and mMTC data, respectively.

To describe the methods and devices proposed in the embodiment, the terms "physical channel" and "signal" in the NR system may be used. However, the content of the disclosure may be applied to other wireless communication systems than the NR system.

Hereinafter, embodiments of the present invention are described in detail with reference to the accompanying drawings. When determined to make the subject matter of the present invention unclear, the detailed description of the known art or functions may be skipped. The terms as used herein are defined considering the functions in the present disclosure and may be replaced with other terms according to the intention or practice of the user or operator. Therefore, the terms should be defined based on the overall disclosure.

In the disclosure, downlink (DL) refers to a wireless transmission path of signal transmitted from the base station to the terminal, and uplink (UL) refers to a wireless transmission path of signal transmitted from the terminal to the base station.

Although NR system is described in connection with embodiments of the disclosure, as an example, embodiments of the disclosure may also apply to other communication systems with similar technical background or channel form. Further, embodiments of the present invention may be modified in such a range as not to significantly depart from the scope of the present invention under the determination by one of ordinary skill in the art and such modifications may be applicable to other communication systems.

In the disclosure, the terms "physical channel" and "signal" may be used interchangeably with "data" or "control signal." For example, PDSCH is a physical channel through which data is transmitted, but in the disclosure, PDSCH may be data.

As used herein, the term "higher layer signaling" may refer to a method for transmitting signals from the base station to the UE using a downlink data channel of the physical layer or from the UE to the base station using an uplink data channel of the physical layer and may be interchangeably used with "RRC signaling" or MAC control element (CE)."

FIG. 5 is a view illustrating an example process in which one transport block is divided into several code blocks and a CRC is added.

Referring to FIG. 5, a CRC 503 may be added to the head or tail of one transport block (TB) 501 which is to be transmitted on uplink or downlink. The CRC 503 may have a fixed number of bits, e.g., 16 bits or 25 bits, or a variable number of bits depending on, e.g., channel context, and be used to determine whether channel coding succeeds. The CRC (503)-added TB 501 may be divided into several code blocks (CB s) 507, 509, 511, and 513. The maximum sizes of the code blocks may be previously determined and, in this case, the last code block 513 may be smaller than the other code blocks 507, 509, and 511. However, this is only an example, and according to another example, 0, a random value, or 1 may be inserted into the last code block 513, so that the last code block 513 and the other code blocks 507, 509 and 511 have the same length.

CRCs 517, 519, 521, and 523 may be added to the code blocks 507, 509, 511, and 513, respectively (515). The CRC may have a fixed number of bits, e.g., 16 bits or 24 bits, and be used to determine whether channel coding succeeds.

The TB 501 and a cyclic generator polynomial may be used to generate the CRC 503, and the cyclic generator polynomial may be defined in various ways. For example, assuming that a cyclic generator polynomial for a 24-bit CRC meets: gCRC24A(D)=D24+D23+D18+D17+D14+D11+D10+D7+D6+D5+D4+D3+D+1, and L=24, for TB data $a_0$, $a_1$, $a_2$, $a_3$, . . . , $a_{A-1}$, CRC $p_0$, $p_1$, $p_2$, $p_3$, . . . , $p_{L-1}$ may be determined as the value whose remainder is 0 when $a_0D^{A+23}+a_1D^{A+22}+$ . . . $+a_{A-1}D^{24}+p_0D^{23}+p_1D^{22}+$ . . . $+p_{22}D^1+p_{23}$ is divided by gCRC24A(D). $p_0$, $p_1$, $p_2$, $p_3$, . . . , $p_{L-1}$ In the above-described example, it is assumed that the CRC length L is 24 as an example, but the CRC length L may be determined to have a different value, e.g., 12, 16, 24, 32, 40, 48, or 64.

After the CRC is added to the TB through this process, the TB+CRC may be divided into N CBs 507, 509, 511, and 513. CRCs 517, 519, 521, and 523 may be added to the CBs 507, 509, 511, and 513, respectively (515). The CRCs added to the CBs may have different lengths than the CRC added to the TB, or a different cyclic generator polynomial may be used to generate the CRC. The CRC 503 added to the TB and the CRCs 517, 519, 521, and 523 added to the codeblocks may be omitted depending on the type of channel code to be applied to the codeblocks. For example, if an LDPC code, not turbo code, is applied to the codeblocks, the CRCs 517, 519, 521, and 523 to be added to the codeblocks may be omitted.

However, even when the LDPC is applied, the CRCs 517, 519, 521, and 523 may be added to the codeblocks. Further, when a polar code is used, the CRCs may also be added or omitted.

As described above in connection with FIG. 5, the maximum length of one codeblock is determined depending on the type of channel coding applied to the TB to be transmitted, and depending on the maximum length of the codeblock, the TB and the CRC added to the TB may be divided into codeblocks.

In legacy LTE systems, CB CRCs are added to the divided CBs, and the data bits of the CBs and the CRCs are encoded with channel code, so that coded bits are determined, and the number of bits to be rate-matched is determined as previously agreed on coded bits.

In NR systems, the TB size (TBS) may be calculated by the following steps.

Step 1:

$$N'_{RE}$$

which is the number of REs allocated for PDSCH mapping in one PRB in the allocated resource is calculated.

$$N'_{RE}$$

may be calculated as $$N^{RB}_{sc} \cdot N^{sh}_{symb} - N^{PRB}_{DMRS} - N^{PRB}_{oh}.$$

Here, $$N^{RB}_{sc}$$

is 12, and $$N^{sh}_{symb}$$

may indicate the number of OFDM symbols allocated to the PDSCH.

$$N^{PRB}_{DMRS}$$

is the number of REs in one PRB occupied by DMRSs of the same CDM group.

$$N_{oh}^{PRB}$$

is the number of REs occupied by the overhead in one PRB configured by higher signaling, and may be set to one of 0, 6, 12, and 18 Thereafter, the total number $N_{RE}$ of REs allocated to the PDSCH may be calculated. $N_{RE}$ is calculated as $$\min(156, N_{RR}') \cdot n_{PRB},$$

and $n_{RRB}$ is calculated as denotes the number of PRBs allocated to the UE.

Step 2: $N_{info}$, which is the number of bits of temporary information, may be calculated as $N_{RE}*R*Q_m*v$. Here, R is the code rate, Qm is the modulation order, and information for this value may be transmitted using the MCS bit field of DCI and a pre-arranged table. Further, v is the number of allocated layers. If $N_{info} \leq 3824$, the TBS may be calculated through step 3 below. Otherwise, the TBS may be calculated through step 4.

Step 3: By $$N_{info}' = \max\left(24, 2^n * \left\lfloor \frac{N_{info}}{2^n} \right\rfloor\right)$$

and $n = \max(3, \lfloor \log_2(N_{info}) \rfloor - 6)$, $$N_{info}'$$

may be calculated. The TBS may be determined to be a value closest to $$N_{info}'$$

among values not smaller than $$N_{info}'$$

in Table 12 below.

TABLE 12

| Index | TBS | Index | TBS | Index | TBS | Index | TBS |
|---|---|---|---|---|---|---|---|
| 1 | 24 | 31 | 336 | 61 | 1288 | 91 | 3624 |
| 2 | 32 | 32 | 352 | 62 | 1320 | 92 | 3752 |
| 3 | 40 | 33 | 368 | 63 | 1352 | 93 | 3824 |
| 4 | 18 | 34 | 384 | 64 | 1416 | | |
| 5 | 56 | 35 | 408 | 65 | 1480 | | |
| 6 | 64 | 36 | 432 | 66 | 1544 | | |
| 7 | 72 | 37 | 456 | 67 | 1608 | | |
| 8 | 80 | 38 | 480 | 68 | 1672 | | |
| 9 | 88 | 39 | 504 | 69 | 1736 | | |
| 10 | 96 | 40 | 528 | 70 | 1800 | | |
| 11 | 104 | 41 | 552 | 71 | 1864 | | |

TABLE 12-continued

| Index | TBS | Index | TBS | Index | TBS | Index | TBS |
|---|---|---|---|---|---|---|---|
| 12 | 112 | 42 | 576 | 72 | 1928 | | |
| 13 | 120 | 43 | 608 | 73 | 2024 | | |
| 14 | 128 | 44 | 640 | 74 | 2088 | | |
| 15 | 136 | 45 | 672 | 75 | 2152 | | |
| 16 | 144 | 46 | 704 | 76 | 2216 | | |
| 17 | 152 | 47 | 736 | 77 | 2280 | | |
| 18 | 160 | 48 | 768 | 78 | 2408 | | |
| 19 | 168 | 49 | 808 | 79 | 2472 | | |
| 20 | 176 | 50 | 848 | 80 | 2536 | | |
| 21 | 184 | 51 | 888 | 81 | 2600 | | |
| 22 | 192 | 52 | 928 | 82 | 2664 | | |
| 23 | 208 | 53 | 984 | 83 | 2728 | | |
| 24 | 224 | 54 | 1032 | 84 | 2792 | | |
| 25 | 240 | 55 | 1064 | 85 | 2856 | | |
| 26 | 256 | 56 | 1128 | 86 | 2976 | | |
| 27 | 272 | 57 | 1160 | 87 | 3104 | | |
| 28 | 288 | 58 | 1192 | 88 | 3240 | | |
| 29 | 304 | 59 | 1224 | 89 | 3368 | | |
| 30 | 320 | 60 | 1256 | 90 | 3496 | | |

Step 4: By $$N_{info}' = \max\left(3840, 2^n \times \text{round}\left(\frac{N_{info} - 24}{2^n}\right)\right)$$

and $n = \lfloor \log_2(N_{info} - 24) \rfloor - 5$, $$N_{info}'$$

may be calculated. The TBS may be determined by $$N_{info}'$$

and [pseudo-code 1] below. In the following, C corresponds to the number of code blocks included in one TB.

[Pseudo-code 1 starts]
　　if R ≤ 1/4

$$TBS = 8 * C * \left\lceil \frac{N_{info}' + 24}{8 * C} \right\rceil - 24, \text{ where } C = \left\lceil \frac{N_{info}' + 24}{3816} \right\rceil$$

else
　　　　if N'$_{info}$ > 8424

$$TBS = 8 * C * \left\lceil \frac{N_{info}' + 24}{8 * C} \right\rceil - 24, \text{ where}$$

$$C = \left\lceil \frac{N_{info}' + 24}{8424} \right\rceil$$

else $$TBS = 8 * \left\lceil \frac{N_{info}' + 24}{8} \right\rceil - 24$$

end if
　　end if
[End of Pseudo-code 1]

When one CB is input to the LDPC encoder in the NR system, it may be output, with parity bits added. In this case, the amount of parity bits may vary depending on an LDCP base graph. A method for sending all of the parity bits generated by LDPC coding for a specific input may be referred to as full buffer rate matching (FBRM), and a method for limiting the number of transmittable parity bits may be referred to as limited buffer rate matching (LBRM). When a resource is allocated for data transmission, the output of the LDPC encoder is created as a circular buffer, and the bits of the created buffer are repeatedly transmitted as much as the allocated resource. In this case, the length of the circular buffer may be designated Ncb.

When the number of all of the parity bits generated by LDPC coding is N, in the FBRM method, Ncb=N. In the LBRM method, $N_{cb}$ is min(N, $N_{ref}$), $N_{ref}$ is given as $$\left\lfloor \frac{TBS_{LBRM}}{C \cdot R_{LBRM}} \right\rfloor;$$

and $R_{LBRM}$ may be determined as $\frac{2}{3}$. To obtain $TBS_{LBRM}$, the above-described method for obtaining TBS is used, assuming the maximum number of layers and maximum modulation order supported by the UE in the cell. The maximum modulation order Qm is assumed to be 8, if an MCS table supporting 256QAM is used for at least one BWP in the cell, or otherwise, 6 (64QAM). The code rate is assumed to be the maximum code rate, i.e., 948/1024. $N_{RE}$ is assumed to be 156·$n_{PRB}$, and $n_{PRB}$ is assumed to be $n_{PRB,LBRM}$. $n_{PRB,LBRM}$ may be given in Table 13 below.

TABLE 13

| Maximum number of PRBs across all configured BWPs of a carrier | $n_{PRB, LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

The maximum data rate supported by the UE in the NR system may be determined through Equation 2 below.

[Equation 2]

data rate (in *Mbps*) =

$$10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot \left(1 - OH^{(j)}\right) \right)$$

In Equation 2, J is the number of carriers bundled by carrier aggregation, Rmax=948/1024, $$v_{Layers}^{(j)}$$

is the maximum number of layers, $$Q_m^{(j)}$$

is the maximum modulation order, $f^{(j)}$ is the scaling index, and μ is the subcarrier spacing. As $f^{(j)}$ one of 1, 0.8, 0.75, and 0.4 may be reported by the UE and μ may be given in Table 14 below.

TABLE 14

| μ | $\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

$$T_s^{\mu}$$

is the average OFDM symbol length, $$T_s^{\mu}$$

may be calculated as $$\frac{10^{-3}}{14 \cdot 2^{\mu}},$$

and $$N_{PRR}^{BW(j),\mu}$$

is the maximum number of RBs in BW(j). $OH^{(j)}$, as an overhead value, may be given as 0.14 for downlink and 0.18 for uplink in FR1 (band below 6 GHz), and as 0.08 for downlink and 0.10 for uplink in FR2 (band above 6 GHz). Through Equation 2, the maximum data rate in downlink in a cell having a 100 MHz frequency bandwidth at a 30 kHz subcarrier spacing may be calculated as Table 15 below.

TABLE 15

| $f^{(U)}$ | $v_{Layers}^{(j)}$ | $Q_{in}^{(j)}$ | Rmax | $N_{PRB}^{BW(j),\mu}$ | $T_s^{\mu}$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

In contrast, the actual data rate that the UE may measure in actual data transmission may be a value obtained by dividing the amount of data by the data transmission time. This may be a value obtained by dividing TBS by the TTI length for 1 TB transmission or dividing the sum of TBSs by the TTI length for 2 TB transmission. As an example, as assumed to obtain Table 15, the maximum actual data rate in downlink in the cell having the 100 MHz frequency band in the 30 kHz subcarrier spacing may be determined as shown in Table 16 according to the number of PDSCH symbols allocated.

TABLE 16

| $N^{sh}_{symb}$ | $N^{PRB}_{DMRS}$ | $N_{RE}$ | $N_{RE}$ | $N_{info}$ | n | $N'_{info}$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0,428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

The maximum data rate supported by the UE may be identified via Table 15, and the actual data rate following the allocated TBS may be identified via Table 16. In some cases, the actual data rate may be larger than the maximum data rate depending on scheduling information.

In wireless communication systems, in particular new radio (NR) systems, a data rate supportable by the UE may be agreed on between the base station and the UE. This may be calculated using, e.g., the maximum frequency band, maximum modulation order, and maximum number of layers supported by the UE. However, the calculated data rate may be different from a value calculated from the size of the transport block (TB)(transport block size (TBS) and transmission time interval (TTI) used for actual data transmission.

Thus, the UE may be assigned a larger TBS than the value corresponding to the data rate supported by the UE and, to prevent this, a limit may be imposed on the TB S schedulable depending on the data rate supported by the UE.

Figure 6:
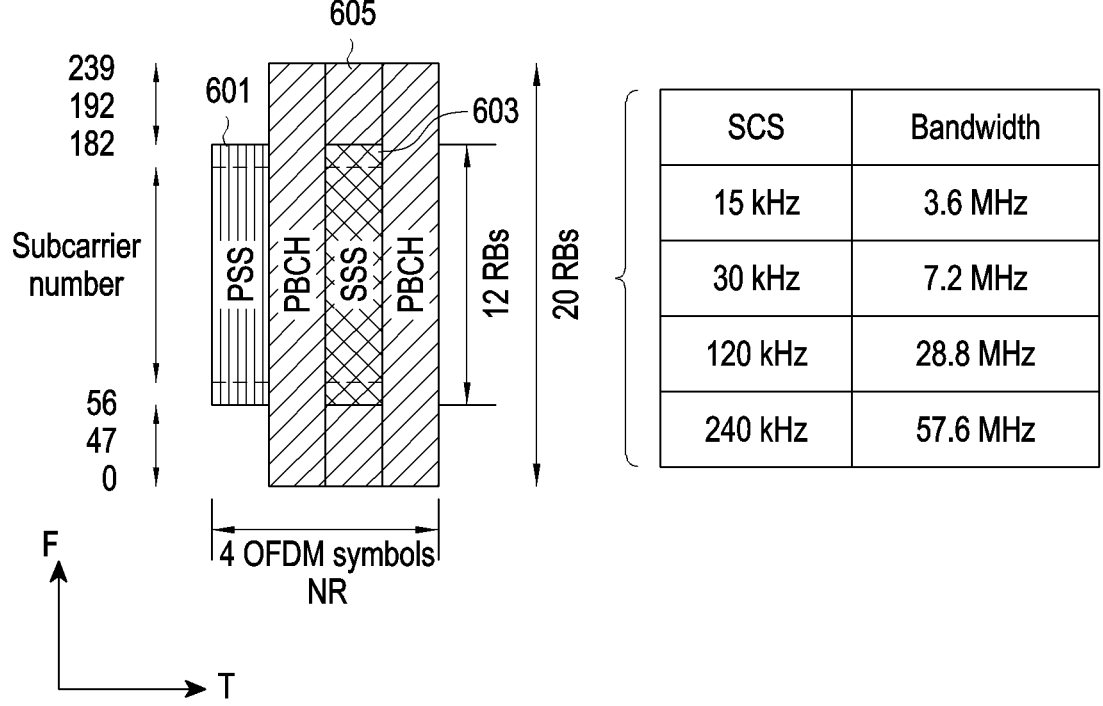
FIG. 6 is a view illustrating an example in which a synchronization signal (SS) and a physical broadcast channel (PBCH) of an NR system are mapped in the frequency and time domains.

FIG. 6 is a view illustrating an example in which a synchronization signal (SS) and a physical broadcast channel (PBCH) of an NR system are mapped in the frequency and time domains.

A primary synchronization signal (PSS) 601, a secondary synchronization signal (SSS) 603, and a PBCH are mapped over 4 OFDM symbols, and the PSS and SSS are mapped to 12 RBs, and the PBCH is mapped to 20 RBs. How the frequency band of 20 RBs changes according to subcarrier spacing (SCS) is illustrated in FIG. 6. The resource region in which the PSS, SSS, and PBCH are transmitted may be referred to as an SS/PBCH block. The SS/PBCH block may be referred to as an SSB block.

Figure 7:
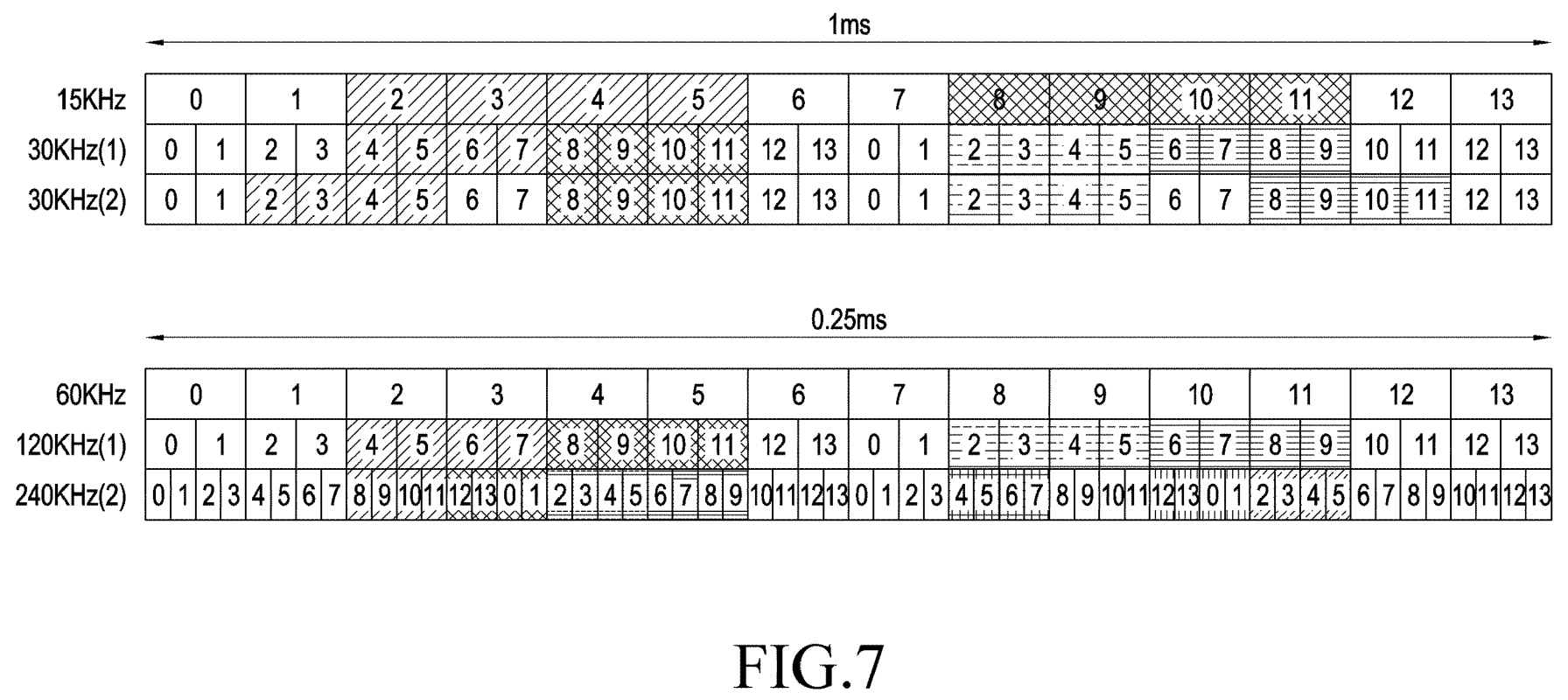

FIG. 7 is a view illustrating a symbol in which an SS/PBCH block may be transmitted according to a subcarrier spacing.

Referring to FIG. 7, the subcarrier spacing may be set to 15 kHz, 30 kHz, 120 kHz, or 240 kHz, and the position of the symbol in which the SS/PBCH block (or SSB block) may be positioned may be determined according to each subcarrier spacing. FIG. 7 illustrates the position of the symbol in which the SSB may be transmitted according to the subcarrier spacing in the symbols within 1 ms, and the SSB need not be always transmitted in the region shown in FIG. 7. The position in which the SSB block is transmitted may be configured in the UE through system information or dedicated signaling.

Since the UE is generally far from the base station, the signal transmitted from the UE is received by the base station after a propagation delay. The propagation delay time is a value obtained by dividing the path through which a radio wave is transmitted from the UE to the base station by the speed of light, and may typically be a value obtained by dividing the distance between the UE and the base station by the speed of light. According to an embodiment, if the UE is located 100 km away from the base station, a signal transmitted from the UE is received by the base station after about 0.34 msec. The signal transmitted from the base station is also received by the UE after about 0.34 msec. As described above, the arrival time of a signal transmitted from the UE to the base station may vary depending on the distance between the UE and the base station. Therefore, when multiple UEs in different locations transmit signals simultaneously, the times when the signals arrive at the base station may differ from each other. To allow the signals from several UEs to simultaneously arrive at the base station, the time of transmission of uplink signal may be rendered to differ per UE. In 5G, NR and LTE systems, this is called timing advance.

Figure 8:
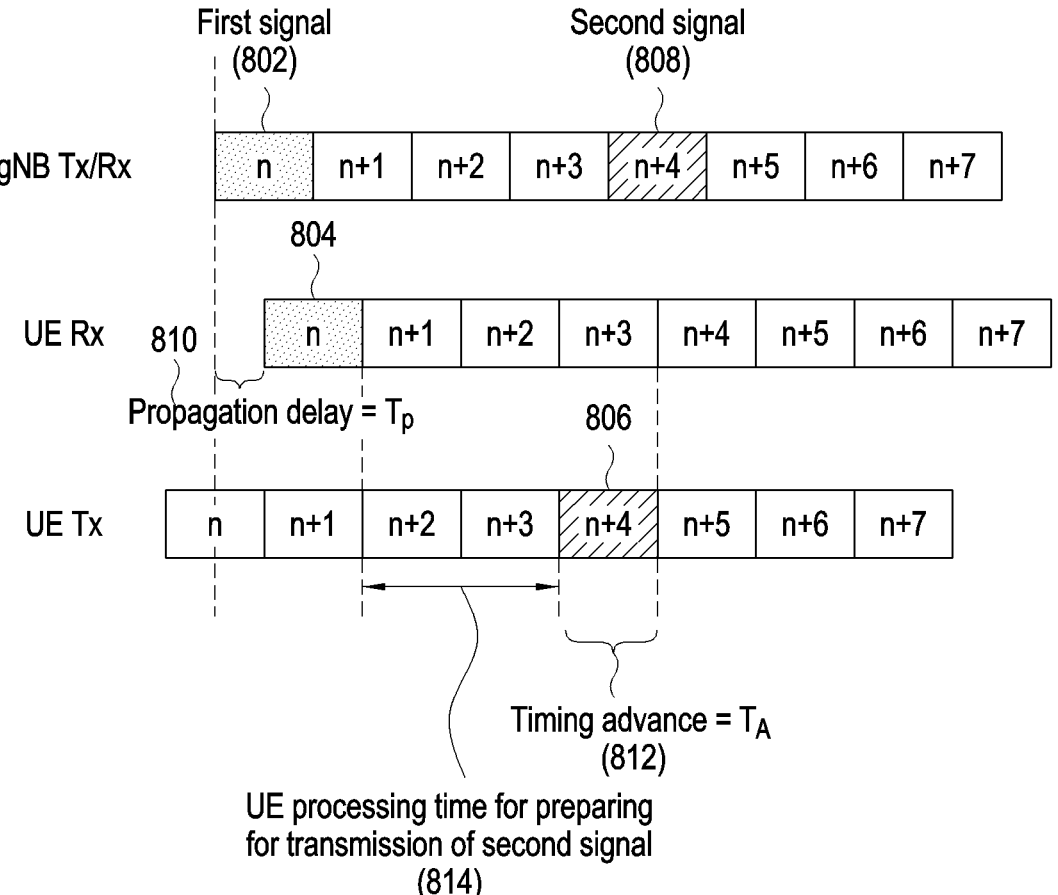
FIG. 8 is a view illustrating a processing time of a UE according to a timing advance when the UE receives a first signal and the UE transmits a second signal in a 5G or NR system according to an embodiment.

FIG. 8 is a view illustrating a processing time of a UE according to a timing advance when the UE receives a first signal and the UE transmits a second signal in a 5G or NR system according to an embodiment.

Hereinafter, the processing time of the UE according to the timing advance is described in detail. When the base station transmits an uplink scheduling grant (UL grant) or a downlink control signal and data (DL grant and DL data) to the UE at slot n 802, the UE may receive the uplink scheduling grant or downlink control signal and data at slot n 804. In this case, the UE may receive the signal, a propagation delay (Tp) 810 later than the time the base station transmits the signal.

In this embodiment, when the UE receives a first signal at slot n 804, the UE transmits a second signal at slot n+4 806. When the UE transmits a signal to the base station, the UE may transmit an HARQ ACK/NACK for the uplink data or downlink data at a timing 806 which is a timing advance (TA) 812 earlier than slot n+4 for the signal received by the UE to allow the signal to arrive at the base station at a specific time. Thus, according to the instant embodiment, the time during which the UE may prepare to transmit uplink data after receiving the uplink scheduling grant or the UE may prepare to transfer an HARQ ACK or NACK after receiving downlink data may be a time corresponding to three slots except for TA (814).

To determine the above-described timing, the base station may calculate the absolute value of the TA of the UE. The base station may calculate the absolute value of the TA by adding to, or subtracting from, the TA first transferred to the UE in the random access phase, variation in the subsequent TA transferred via higher layer signaling, when the UE initially accesses the base station. In the disclosure, the absolute value of the TA may be a value obtained by subtracting the start time of the nth TTI for reception by the UE from the start time of the nth TTI for transmission by the UE.

Meanwhile, one of the important criteria for performance of a cellular wireless communication system is packet data latency. In LTE systems, signal transmission/reception is performed in units of subframes which have a transmission time interval (TTI) of 1 ms. The LTE system operated as described above may support UEs (short-TTI UEs) having a shorter TTI than 1 ms. Meanwhile, in 5G or NR systems, the TTI may be shorter than 1 ms. Short-TTI UEs are suitable for services, such as voice over LTE (VoLTE) services and remote control services where latency is important. Further, the short-TTI UE becomes a means capable of realizing mission-critical Internet of things (IoT) on a cellular basis.

In the 5G or NR system, when the base station transmits a PDSCH including downlink data, the DCI for scheduling the PDSCH indicates the K1 value, which is a value corresponding to information for the timing when the UE transmits HARQ-ACK information for the PDSCH Unless it is instructed to transmit HARQ-ACK information earlier than symbol L1 including the timing advance, the UE may transmit the HARQ-ACK to the base station. In other words, the HARQ-ACK information may be transmitted from the UE to the base station at the same time, or later than, the symbol L1 including the timing advance. When it is instructed to transmit HARQ-ACK information earlier than symbol L1 including the timing advance, the HARQ-ACK information may not be valid HARQ-ACK information in HARQ-ACK transmission from the UE to the base station.

Symbol L1 may be the first symbol at which cyclic prefix (CP) begins $T_{proc,1}$ after the last time of the PDSCH. $T_{proc,1}$ may be determined as in Equation 3 below.

$$T_{proc,1} = ((N_1 + d_{1,1} + d_{1,2})(2048 + 144) \cdot \kappa 2^{-\mu}) \cdot T_C \qquad \text{[Equation 3]}$$

In Equation 3 above, N1, d1,1, d1,2, k, μ, and TC may be defined as follows.

If HARQ-ACK information is transmitted over PUCCH (uplink control channel), d1,1=0, and if HARQ-ACK information is transmitted over PUSCH (uplink shared channel, data channel), d1,1=1.

When the UE is configured with a plurality of activated configuration carriers or carriers, the maximum timing difference between carriers may be reflected in the second signal transmission.

In the case of PDSCH mapping type A, that is, when the first DMRS symbol position is the third or fourth symbol of the slot, if the position index i of the last symbol of the PDSCH is less than 7, d1,2=7−i.

In the case of PDSCH mapping type B, that is, when the first DMRS symbol position is the first symbol of the PDSCH, if the length of the PDSCH is 4 symbols, d1,2=3, and if the length of the PDSCH is 2 symbols, d1,2=3+d, where d is the number of symbols in which the PDSCH and the PDCCH including the control signal for scheduling the corresponding PDSCH overlap.

N1 is defined as in Table 17 below according to μ. μ=0, 1, 2, and 3 mean subcarrier spacing is 15 kHz, 30 kHz, 60 kHz, and 120 kHz, respectively.

32

TABLE 17

| μ | PDSCH decoding time $N_1$ [symbols] | |
| | No additional PDSCH DM-RS configured | additional PDSCH DM-RS configured |
| --- | --- | --- |
| 0 | 8 | 13 |
| 1 | 10 | 13 |
| 2 | 17 | 20 |
| 3 | 20 | 24 |

For the N1 value provided in Table 17 above, a different value may be used according to UE capability.

is defined as $$T_c = 1/(\Delta f_{max} \cdot N_f)\Delta f_{max} = 480 \cdot 10^3 \text{ Hz}, N_f = 4096, \kappa = T_s/T_c = 64,$$

$$T_s = 1/(\Delta f_{ref} \cdot N_{f,ref}) \cdot \Delta f_{ref} = 15 \cdot 10^3 \text{ Hz}, N_{f,ref} = 2048.$$

Further, in the 5G or NR system, when the base station transmits control information including an uplink scheduling grant, the K2 value corresponding to information for the timing when the UE transmits uplink data or PUSCH may be indicated.

Unless it is instructed to transmit PUSCH earlier than symbol L2 including the timing advance, the UE may transmit the PUSCH to the base station. In other words, the PUSCH may be transmitted from the UE to the base station at the same time, or later than, the symbol L2 including the timing advance. When it is instructed to transmit the PUSCH earlier than symbol L2 including the timing advance, the UE may disregard the uplink scheduling grant control information from the base station.

Symbol L2 may be the first symbol at which the CP of the PUSCH symbol, which needs to be transmitted $T_{proc,2}$ after the last time of the PDCCH including the scheduling grant, begins. $T_{proc,2}$ may be determined as in Equation 4 below.

$$T_{proc,2} = ((N_2 + d_{2,1})(2048 + 144) \cdot \kappa 2^{-\mu}) \cdot T_C \qquad \text{[Equation 4]}$$

In Equation 4 above, N2, d2,1, k, μ, and TC may be defined as follows.

If the first symbol among PUSCH-allocated symbols includes only DMRS, d2,1=0, otherwise d2,1=1.

When the UE is configured with a plurality of activated configuration carriers or carriers, the maximum timing difference between carriers may be reflected in the second signal transmission.

N2 is defined as in Table 18 below according to μ. μ=0, 1, 2, and 3 mean subcarrier spacing is 15 kHz, 30 kHz, 60 kHz, and 120 kHz, respectively.

TABLE 18

| μ | PUSCH preparation time $N_2$ [symbols] |
| --- | --- |
| 0 | 10 |
| 1 | 12 |
| 2 | 23 |
| 3 | 36 |

For the N2 value provided in Table 18 above, a different value may be used according to UE capability.
is defined as $$T_c = 1/(\Delta f_{max} \cdot N_f), \Delta f_{max} = 480 \cdot 10^3 \text{ Hz}, N_f = 4096, \kappa = T_s/T_c = 64,$$

$$T_s = 1/(\Delta f_{ref} \cdot N_{f,ref}), \Delta f_{ref} = 15 \cdot 10^3 \text{ Hz}, N_{f,ref} = 2048.$$

The 5G or NR system may configure a frequency band part (BWP) within one carrier to allow a specific UE to transmit and receive within the configured BWP. This may be so intended to reduce power consumption of the UE. The base station may configure a plurality of BWPs, and may change the activated BWP in the control information. The time which the UE may use when the BWP is changed may be defined as shown in Table 19 below.

TABLE 19

| Frequency Range | Scenario | Type 1 delay (us) | Type 2 delay (us) |
|---|---|---|---|
| 1 | 1 | 600 | 2000 |
| | 2 | 600 | 2000 |
| | 3 | 600 | 2000 |
| | 4 | 400 | 950 |
| 2 | 1 | 600 | 2000 |
| | 2 | 600 | 2000 |
| | 3 | 600 | 2000 |
| | 4 | 400 | 950 |

In Table 19, frequency range 1 means a frequency band below 6 GHz, and frequency range 2 means a frequency band above 6 GHz. In the above-described embodiment, type 1 and type 2 may be determined according to UE capability. Scenarios 1, 2, 3, and 4 in the above-described embodiment are given as illustrated in Table 20 below.

TABLE 20

| | Center frequency changed | Center frequency not changed |
|---|---|---|
| Frequency bandwidth changed | Scenario 3 | Scenario 2 |
| Frequency bandwidth not changed | Scenario 1 | If subcarrier spacing is changed, scenario 4 |

Figure 9:
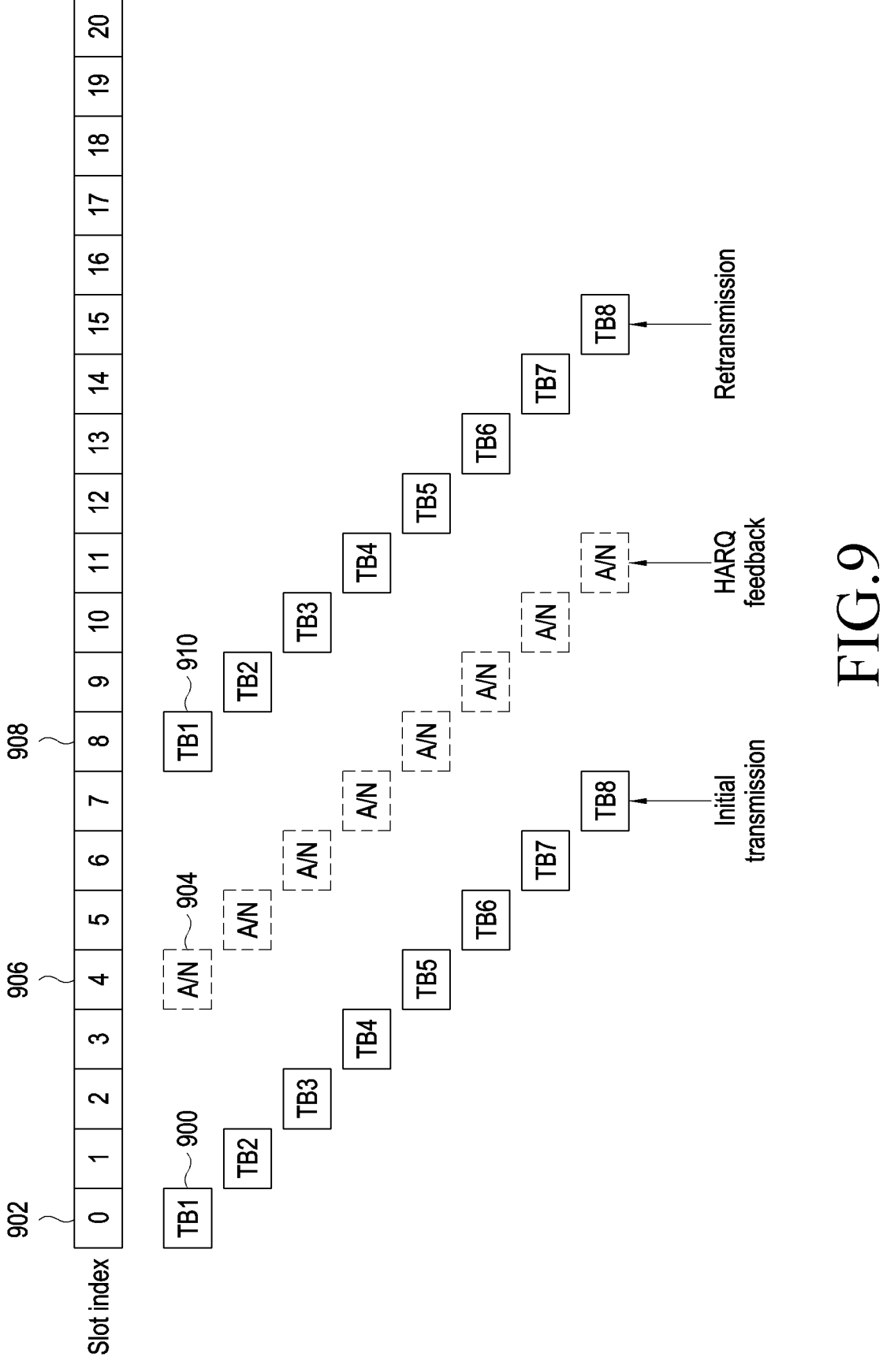
FIG. 9 is a view illustrating an example in which data (e.g., TBs) are scheduled and transmitted according to a slot, an HARQ-ACK feedback for the corresponding data is received, and retransmission is performed according to the feedback.

FIG. 9 is a view illustrating an example in which data (e.g., TBs) are scheduled and transmitted according to a slot, an HARQ-ACK feedback for the corresponding data is received, and retransmission is performed according to the feedback. Referring to FIG. 9, TB1 900 is initially transmitted in slot 0 902, and an ACK/NACK feedback 904 therefor is transmitted in slot 4 906. If the initial transmission of TB1 fails and a NACK is received, retransmission 910 for TB1 may be performed in slot 8 908. In the above, the time point at which the ACK/NACK feedback is transmitted and the time point at which the retransmission is performed may be predetermined or may be determined according to a value indicated by control information and/or higher layer signaling.

FIG. 9 illustrates an example in which TB1 to TB8 are sequentially scheduled and transmitted from slot 0 to TB8. For example, TB1 to TB8 may be transmitted, with HARQ process ID 0 to HARQ process ID 7 assigned thereto. If only four HARQ process IDs may be used by the base station and the UE, it may be impossible to consecutively transmit eight different TBs.

Figure 10:
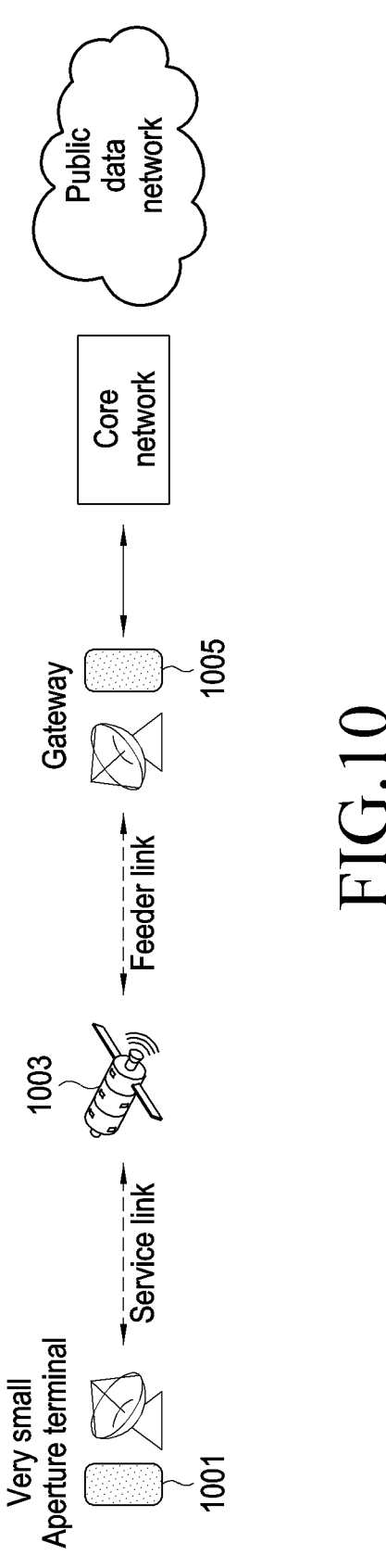
FIG. 10 is a view illustrating an example of a communication system using a satellite.

FIG. 10 is a view illustrating an example of a communication system using a satellite. For example, if a UE 1001 transmits a signal to a satellite 1003, the satellite 1003 may transfer the signal to a base station 1005, and the base station 1005 may process the received signal and transmit a signal including a request for a subsequent operation therefor to the UE 1001, and the signal may be transmitted through the satellite 1003. Since the distance between the UE 1001 and the satellite 1003 is long, and the distance between the satellite 1003 and the base station 1005 is also long, the time required for data transmission/reception from the UE 1001 to the base station 1005 increases.

Figure 11:
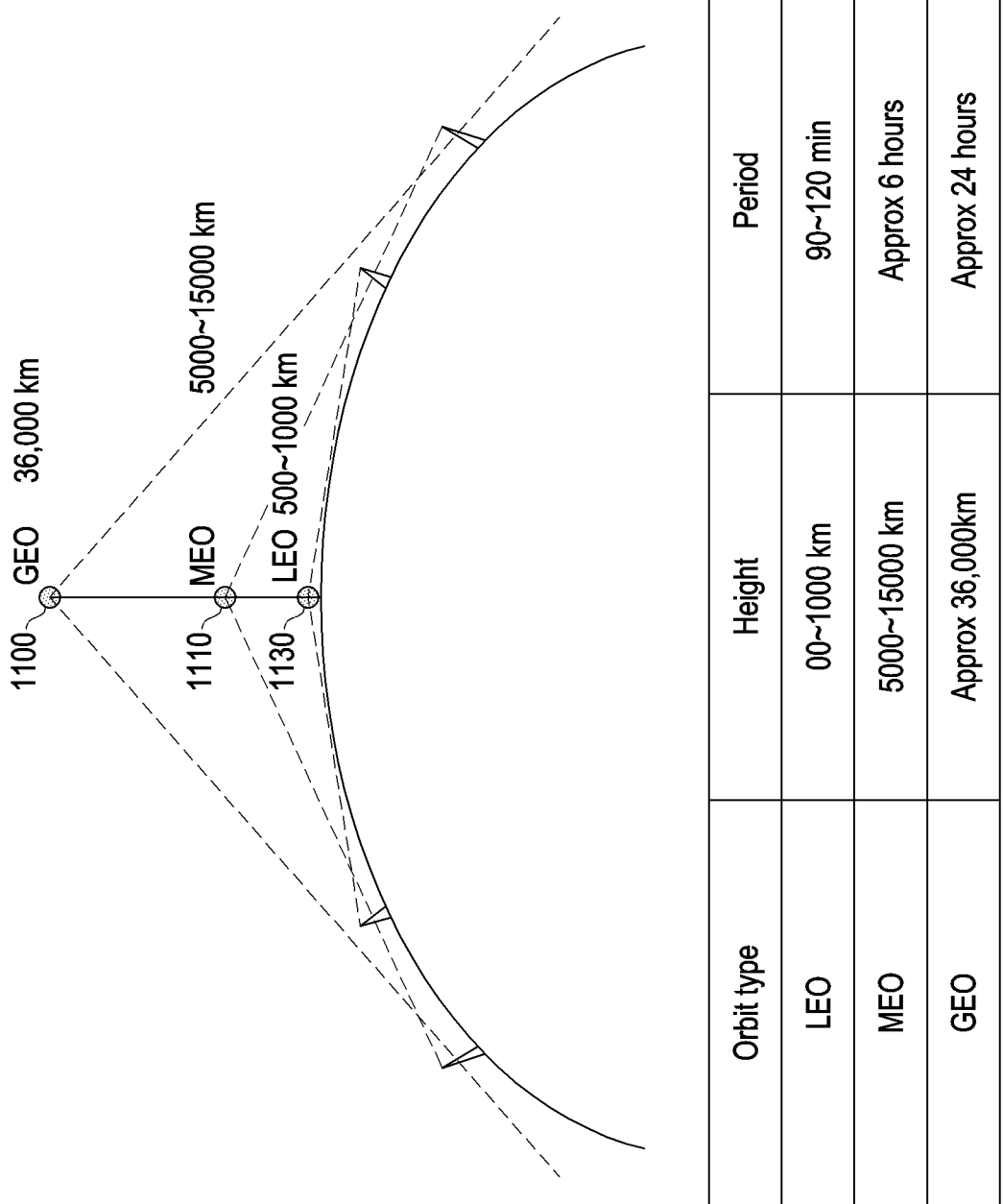
FIG. 11 is a view illustrating the earth orbital period of a communication satellite depending on the altitude or height of the satellite.

FIG. 11 is a view illustrating the earth orbital period of a communication satellite depending on the altitude or height of the satellite. Satellites for communication may be classified into low earth orbit (LEO), middle earth orbit (MEO), and geostationary earth orbit (GEO) according to the orbit of the satellite. In general, a GEO 1100 refers to a satellite with an altitude of about 36000 km, an MEO 1110 refers to a satellite with an altitude of 5000 to 15000 km, and an LEO 1130 refers to a satellite with an altitude of 500 to 1000 km. The period of orbiting the earth varies depending on each altitude. The GEO 1100 has an orbital period of about 24 hours, the MEO 1110 with an orbital period of about 6 hours, and the LEO 1130 with an orbital period of about 90 to 120 minutes. Low earth orbit (up to 2,000 km) satellites have a relatively low altitude and are advantageous in terms of propagation delay and loss as compared to geostationary earth orbit (36,000 km) satellites.

Figure 12:
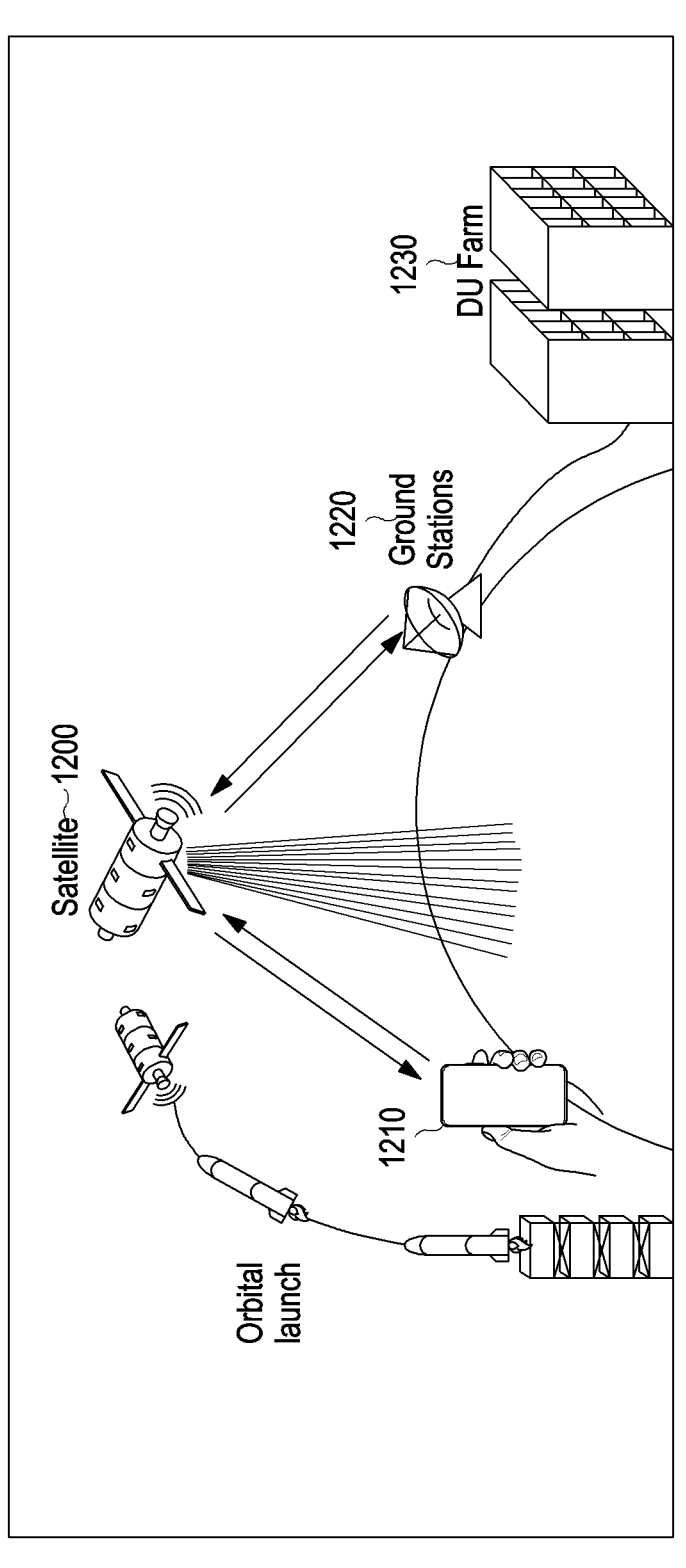
FIG. 12 is a conceptual diagram of satellite-UE direct communication.

FIG. 12 is a conceptual diagram of satellite-UE direct communication.

Referring to FIG. 12, a satellite 1200 located at an altitude of 100 km or more by a rocket may transmit/receive signals to/from a UE 1210 on the ground and transmits and receives signals to and from a ground station 1220 connected to terrestrial base stations (DU farms) 1230.

Figure 13:
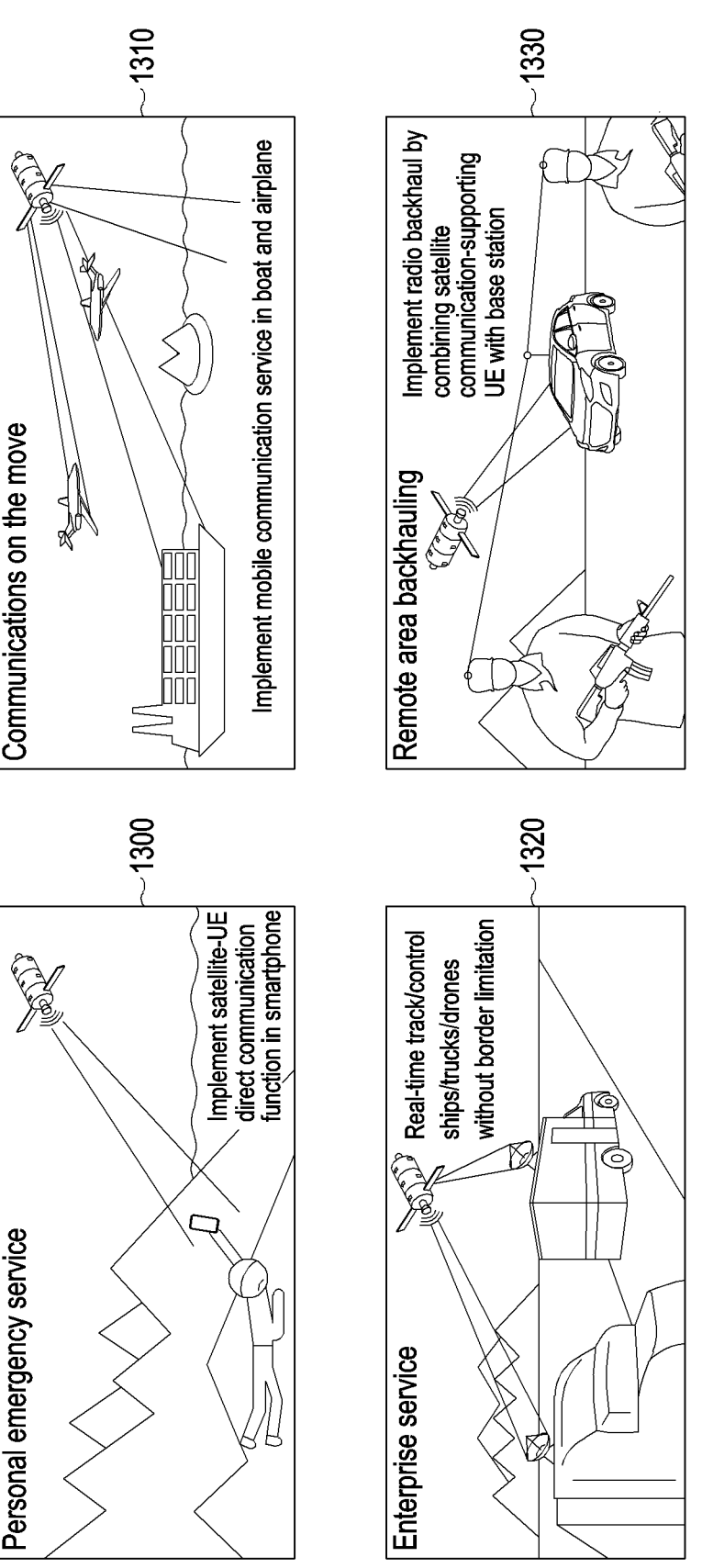
FIG. 13 is a view illustrating a use scenario of satellite-UE direct communication.

FIG. 13 is a view illustrating a use scenario of satellite-UE direct communication.

Referring to FIG. 13, the satellite-UE direct communication may support communication services for purposes specialized in the form of supplementing the coverage limit of the terrestrial network. As an example, as the UE is implemented with satellite-UE direct communication functionality, it is possible to transmit/receive emergency rescue and/or disaster signals in areas out of terrestrial network communication coverage (1300), to provide mobile communication services to users in areas where terrestrial network communication is impossible, such as on in boats and/or airplanes (1310), and to real-time track and control the location of boats, trucks, and/or drones without limitations in border (1320). Further, as the base station is supported with satellite communication functionality, the satellite communication may be used to function as a backhaul of the base station to perform a backhaul function (1330) when it is physically far away.

Figure 14:
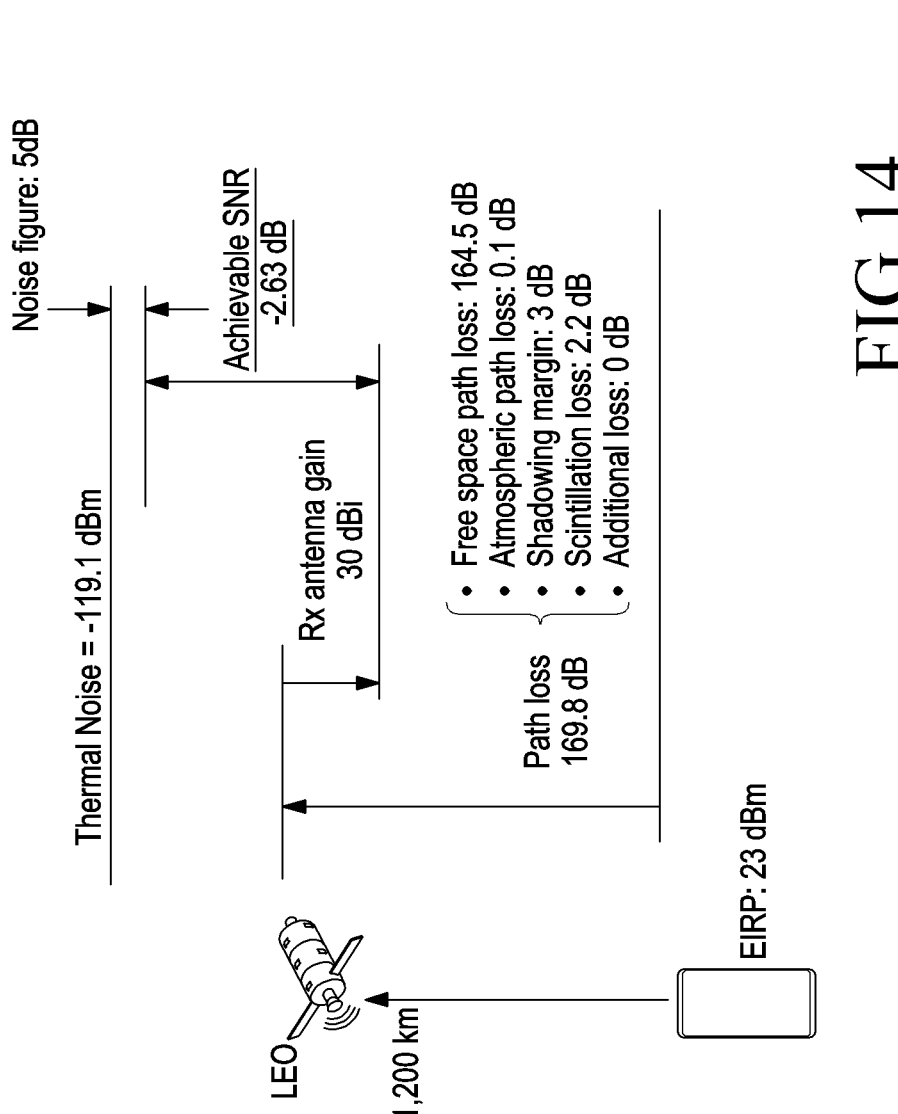
FIG. 14 is a view illustrating an example of calculating an expected data rate (throughput) in uplink when a LEO satellite at an altitude of 1200 km and a UE on the ground perform direct communication.

FIG. 14 is a view illustrating an example of calculating an expected data rate (throughput) in uplink when a LEO satellite at an altitude of 1200 km and a UE on the ground perform direct communication. When the transmit power effective isotropic radiated power (EIRP) of the terrestrial UE in the uplink is 23 dBm, the path loss of the radio channel to the satellite is 169.8 dB, and the satellite reception antenna gain is 30 dBi, an achievable signal-to-noise ratio (SNR) is estimated as −2.63 dB. In this case, the path loss may include a path loss in free space, a loss in the atmosphere of earth, and the like. Assuming that the signal-to-interference ratio (SIR) is 2 dB, the signal-to-interference and noise ratio (SINR) may be calculated as −3.92 dB, where, if a subcarrier spacing of 30 kHz and a frequency resource of 1 PRB are used, a transmission rate of 112 kbps may be achieved.

Figure 15:
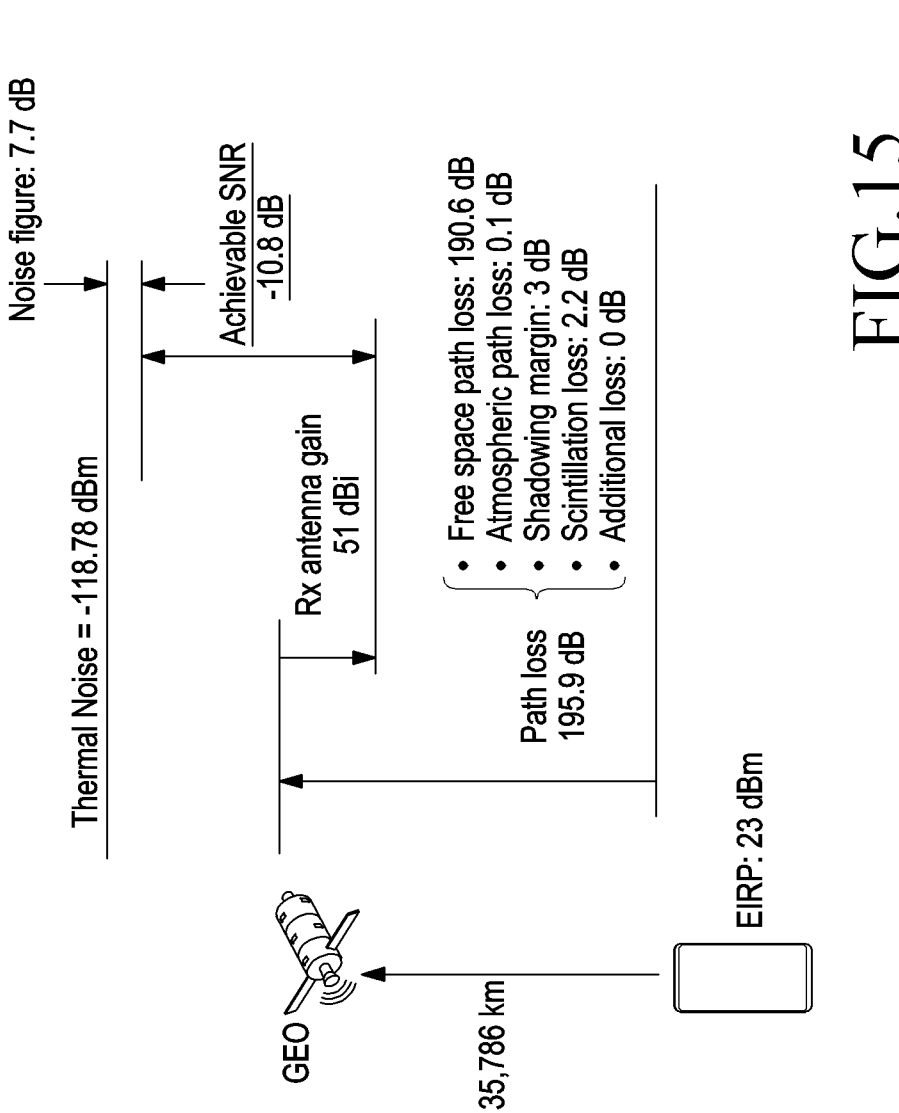
FIG. 15 is a view illustrating an example of calculating an expected data rate (throughput) in uplink when a GEO satellite at an altitude of 35786 km and a UE on the ground perform direct communication.

FIG. 15 is a view illustrating an example of calculating an expected data rate (throughput) in uplink when a GEO satellite at an altitude of 35786 km and a UE on the ground perform direct communication. When the transmit power EIRP of the terrestrial UE in the uplink is 23 dBm, the path loss of the radio channel to the satellite is 195.9 dB, and the satellite reception antenna gain is 51 dBi, an achievable SNR is estimated as −10.8 dB. In this case, the path loss may include a path loss in free space, a loss in the atmosphere of earth, and the like. Assuming that the SIR is 2 dB, the SINR may be calculated as −11 dB, where, if a subcarrier spacing of 30 kHz and a frequency resource of 1 PRB are used, a transmission rate of 21 kbps may be achieved. This may be a result of repeating transmission three times.

Figure 16:
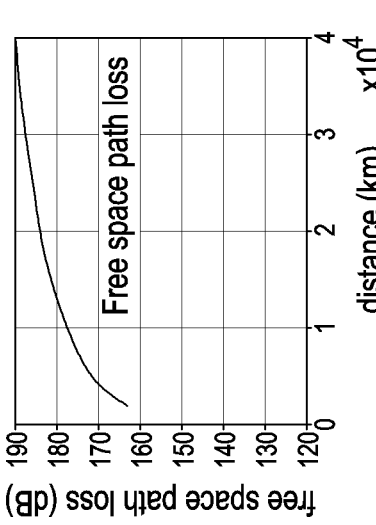
FIG. 16 is a view illustrating a path loss value according to a path loss model between a UE and a satellite, and a path loss according to a path loss model between the UE and a terrestrial network communication base station.
Figure 16:
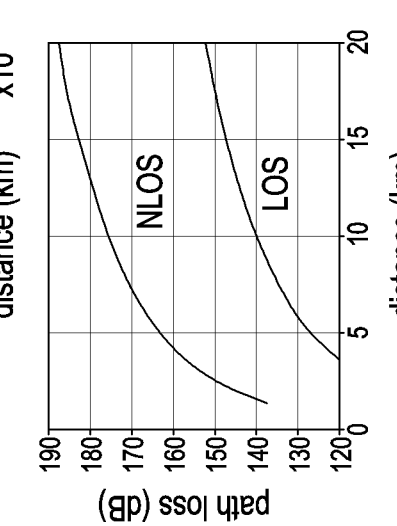
Figure 16:

FIG. 16 is a view illustrating a path loss value according to a path loss model between a UE and a satellite, and a path loss according to a path loss model between the UE and a terrestrial network communication base station. In FIG. 16, d corresponds to the distance, and fc is the frequency of the signal. In free space where communication between the UE and the satellite is performed, the path loss (F SPL, 1600) is inversely proportional to the square of the distance, but the path loss (PL2, PL'Uma-NLOS, 1610, 1620) on the ground with air where communication between the UE and the terrestrial base station (gNB) is performed is inversely proportional to about the distance to the fourth power. d_3D means the straight line distance between the UE and the base station, h_BS is the height of the base station, and h_UT is the height of the UE. d'_BP=4×h_BS×h_UT×fc/c. fc is the center frequency in Hz, and c is the speed of light in m/s.

In satellite communications (or non-terrestrial network), Doppler shift, i.e., a frequency offset of the transmission signal, occurs as the satellite steadily moves rapidly.

Figure 17:
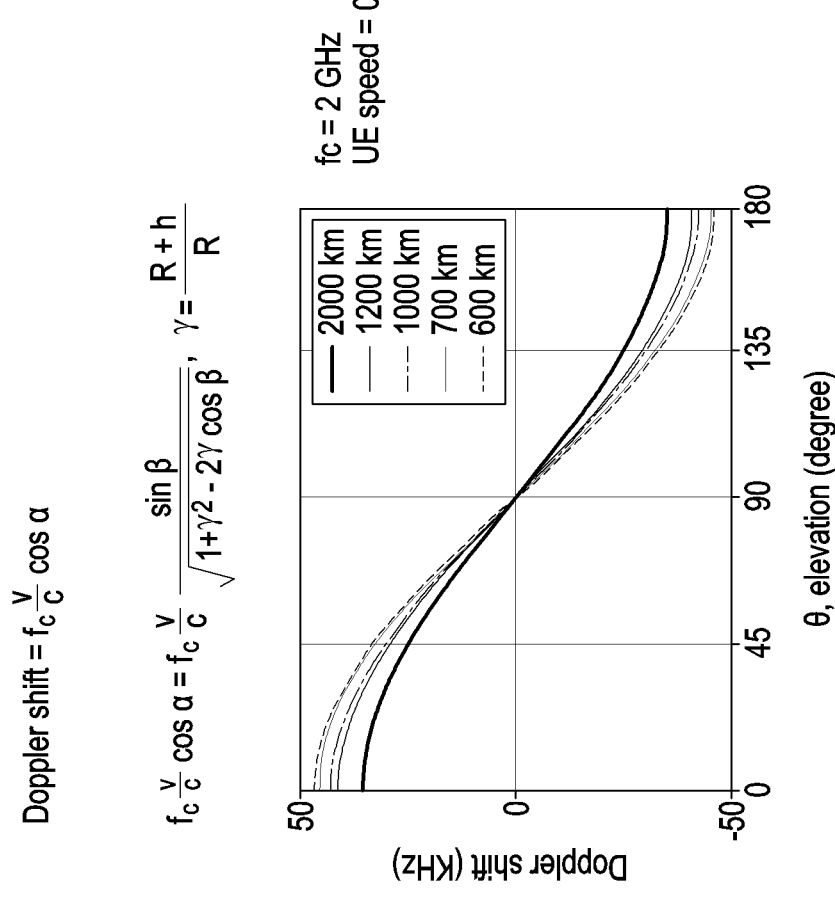
FIG. 17 is a view illustrating an equation and results for calculating the amount of Doppler shift experienced by a signal transferred from a satellite when the signal is received by a user on the ground according to the altitude and position of the satellite and the position of the UE user on the ground.

FIG. 17 is a view illustrating an equation and results for calculating the amount of Doppler shift experienced by a signal transferred from a satellite when the signal is received by a user on the ground according to the altitude and position of the satellite and the position of the UE user on the ground.

Referring to FIG. 17, R is the radius of the earth, h is the altitude of the satellite, v is the velocity at which the satellite orbits the earth, and fc is the frequency of the signal. The velocity of the satellite may be calculated from the altitude of the satellite and may be a velocity at which gravity, which is the force that the earth attracts the satellite, becomes equal to the centripetal force generated as the satellite orbits, which may be calculated as shown in FIG. 18.

Figure 18:
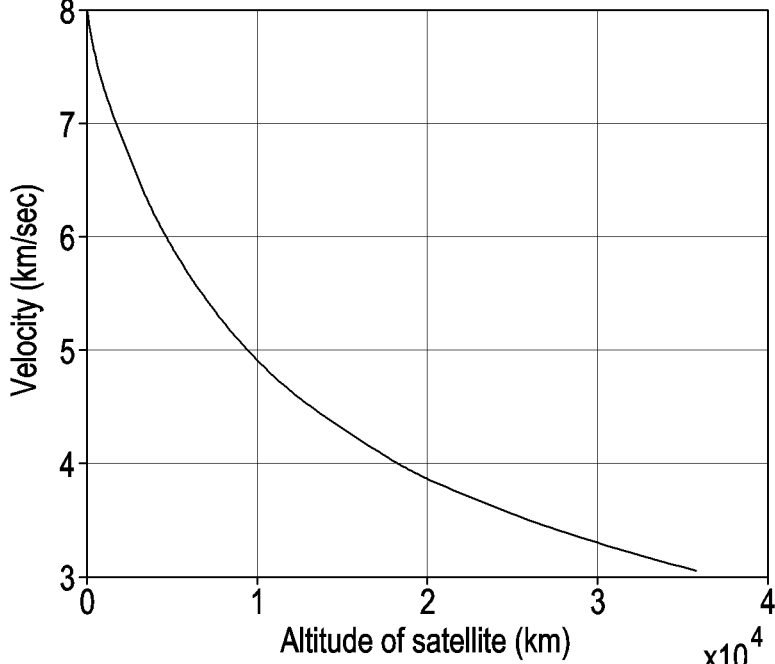
FIG. 18 is a view illustrating the velocity of a satellite calculated at the altitude of the satellite.

FIG. 18 is a view illustrating the velocity of a satellite calculated at the altitude of the satellite. As may be identified in FIG. 17, since the angle α is determined by the elevation angle θ, the value of the Doppler shift is determined depending on the elevation angle θ.

Figure 19:
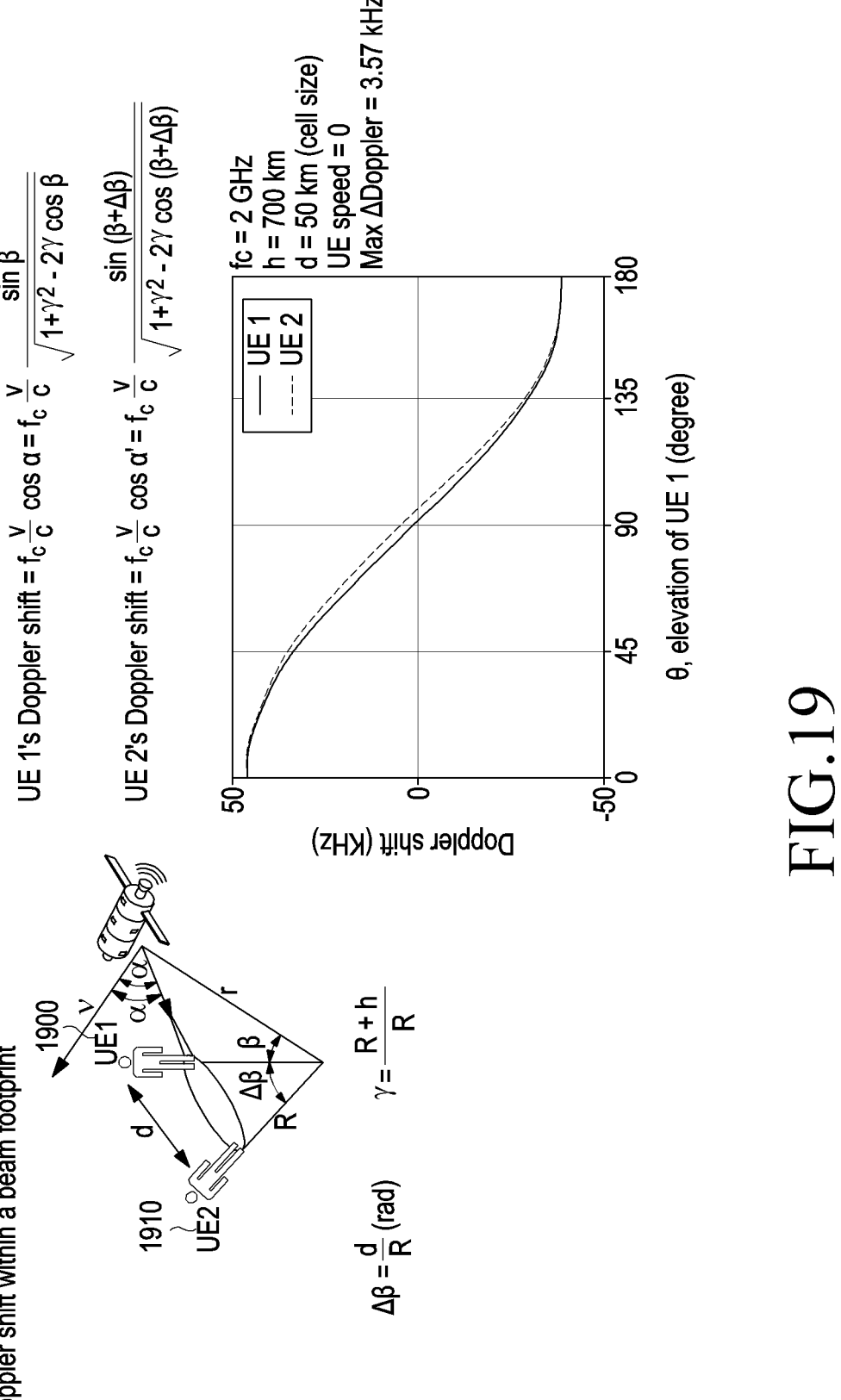
FIG. 19 is a view illustrating the Doppler shifts experienced by different UEs in one beam transmitted by a satellite to the ground.

FIG. 19 is a view illustrating the Doppler shifts experienced by different UEs in one beam transmitted by a satellite to the ground. In FIG. 19, the Doppler shift experienced by each of UE 1 1900 and UE 2 1910 according to the elevation angle θ was calculated. The result was obtained under the assumption that the center frequency is 2 GHz, the satellite altitude is 700 km, the diameter of one beam is 50 km on the ground, and the velocity of the UE is 0. Further, the Doppler shift calculated in the disclosure disregards the effect according to the earth's rotation velocity, which may be considered to have a small effect because it is slower than the velocity of the satellite.

Figure 20:
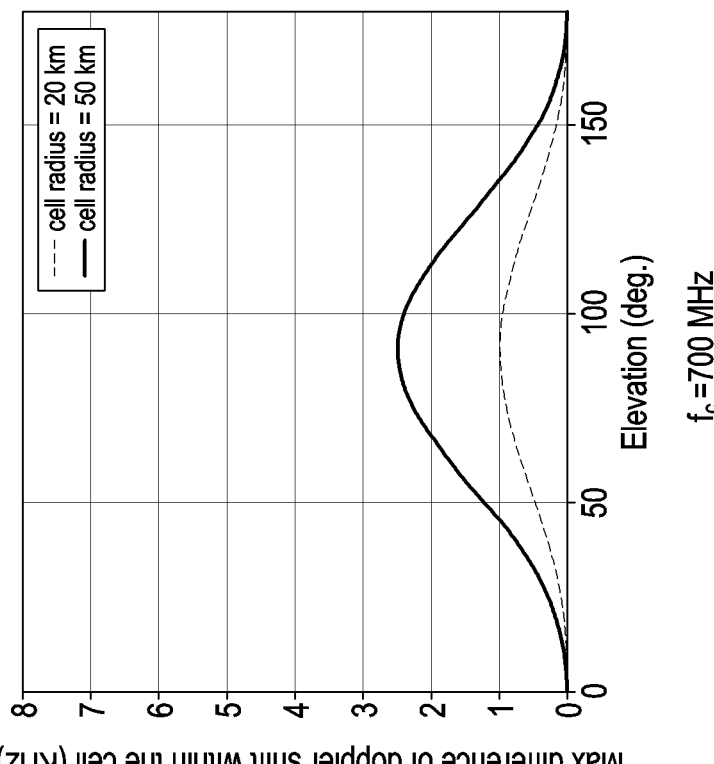
FIG. 20 is a view illustrating a difference in Doppler shift occurring within one beam according to the position of a satellite determined from the elevation angle.
Figure 20:
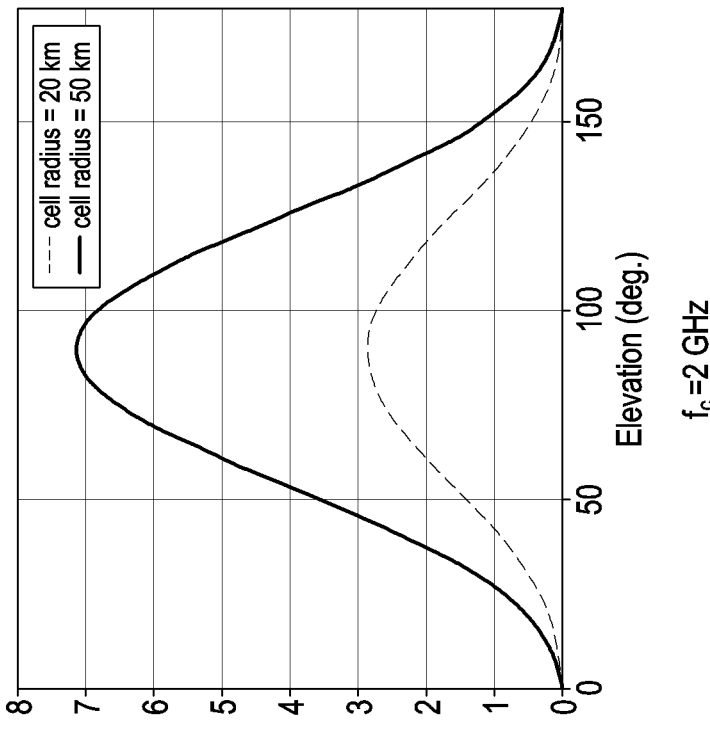

FIG. 20 is a view illustrating a difference in Doppler shift occurring within one beam according to the position of a satellite determined from the elevation angle. When the satellite is positioned directly above the beam, that is, when the elevation angle is 90 degrees, it may be seen that the difference in Doppler shift within the beam (or cell) is greatest. This may be because when the satellite is above the center, the Doppler shift values at one end of the beam and at the other end have positive and negative values, respectively.

Meanwhile, in satellite communication, a large delay occurs as compared to terrestrial network communication because the satellite is far from the user on the ground.

Figure 21:
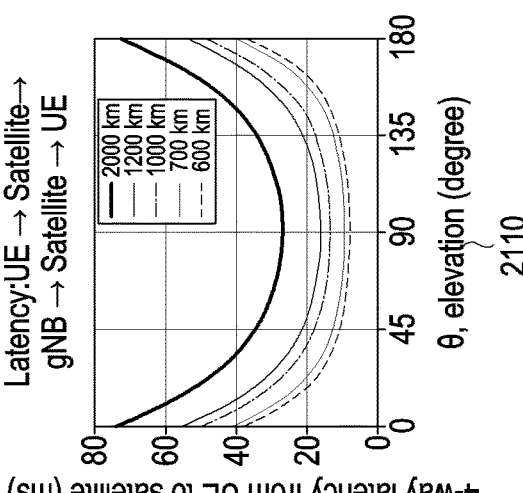
FIG. 21 is a view illustrating the delay from a UE to a satellite and the round trip delay between the UE, satellite, and the base station according to the position of the satellite determined according to the elevation angle.
Figure 21:
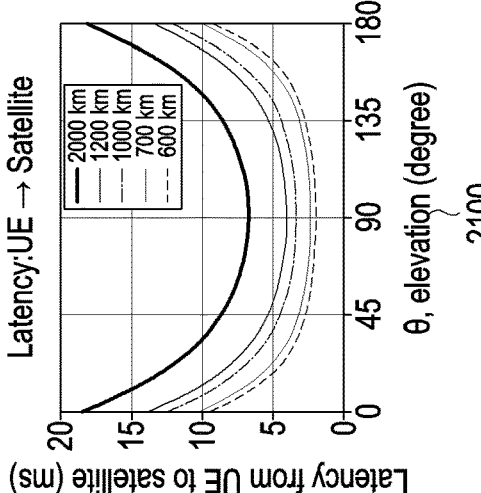
Figure 21:
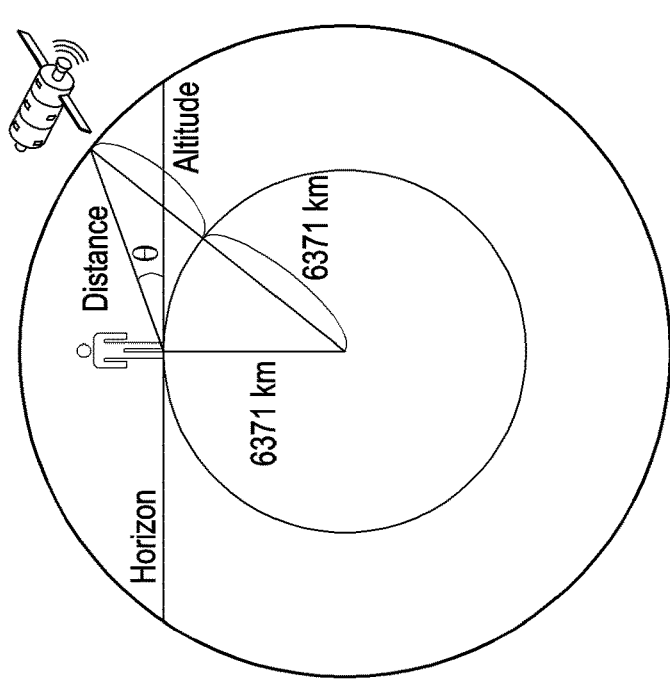

FIG. 21 is a view illustrating the delay from a UE to a satellite and the round trip delay between the UE, satellite, and the base station according to the position of the satellite determined according to the elevation angle. Referring to FIG. 21, reference numeral 2100 denotes the delay taken from the UE to the satellite, and reference numeral 2110 denotes the round trip delay between the UE-satellite-base station. In this case, it was assumed that the delay between the satellite and the base station is equal to the delay between the UE and the satellite.

Figure 22:
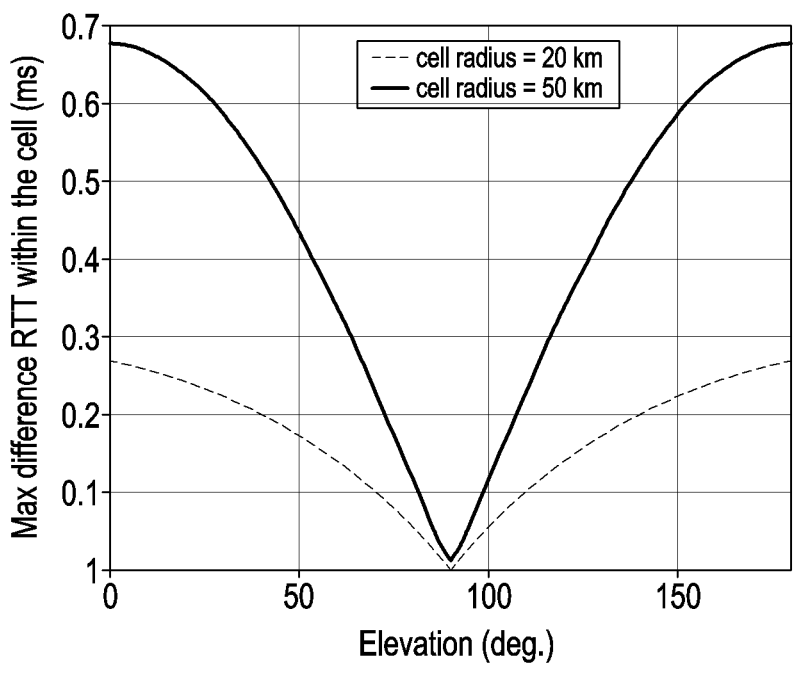
FIG. 22 is a view illustrating a maximum difference value of a round trip delay that varies depending on the user's position within one beam.

FIG. 22 is a view illustrating a maximum difference value of a round trip delay that varies depending on the user's position within one beam. For example, when the beam radius (or cell radius) is 20 km, it may be seen that the differences in the round trip delay to the satellite, differently experienced by UEs in different positions in the beam depending on the position of the satellite is about 0.28 ms or less.

In satellite communication, when the UE transmits and receives a signal to and from the base station, the signal may be transferred through the satellite. In other words, in the downlink the satellite receives the signal transmitted by the base station to the satellite and then transfers it to the UE, and in the uplink, the satellite receives the signal transmitted by the UE and then transfers it to the base station. In the above, after receiving the signal, the satellite may transfer the signal after only performing a frequency shift or may transfer the signal after performing signal processing, such as decoding and re-encoding.

In LTE or NR, the UE may access the base station through the following procedure.

Step 1: The UE receives a synchronization signal from the base station. The synchronization signal may include a primary synchronization signal (PSS), a secondary synchronization signal (SSS), and a physical broadcast channel (PBCH). The synchronization signal may include information, such as the slot boundary of the signal transmitted by the base station, the frame number, downlink, and uplink configuration. Further, the UE may figure out the subcarrier offset and scheduling information for system information transmission.

Step 2: The UE receives system information (system information block: SIB) from the base station. The SIB may include information for performing initial access and random access.

Step 3: A random access preamble is transmitted in the random access resource set in step 2. The preambles may be signals determined based on the information set in step 2 by using a predetermined sequence. The base station receives the preamble transmitted by the UE. The base station may attempt to receive the preamble set in the resource set by the base station itself, without knowing which UE has sent the preamble and, if the reception succeeds, the base station may know that at least one UE has sent the preamble.

Figure 23:
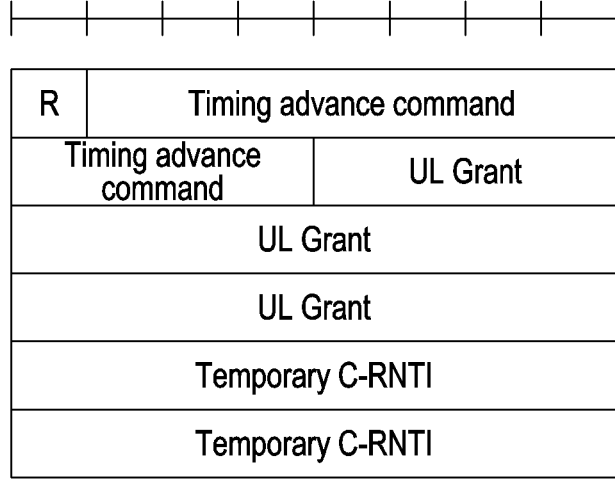
FIG. 23 is a view illustrating an example of an information structure of a random access response (RAR)

Step 4: Upon receiving the preamble in step 3, the base station transmits a random access response (RAR) in response thereto. The UE that has transmitted the random access preamble in step 3 may try to receive the RAR transmitted by the base station in this step. The RAR is transmitted in a PDSCH, and a PDCCH for scheduling the same is transmitted together or previously. The DCI for scheduling the RAR adds the CRC scrambled with a value called the RA-RNTI and channel-coded, and then mapped to the PDCCH and transmitted. The RA-RNTI may be determined based on the time and frequency resources in which the preamble is transmitted in step 3. The maximum time limit until the UE, which has transmitted the random access preamble in step 3, receives the RAR in this step may be set in the SIB transmitted in step 2. This may be set to be limited up to 10 ms or 40 ms. In other words, if the RAR is not transmitted within the time determined based on, e.g., 10 ms, which is the set maximum time, the UE that has transmitted the preamble in step 3 may transmit a preamble again. The RAR may include scheduling information for allocating resources of the signal transmitted by the UE in step 5, which is the next step. FIG. 23 is a view illustrating an example of an information structure of an RAR. Information about the timing advance (TA) to be applied by the UE and a temporary C-RNTI value to be used from the next step may also be included.

Step 5: The UE which receives the RAR in step 4 transmits message 3 (msg3) to the base station according to the scheduling information included in the RAR. In the above, the random access preamble may be referred to as message 1, and the RAR may be referred to as message 2. The UE may include its unique ID in msg3 and transmit it. The base station may attempt to receive msg3 according to the information the base station itself has scheduled in step 4.

Step 6: The base station receives msg3, identifies the ID information about the UE, and then generates message 4 including the information and transmits it to the UE. The UE having transmitted msg3 in step 5 may thereafter attempt to receive msg4 to be transmitted in step 6. The UE receiving msg4 may compare the ID value included after decoding with the ID value the UE itself has transmitted in step 5 to identify whether msg3 transmitted from the UE is received by the base station. The time from transmission of msg3 by the UE in step 5 to reception of msg4 in this step may also be limited, and the maximum time may be set from the SIB in step 2.

When the initial access procedure using the above steps is applied to satellite communication, propagation delay required in satellite communication may become a problem. For example, the period (random access window) during which the UE transmits a random access preamble (or PRACH preamble) in step 3 and may receive an RAR in step 4, i.e., the maximum time taken until the RAR may be received may be set through ra-ResponseWindow, and in conventional LTE or 5G NR, up to 10 ms may be set.

Figures 24, 25:
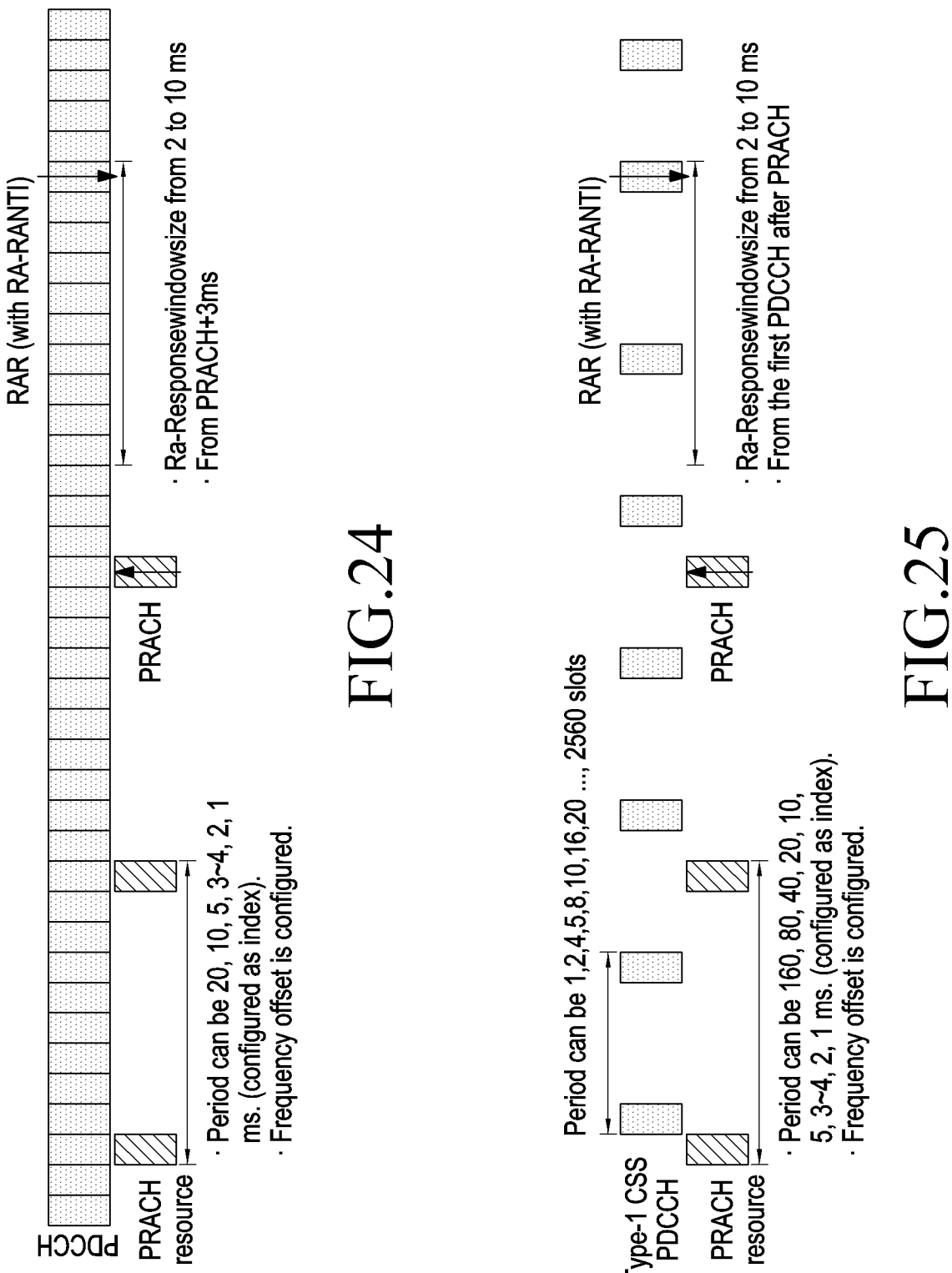
FIG. 24 is a view illustrating an example of a relationship between a PRACH preamble configuration resource of an LTE system and a RAR reception time.
FIG. 25 is a view illustrating an example of a relationship between a PRACH preamble configuration resource of a 5G NR system and an RAR reception time.

FIG. 24 is a view illustrating an example of a relationship between a PRACH preamble configuration resource of an LTE system and a RAR reception time, and FIG. 25 is a view illustrating an example of a relationship between a PRACH preamble configuration resource of a 5G NR system and an RAR reception time. In LTE, the random access window starts 3 ms after transmitting the PRACH (random access preamble) and, in NR, the random access window starts from the control information region for RAR scheduling which first appears after transmitting the PRACH (random access preamble).

As an example, a TA for uplink transmission timing in the 5G NR system may be determined as follows. First, $T_c=1/(\Delta f_{max}\cdot N_f)$ is determined, where $\Delta f_{max}=480\cdot 10^3$ Hz and $N_f=4096$. Further $\kappa=T_s/T_c=64$ and $T_s=1/(\Delta f_{ref}\cdot N_{f,ref})$, $\Delta f_{ref}=15\cdot 10^3$ Hz, $N_{f,ref}=2048$ may be defined.

Figures 26, 27:
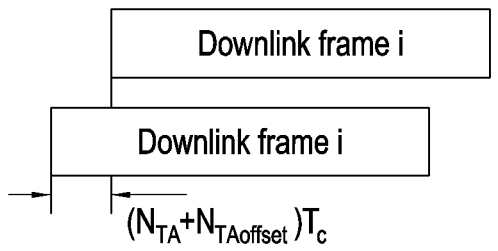
FIG. 26 is a view illustrating an example of a downlink frame and uplink frame timing in a UE.
FIG. 27 is a view illustrating link characteristics for each altitude of a low earth orbit satellite.

FIG. 26 is a view illustrating an example of a downlink frame and uplink frame timing in a UE. The UE may bring the uplink frame forward by $T_{TA}=(N_{TA}+N_{TA,offset})T_c$ from the downlink frame time and perform uplink transmission. In the above, $N_{TA}$ may be transferred from the RAR or be determined based on the MAC CE. $N_{TA,offset}$ may be a value set to the UE or determined based on a predetermined value.

In 5G NR system, the RAR may indicate $T_A$ and, in this case, $T_A$ may indicate one of 0, 1, 2, . . . , 3846. In this case, if the subcarrier spacing (SCS) of the RAR is $2^\mu\cdot 15$ kHz, $N_{TA}$ is determined as $N_{TA}=T_A\cdot 16\cdot 64/2^\mu$. After the UE finishes the random access process, the UE may receive a changed TA value from the base station and it may be indicated through, e.g., the MAC CE. In this case, $T_A$ may indicate one of 0, 1, 2, . . . , 63, and it may be added to or subtracted from the existing TA value to be used to calculate a new TA and the TA value may newly be calculated as $N_{TA\_new}=N_{TA\_old}+(T_A-31)\cdot 16\Gamma/2^\mu$. The so indicated TA value may be applied to uplink transmission by the UE after a certain time.

In UE-satellite direct communication, since the distances between the UE-satellite and between the satellite-base station are long and the satellite moves continuously, a time and frequency offset occurs when the signal transmitted by the base station or the UE is received by the UE or the base station. Accordingly, the disclosure provides a method and device for estimating the time and frequency offset and indicating the estimated value to perform correction.

According to an embodiment of the disclosure, the base station (or an device or a network entity) may estimate frequency offset information based on the PRACH preamble transmitted by the user equipment (UE).

FIG. 27 is a view illustrating link characteristics for each altitude of a low earth orbit satellite.

Mobile communications using satellites may provide an alternative to terrestrial cellular networks in that a single satellite may provide the same coverage area as is provided by thousands of terrestrial base stations. Additionally, terminal-satellite direct communication (TSDC) are becoming increasingly attractive as the cost of launching satellites into orbit sharply declines.

It may be implemented with geostationary earth orbit (GEO) or low earth orbit (LEO) satellites. The GEO satellite communication platform may provide wide coverage with a few satellites. However, due to the altitude of the GEO satellite, that is, 35,786 km, large delay and path loss are unavoidable, and thus the service quality may be degraded. LEO satellites, on the other hand, have altitudes of up to 2,000 km and have much less delay and path loss. As compared to GEO satellites, the LEO satellites have the disadvantages that more satellites are required for the same coverage and the signal is exposed to severe Doppler shift due to the high-velocity orbital movement of LEO satellites (e.g., about 7 km/sec).

TSDC is not a new concept, and commercial systems, such as Iridium, have been in use since the late 90s. TSDC has been in use for over 20 years, but has not been commercially successful due to its bulky UE size and limited data rates. The main issue is whether TSDC may be applied to 5G commercial UEs at reasonable data rates without sacrificing form factor. Further, an enhanced NR technique to overcome the Doppler shift for the LEO satellite link may be proposed.

The achievable throughput in a satellite link may be determined using link budget analysis for satellite altitudes of 780 km, 1,200 km and 2,000 km, as shown in FIG. 27. Channel models and assumptions for the satellite and UE may be predetermined. Downlink and uplink transmit power, that is, effective isotropic radiated power (EIRP), may be assumed to be 84.78 dBm and 23 dBm, respectively.

As compared to the terrestrial link of a cellular system, the path loss of a satellite link is much more severe due to its greater distance, and other satellite-specific attenuation factors, such as atmospheric loss (0.7 dB) and glare loss (2.2 dB), may exist. It may also be assumed that there is interference in both the downlink and the uplink due to simultaneous transmission and reception via different spot beams.

Figure 28:
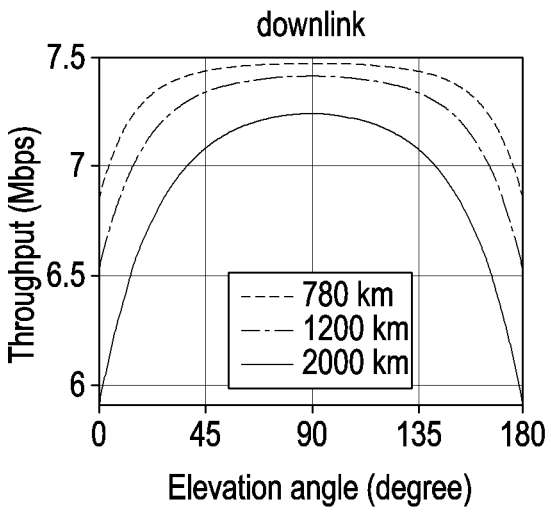
FIG. 28 illustrates a UL/DL throughput for each elevation angle at each elevation of a low earth orbit satellite.
Figure 28:
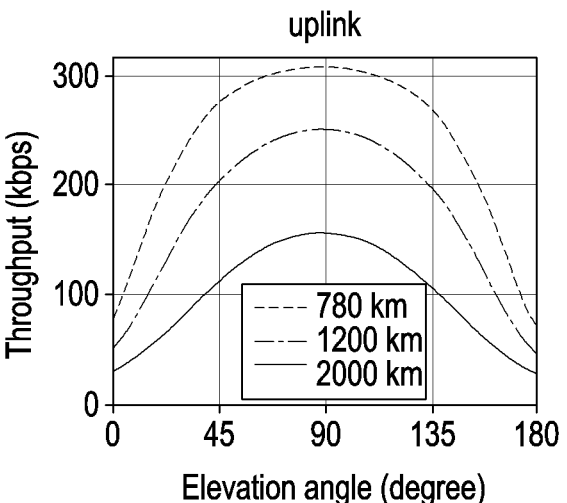

FIG. 28 illustrates a UL/DL throughput for each elevation angle at each elevation of a low earth orbit satellite.

As the altitude of the satellite increases, the free space path loss (FSPL) may increase. FIG. 27 assumes an elevation angle of 30 degrees. FIG. 28 illustrates the expected throughput of DL and UL according to the elevation angle. When the elevation angle approaches 0 degrees or 180 degrees, that is, when the satellite is seen near the horizon of the UE, the distance between the satellite and the UE increases, reducing the expected throughput.

The results of FIGS. 27 and 28 indicate that the NR-based TSDC may support an intermediate data rate sufficient for voice calls with an uplink transmit power of 23 dBm implemented in a typical 5G UE.

The delay from the UE to the ground station via the satellite may vary depending on the relative positions of the UE, the satellite (altitude and elevation angle) and the ground station. The distance between the UE and the satellite varies depending on the elevation angle seen from the UE, and the delay from the satellite to the ground station may vary depending on the location of the ground station. For example, considering the worst case scenario of the ground station location, the round trip time between the UE and the ground station may be expected to be up to 70 ms.

A delay of 70 ms as round-trip time between the UE and the ground station is not very serious considering the QoS requirements for applications, such as 100 ms for voice calls, but may be problematic in some areas of the NR radio interface. However, this is a random access procedure and may be addressed by implementing a scheduler. Base station. Therefore, in the delay range, release-15 NR-based TSDC may provide excellent voice service quality.

Figure 29:
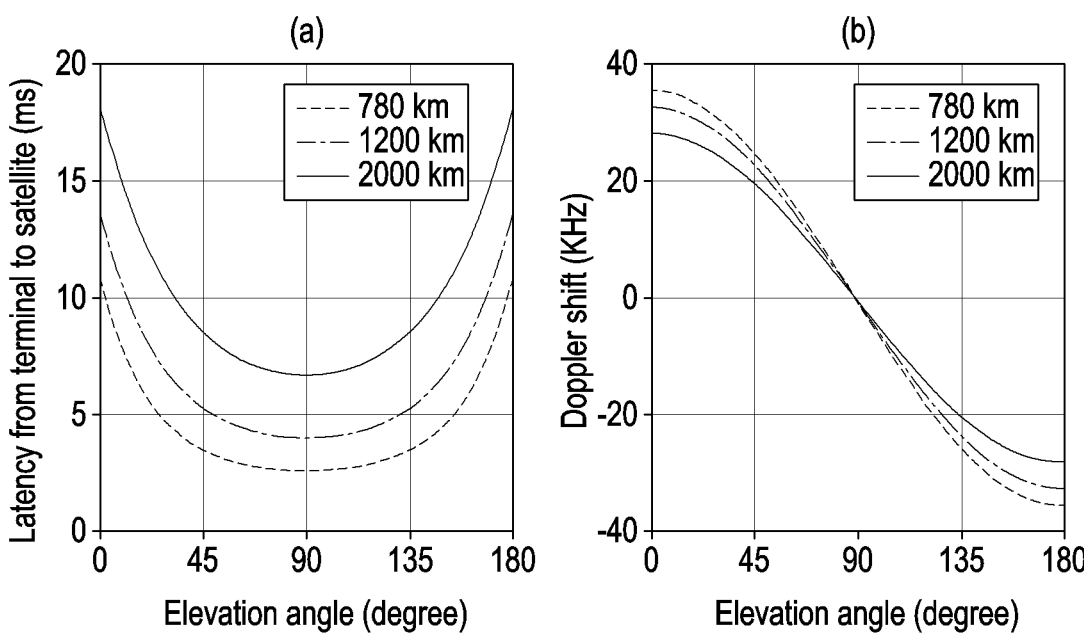
FIG. 29 illustrates the delay and Doppler shift for the elevation angle at each elevation of a low earth orbit satellite.

FIG. 29 illustrates the delay and Doppler shift for the elevation angle at each elevation of a low earth orbit satellite. (a) of FIG. 29 illustrates the delays from the UE to the satellite at the altitudes of 780 km, 1,200 km, and 2,000 km of the low earth orbit satellite, and (a) of FIG. 29 illustrates Doppler shifts at altitudes of 780 km, 1,200 km, and 2,000 km, respectively, of the low earth orbit satellite.

According to an embodiment of the disclosure, there may be provided a method for estimating and compensating for the frequency offset based on NR PRACH PREAMBLE.

After receiving synchronization signals and system information to perform downlink synchronization, the UE may transmit a PRACH preamble, as the first signal, to the base station for a random access procedure.

In 5G NR, the Zadoff-Chu sequence is used in a physical random access channel (PRACH) preamble $x_{u,v}(n)$, and it is given as follows.

$$x_{u,v}(n) = x_u((n + C_v) \bmod L_{RA}), \qquad \text{[Equation 5]}$$

$$x_u(i) = e^{-j\frac{\pi u i(i+1)}{L_{RA}}}, \quad i = 0, 1, \ldots, L_{RA} - 1$$

Here, the length of the PRACH preamble $L_{RA}$ may be $L_{RA}=839$ or $L_{RA}=139$, and u may denote the sequence number determined by a logical root sequence.

The preamble may be transmitted using OFDM with subcarrier spacing $\Delta f_{RA}$, where $\Delta f_{RA}=1.25$ kHz or 5 kHz for $L_{RA}=839$ or kHz for $L_{RA}=839$ with $\mu=0,1,2,3$. The continuous time signal s(t) of PRACH preamble $x_{u,v}(n)$ may be modeled as follows.

$$s(t) = \sum_{k=0}^{L_{RA}-1} \beta y_{u,v}(k) e^{j2\pi k \Delta f_{RA} t} \qquad \text{[Equation 6]}$$

Here, $y_{u,v}(k)$ denotes the discrete Fourier transform of $x_{u,v}(n)$, i.e., $$y_{u,v}(k) = \sum_{n=0}^{L_{RA}-1} x_{u,v}(n) e^{-j\frac{2\pi mn}{L_{RA}}},$$

and β may be given depending on the transmit power.

Under the frequency-flat channel assumption to simplify the signal model and Doppler shift $\Delta f_D$, the reception signal r(t) may be modeled as follows.

$$r(t) = \sum_{k=0}^{L_{RA}-1} h\beta y_{u,v}(k) e^{j2\pi(k\Delta f_{RA}+\Delta f_D)t} + w(t) \qquad \text{[Equation 7]}$$

Here, h denotes the channel coefficient, and w(t) denotes AWGN.

After sampling r(t) with velocity $L_{RA}\Delta f_{RA}$, the reception signal sample r(m) may be given as follows.

$$r(m) = h\beta L_{RA} x_{u,v}(m) e^{j2\pi \frac{m\Delta f_D}{L_{RA}\Delta f_{RA}}} + w(m) \qquad \text{[Equation 8]}$$

To simplify the derivation, a correlation may be derived without the noise sample w(m). The base station performs correlation of the received sample r(m) with PRACH preamble $x_{u,v}(n)$. Here, the correlation c(k) between r(m) and $x_{u,v}(n)$ may be given as follows.

$$C(k) = \sum_{k=0}^{L_{RA}-1} r(m) x_{u,v}^*(m+k) \qquad \text{[Equation 9]}$$

Here, A* denotes the complex conjugate of the complex number A.

By Equation 8, the correlation c(k) may be derived as follows.

$$C(k) = \alpha \frac{\sin\left(\pi X_u^{\Delta f_D}\right)}{\sin\left(\pi X_u^{\Delta f_D}/L_{RA}\right)} e^{j\frac{\pi Z}{L_{RA}}} \quad \text{[Equation 10]}$$

Here, $$\alpha = h\beta L_{RA}, \ X_{u,k}^{\Delta f_D} = uk + \frac{\Delta f_D}{\Delta f_{RA}},$$

$$Z = uk(k+1+2C_v) + (L_{RA}-1)X_{u,k}^{\Delta f_D}$$

Therefore, the magnitude of the correlation c(k) may be given as follows.

$$|C(k)| = \alpha \frac{\sin\left(\pi X_{u,k}^{\Delta f_D}\right)}{\sin\left(\pi X_{u,k}^{\Delta f_D}/L_{RA}\right)}. \quad \text{[Equation 11]}$$

The positions of the first and second largest peaks of $|C(k)|$ may be $k=k_1$ and $k=k_2$.

$$k_1 = -q(N+1) \bmod L_{RA} \text{ and } k_2 = -qN \bmod L_{RA} \quad \text{[Equation 12]}$$

Here, q is the multiplicative inverse of u for the mod $L_{RA}$ operation. q may be represented as the multiplicative inverse of u for modulo $L_{RA}$ and be the smallest non-negative integer that meets qu mod $L_{RA}=1$. From Equation 12, N=−qk₂ mod $L_{RA}$ may be found. Further, if a>½, then $k_{peak}=k_1$, and if a≤1, $k_{peak}=k_2$.

By Equation 9 and qu mod $L_{RA}=1$, the ratio of $|C(k_1)|$ ⨌ $|C(k_2)|$, i.e., ρ, may be derived as follows.

$$\rho = \frac{|C(k_1)|}{|C(k_2)|} = \frac{e^{j\frac{\pi a}{L_{RA}}} - e^{-j\frac{\pi a}{L_{RA}}}}{e^{j\frac{\pi(1-a)}{L_{RA}}} - e^{-j\frac{\pi(1-a)}{L_{RA}}}} \quad \text{[Equation 13]}$$

By Equation 10, it may be derived as follows.

$$a = \frac{L_{RA}}{2\pi}\cos^{-1}\left(\text{Re}\left\{\frac{1+\rho e^{j\frac{\pi}{L_{RA}}}}{1-\rho e^{-j\frac{\pi}{L_{RA}}}}\right\}\right) \quad \text{[Equation 14]}$$

After performing the correlation with the known preamble, the base station may estimate N and a by Equations 12 and 14. This means that the base station may estimate the frequency offset from the given UE by using the PRACH preamble.

Figure 30:
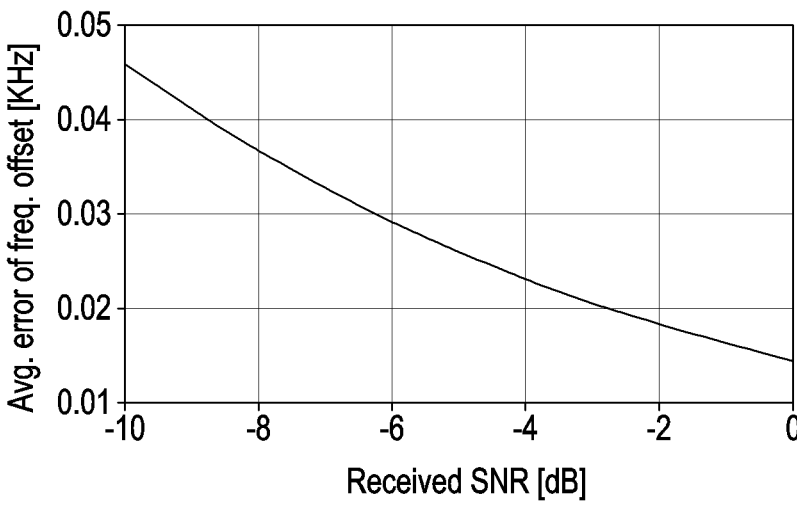
FIG. 30 illustrates a frequency offset average error for a received SNR.

FIG. 30 illustrates a frequency offset average error for a received SNR. Referring to FIG. 30, when $L_{RA}=839$, $\Delta f_D=3$ kHz, $C_v=2$, and μ=2, the average error numerical result of frequency offset estimation is shown. For NR enhancement, if the base station may transfer frequency offset information to the corresponding UE, the UE may previously compensate for the frequency offset for UL transmission.

Based on the above description, the base station (or network entity) may estimate the frequency offset through the following process.

That is, the base station may obtain (or determine) a correlation value (c(k) in Equation 8), determine that the k value with the largest correlation is k_1st and the k value with the second largest correlation is k_2 nd, and the base station may obtain (or determine) k_1st and k_2 nd.

Here, if k_1st−k_2 nd=−q mod $L_{RA}$, then k1=k_1st, and k2=k_2nd. In the disclosure, A mod B is the remainder of dividing A by B, and the A mod B value is larger than or equal to 0 and smaller than B.

If k_2 nd−k_1st=−q mod $L_{RA}$, k_1=k_2nd, and k2=k_1st.

In the above-described process, the base station may figure out $k_1$, $k_2$, and ρ.

The base station may figure out N using $k_2$ and N=−qk₂ mod $L_{RA}$.

a may be known by using ρ and $$a = \frac{L_{RA}}{2\pi}\cos^{-1}\left(\text{Re}\left\{\frac{1+\rho e^{j\frac{\pi}{L_{RA}}}}{1-\rho e^{-j\frac{\pi}{L_{RA}}}}\right\}\right).$$

Now that the frequency offset is N+a, the base station may figure out the frequency offset using N and a. Here, N is an integer, and a is a decimal between 0 and 1.

In the above description, the base station estimates based on the PRACH transmitted by the UE, but the above-described process may be applied as performed by the UE.

The base station indicates the frequency offset information, which the base station has obtained through the above-described process, to the UE, and the UE may correct the frequency by the offset using the offset information indicated according to methods 1 to 10 below and perform downlink or uplink signal transmission/reception.

Figure 31:
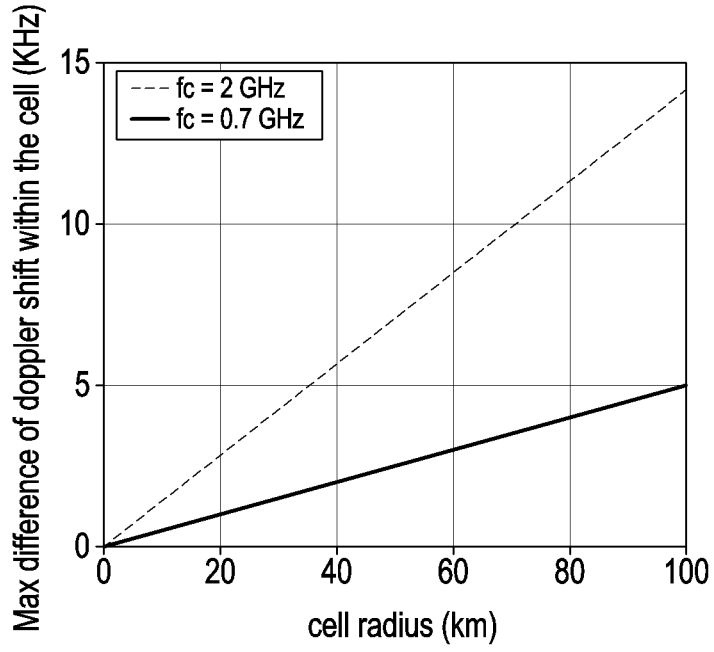
FIG. 31 illustrates a maximum Doppler shift difference according to the cell size and center frequency.
Figure 32:
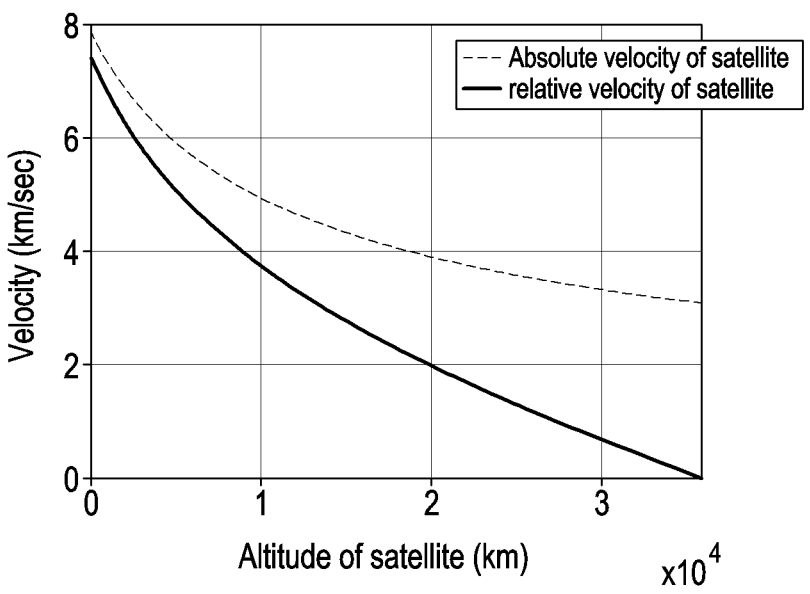
FIG. 32 is a view illustrating the absolute velocity at which a satellite orbits the earth and a relative velocity between the satellite and an object stationary on the ground.

FIG. 31 illustrates a maximum Doppler shift difference according to the cell size and center frequency. FIG. 32 is a view illustrating the absolute velocity at which a satellite orbits the earth and a relative velocity between the satellite and an object stationary on the ground.

Method 1: The unit of the frequency offset may be determined based on the frequency domain or frequency band (spectrum). FIG. 31 is a view illustrating the maximum Doppler shift difference experienced by different UEs within one beam according to the size and center frequency (fc) of the beam (or cell) when the satellite altitude is 700 km. For example, if the beam (or cell) radius provided by the satellite is 100 km, at a center frequency of 2 GHz, two UEs in the beam may experience a Doppler shift difference of up to about 15 kHz. This may mean that the base station should differently correct a frequency offset of about 15 kHz between different UEs in uplink transmission. In the case where the beam (or cell) radius provided by a satellite is 100 km, at a center frequency of 700 MHz, two UEs in the beam may experience a Doppler shift difference of up to about 5 kHz. This may mean that the base station should differently correct a frequency offset of about 5 kHz between different UEs in uplink transmission. Therefore, as an example, in the frequency domain of 1 GHz or less, the indication unit may be 5/(2^12) kHz, that is, 1.2207 Hz and, in the frequency domain of more than 1 GHz and not more than 2 GHz, the indication unit may be, e.g., 15/(2^12) kHz, that is, 3.6621 Hz. This assumes that the frequency offset indication consists of 12 bits, and may be applied to other numbers of bits. In this case, if an N-bit indication is used, the offset may be indicated in units of 5/(2^N) kHz. FIG. 32 illustrates the absolute velocity at which a satellite orbits the earth and a relative velocity between the satellite and an object stationary on the ground. Since the earth is rotating on its own, even a stationary object on the earth's ground may be said to be in motion, so the absolute velocity of the satellite and the relative velocity of the satellite-earth may be different. The velocity of the satellite may be such that the effects of centrifugal force and gravity are equal to each other to keep the satellite at its altitude. Thus, the velocity is determined by the altitude of the satellite. FIG. 31 is a result derived by the absolute velocity of the satellite but, based on the relative velocity of the satellite, the Doppler shift may be calculated as shown in FIG. 32. The Doppler shift may be calculated based on a combination of one or more of the altitude and position of the satellite, the position of the UE, or the elevation angles of the UE and the satellite, and the velocity of the UE. The relative velocity of the satellite may be calculated by subtracting the angular velocity of the earth's rotation from the angular velocity at which the satellite orbits the earth.

Method 2: The indication unit of the frequency offset may be varied depending on the subcarrier spacing used between the UE and the satellite. For example, if a frequency offset of 1 kHz occurs when using a subcarrier spacing of 15 kHz is used and when a subcarrier spacing of 60 kHz is used, the effects of the offset will be different, and the effect of using a subcarrier spacing of 60 kHz will be much less. Therefore, the indication unit of the frequency offset may be determined to be (subcarrier spacing)/(2^12) kHz or $$\frac{15 \times 2^{\mu}}{2^{12}}.$$

In the above, μ may be a value meaning the 15×2^μ kHz subcarrier spacing, such as, for 15 kHz, μ=0, for 30 kHz, μ=1, for 60 kHz, μ=2, for 120 kHz, μ=3, and for 240 kHz, μ=4.

Method 3: This is a method for indicating the change rate of the frequency offset. The satellite moves regularly with time, and in a specific time period, the frequency offset may be linearly changed. Accordingly, the base station may indicate the change rate of the frequency offset to the UE to indicate how the UE is to change and apply the frequency offset in the future. The change rate of the frequency offset may be a variation in the frequency offset to be applied at a specific future time. While indicating the change rate of the frequency offset, the base station may previously or together with it indicate the time period and time at which the frequency offset change rate is to be applied, with control information, or set it by higher signaling. In the above, the higher signaling may be MAC CE or RRC signaling rather than a physical layer signal.

Method 4: In the random access process, it is indicated in the RAR in the 4-step random access or msg B in the 2-step random access. In the 2-step random access process, the UE sends msg A to the base station, and the base station receives msg A and then transmits msg B to the UE. In this method, msg B indicates frequency offset information.

Method 5: After the UE gains access, it is included and indicated in the MAC CE.

Method 6: It is indicated through downlink control information (DCI).

Figure 33:
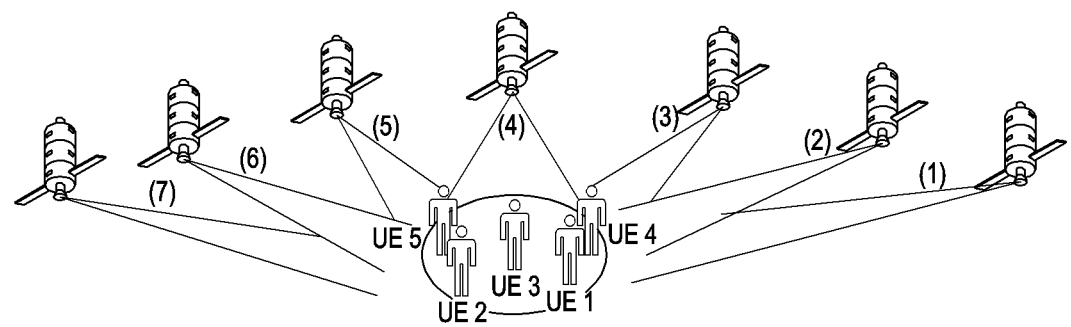
FIG. 33 illustrates an example in which a change occurs in the frequency offset due to the Doppler effect or a delay during UE-satellite communication depending on a change in the position of the satellite.
Figure 34:
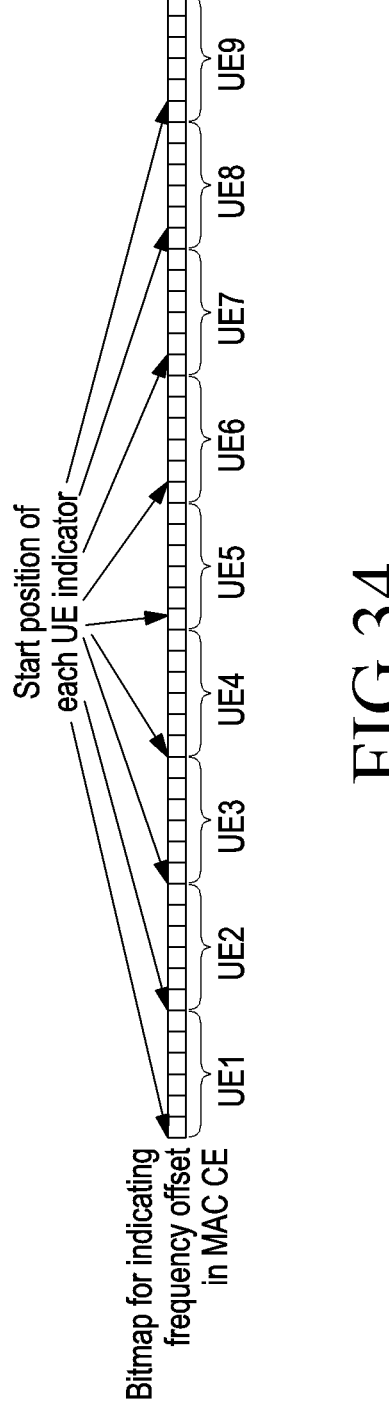
FIG. 34 illustrates an example of indicating a frequency offset using a MAC CE in group units.

FIG. 33 illustrates an example in which a change occurs in the frequency offset due to the Doppler effect or a delay during UE-satellite communication depending on a change in the position of the satellite. FIG. 34 illustrates an example of indicating a frequency offset using a MAC CE in group units.

Method 7: It is indicated in the same DCI or the same MAC to one or more UEs on a group-common basis. In this method, it may be indicated to one or more UEs through the same indication information field. Or, the frequency offset or frequency offset change rate may be indicated to each UE with a different indication information field. When it is indicated to different UEs through different indication information fields, the position of the bit field or the offset value of the bit field position which should be interpreted by the UEs may previously be set. FIG. 33 is a view illustrating an example in which the position of the satellite is varied over time so that the frequency offset due to the Doppler effect or delay experienced by the UE in UE-satellite communication is varied. In FIG. 33, assuming that the satellite orbits the earth in a counterclockwise direction, the satellite moves from position (1) to position (7). When the satellite is positioned at (1) and (7), the delay increases as the distance between the satellite and the UE increases, and the Doppler shift value also increases. The effect of the Doppler shift is also shown in FIG. 17. As shown in FIG. 33, since UEs located in one beam area provided by the satellite transmit and receive signals to and from the same satellite, change values of delay and Doppler shift may be similar. Therefore, the UEs UE1, UE2, UE3, UE4, and UE5 of FIG. 33 may perform time and frequency offset correction for delay and Doppler shift correction by the same indication information. FIG. 34 is a view illustrating an example in which frequency offset indication information to multiple UEs is included in one MAC CE when a frequency offset is indicated to one group by the same MAC CE on a group common basis. The start position of the frequency offset indicator for each UE may be preset through higher signaling. FIG. 34 is an example of indicating in the MAC CE on a group common basis, but may be to transmit similarly through DCI on a group basis. In other words, it may be an example in which the bit field of FIG. 34 is a part of DCI.

Method 8: A value to be beam-commonly applied in the system information may be indicated through the SIB. For example, the frequency offset f_offset may be calculated as f_offset1+f_offset2. In the above, f_offset1 may be a value commonly set or indicated to UEs belonging to the corresponding beam, and f_offset2 may be a value set or indicated to a specific UE.

Method 9: The unit of the frequency offset may be set to the corresponding UE through the RRC configuration. If the unit of the frequency offset is indicated through the RRC configuration, and the number of frequency offset units is indicated by the MAC CE or DCI, the UE may be able to calculate the correct frequency offset value along with the unit. As a variation, candidate values of the frequency offset unit may be indicated through the RRC configuration, and one of them may be precisely indicated by the MAC CE or DCI.

Method 10: The frequency offset value may be set to the corresponding UE through the RRC configuration. As another example, the frequency offset value may be transferred to the UE by a combination of RRC configuration and MAC CE.

One or more of methods 1 to 10 above may be combined and applied. For example, methods 1 and 5 may be combined to transfer the frequency offset information in the MAC CE according to the unit determined based on the frequency domain. For example, methods 1, 5, and 7 may be combined to transfer the frequency offset information having the unit determined based on the frequency domain to a plurality of UEs through the same MAC CE. For the MAC CE, the plurality of UEs may receive the same DCI and the same PDSCH, and the frequency offset information may be transferred to different UEs through different bit fields in the MAC CE.

If the base station transfers the frequency offset value information to the UE as in the above-described methods, the UE may shift the uplink center frequency by the received frequency offset value and perform uplink transmission. The time when the frequency offset is applied may be determined to be applied, a specific time after the offset value is transferred through the MAC CE or DCI.

Figure 35:
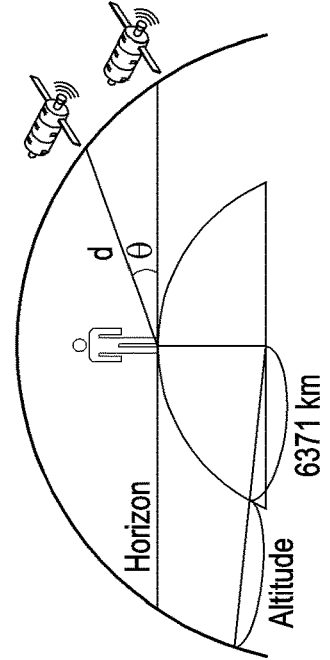
FIG. 35 is a view illustrating a difference in propagation delay in a terrestrial network and satellite network.

FIG. 35 is a view illustrating a difference in propagation delay in a terrestrial network and satellite network.

Referring to FIG. 35, the distance between the UE and the base station in the terrestrial network may be 100 km, and the distance between the UE and the low earth orbit satellite in the satellite network may be about 2000 km. When the satellite altitude is 700 km, the UE-satellite distance and UE-base station propagation delay according to the elevation angle may be changed.

Figure 36:
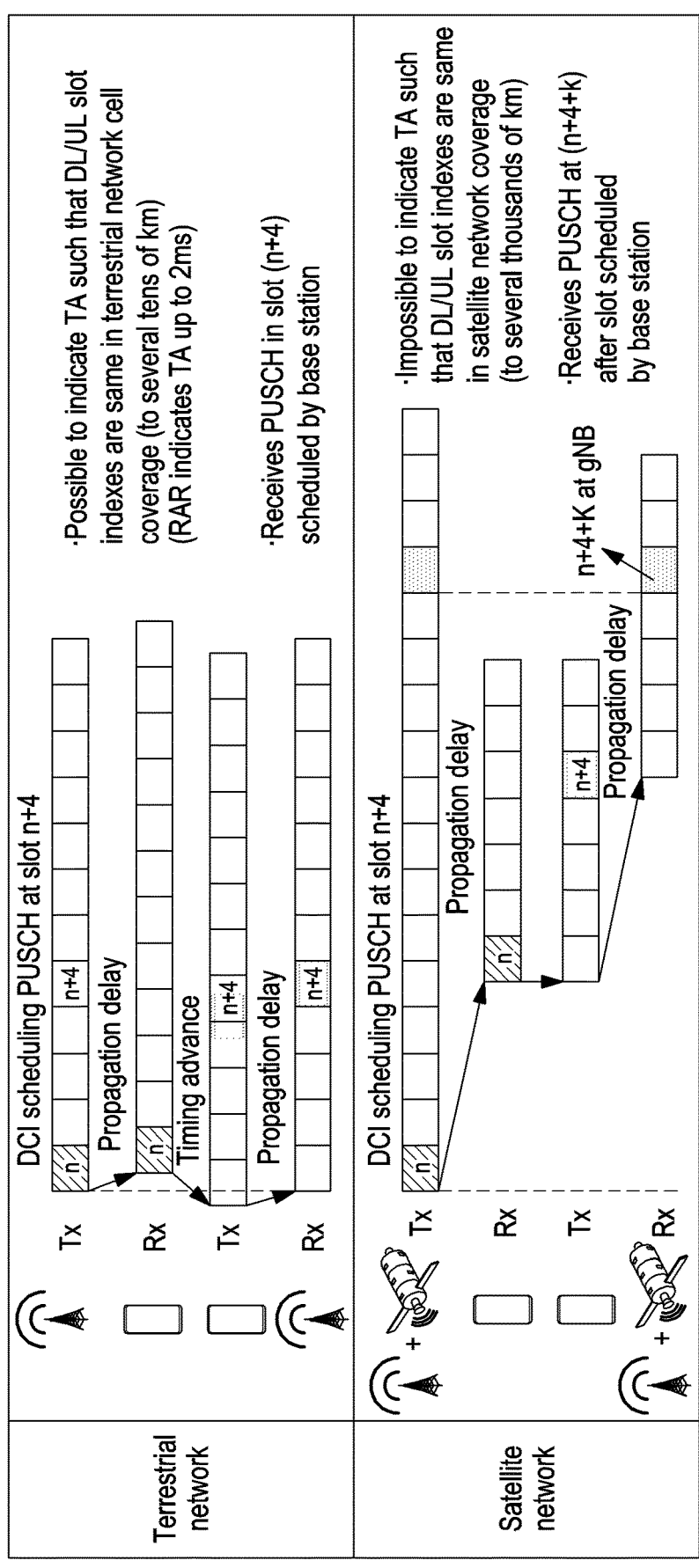
FIG. 36 is a view illustrating an example of applying a timing advance in a terrestrial network and satellite network.

FIG. 36 is a view illustrating an example of applying a timing advance in a terrestrial network and satellite network.

Referring to FIG. 36, in the terrestrial network cell coverage (up to several tens of km), the base station may indicate the timing advance so that the DL/UL slot indexes are the same. According to an embodiment, the base station may transmit a random access response (RAR) message indicating the timing advance to the UE. The base station may receive uplink data on the PUSCH in the scheduled slot n+4. Referring to FIG. 36, it is impossible to indicate the timing advance so that DL/UL slot indexes are the same in satellite network coverage (up to several thousand km). Accordingly, the base station may receive uplink data on the PUSCH at (n+4+k) after the scheduled slot.

Figure 37:
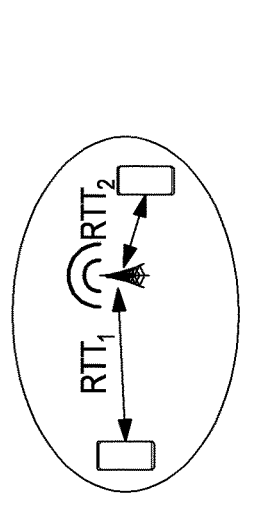
FIG. 37 is a view illustrating the maximum difference value among UE-satellite-base station round tryp propagation delay differences experienced by users when multiple users are located in one beam among several beams transmitted from a satellite.
Figure 37:
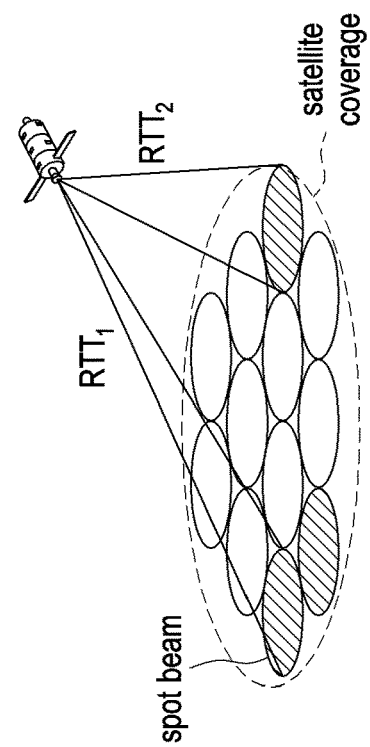

FIG. 37 is a view illustrating the maximum difference value among UE-satellite-base station round tryp propagation delay differences experienced by users when multiple users are located in one beam among several beams transmitted from a satellite.

Referring to FIG. 37, the maximum value among the differences in the round-trip propagation delay in the cell radius (10 km, 50 km, or 100 km) in the terrestrial network may be determined. When the satellite altitude is 700 km in the satellite network, the maximum value among the differences in the round trip propagation delay may be determined according to the beam diameter and the elevation angle.

Figure 38:
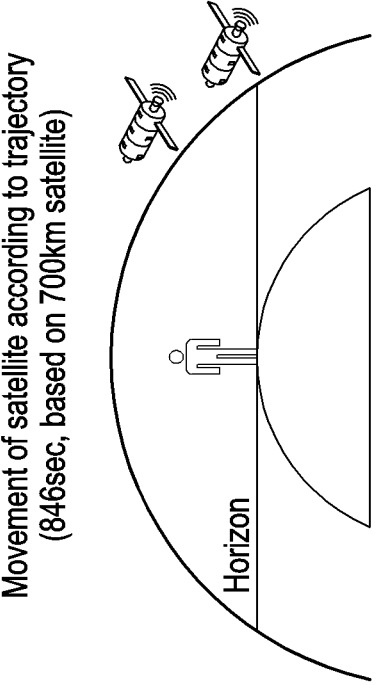
FIG. 38 is a view illustrating that the round-trip propagation delay between a UE and a base station changes over time because the satellite moves along the orbit.

FIG. 38 is a view illustrating that the round-trip propagation delay between a UE and a base station changes over time because the satellite moves along the orbit.

Referring to FIG. 38, when the satellite altitude is 700 km in the satellite network, the round trip propagation delay between the UE and the base station may be determined according to the elapsed time and the elevation angle.

It is also possible to configure by combining the embodiments of the examples provided above in the disclosure.

Figure 39:
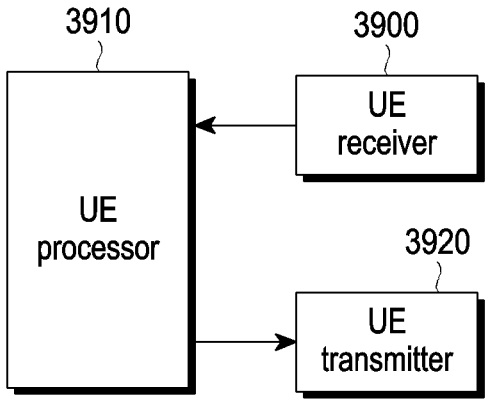
FIG. 39 is a block diagram illustrating an internal structure of a UE according to an embodiment of the disclosure.
Figure 40:
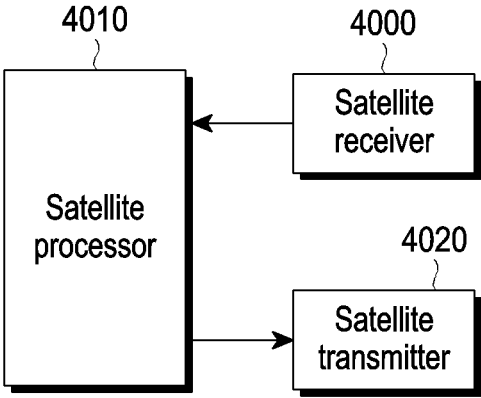
FIG. 40 is a block diagram illustrating an internal structure of a satellite according to an embodiment of the disclosure.
Figure 41:
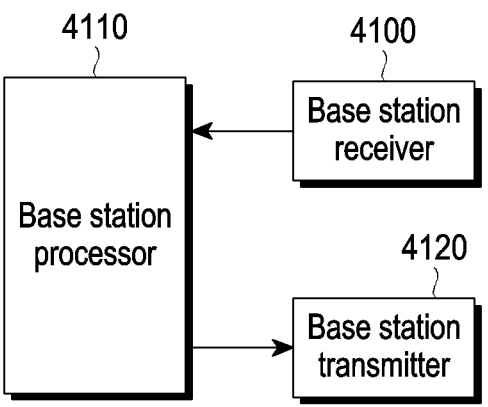
FIG. 41 is a block diagram illustrating an internal structure of a base station according to an embodiment of the disclosure.

FIGS. 39, 40, and 41 illustrate the respective transmitters, receivers, and processors of a UE, a satellite, and a base station, respectively, to perform the above-described embodiments of the disclosure. FIG. 39 is a block diagram illustrating an internal structure of a UE according to an embodiment of the disclosure.

Referring to FIG. 39, a UE according to the disclosure may include a UE receiver 3900, a UE transmitter 3920, and a UE processor 3910. The UE receiver 3900 and the UE transmitter 3920 may collectively be referred to as a transceiver in the embodiment of the disclosure. The UE processor 3910 may be referred to as a controller or a processor.

The transceiver may transmit or receive signals to/from the base station. The signals may include control information and data. To that end, the transceiver may include a radio frequency (RF) transmitter for frequency-up converting and amplifying signals transmitted and an RF receiver for low-noise amplifying signals received and frequency-down converting the frequency of the received signals. The transceiver may receive signals via a radio channel, output the signals to the UE processor 3910, and transmit signals output from the UE processor 3910 via a radio channel.

The UE processor 3910 may control a series of processes for the UE to be able to operate according to the above-described embodiments. For example, the UE receiver 3900 may receive a signal from a satellite or a terrestrial base station, and the UE processor 3910 may transmit and receive signals to and from the base station according to the method described in the disclosure. Thereafter, the UE transmitter 3920 may transmit a signal using the determined time point.

A UE receiving a frequency offset in a wireless communication system according to an embodiment of the disclosure may include a transceiver and a controller. The controller of the UE may control to transmit a physical random access channel (PRACH) preamble to the device and may control to receive, from the device, information about the frequency offset estimated based on at least one of a first peak value and a second peak value obtained through a correlation operation on the PRACH preamble. In an embodiment, the first peak value may be the largest value among the correlation values obtained through the correlation operation, and the second peak value may be the second largest value among the correlation values obtained through the correlation operation.

According to an embodiment, when communicating with the device through a satellite, the controller of the UE may control to transmit a signal whose frequency has been corrected by the frequency offset based on the information about the frequency offset to the device.

In an embodiment, the first peak value may be a value with the largest absolute value among the correlation values, and the second peak value may be a value with the second largest absolute value among the correlation values. According to an embodiment, the frequency offset may be calculated based on at least one of the first peak value and the second peak value and the length of the PRACH preamble.

According to an embodiment, the information about the frequency offset may include at least one of the frequency offset, the unit of the frequency offset, and the change rate of the frequency offset.

According to an embodiment, the controller of the UE may receive the information about the frequency offset through the medium access control control element (MAC CE) or radio resource control (RRC) signaling. According to another embodiment, the controller of the UE may receive the information about the frequency offset through downlink control information (DCI). According to another embodiment, the controller of the UE may receive the information about the frequency offset through a random access response (RAR) message or msg B.

FIG. 40 is a block diagram illustrating an internal structure of a satellite according to an embodiment of the disclosure.

Referring to FIG. 40, a satellite according to the disclosure may include a satellite receiver 4000, a satellite transmitter 4020, and a satellite processor 4010. In the above, there may be provided a plurality of transmitters, a plurality of receivers, and a plurality of processors. In other words, the satellite may include a receiver and a transmitter for transmission/reception with the UE and a receiver and a transmitter for transmission/reception with the base station. The satellite receiver 4000 and the satellite transmitter 4020 may collectively be referred to as a satellite transceiver in the embodiment of the disclosure. The satellite processor 4010 may be referred to as a controller or a processor.

The transceiver may transmit or receive signals to/from the UE and base station. The signals may include control information and data. To that end, the transceiver may include a radio frequency (RF) transmitter for frequency-up converting and amplifying signals transmitted and an RF receiver for low-noise amplifying signals received and frequency-down converting the frequency of the received signals. Further, the transceiver may receive signals via a radio channel, output the signals to the satellite processor 4010, and transmit signals output from the satellite processor 4010 via a radio channel.

The satellite processor 4010 may include a compensator (or pre-compensator) for correcting the frequency offset or Doppler shift and may include a device capable of tracking location from the GPS or the like. The satellite processor 4010 may include a frequency shift function capable of shifting the center frequency of the reception signal. The satellite processor 4010 may control a series of processes for the satellite, base station, and UE to be able to operate according to the above-described embodiments. For example, the satellite receiver 4000 may receive the PRACH preamble from the UE and may determine to transmit the information to the base station while transmitting a corresponding RAR back to the UE. Thereafter, the satellite transmitter 4020 may transmit corresponding signals at a determined time point.

A satellite for estimating a frequency offset in a wireless communication system according to an embodiment of the disclosure may include a transceiver and a controller connected to the transceiver to control the transceiver. The controller of the satellite may control to receive a first signal, control to receive a physical random access channel (PRACH) preamble from the user equipment (UE), obtain correlation values by performing a correlation operation based on the first signal and the PRACH preamble, identify a first peak value which is the largest among the correlation values and a second peak value which is the second largest among the correlation values, and estimate the frequency offset based on at least one of the first peak value and the second peak value.

According to an embodiment, the controller of the satellite may control to transmit a second signal obtained by correcting the frequency by the frequency offset to the UE during communication with the UE.

In an embodiment, the first peak value may be the largest value among the correlation values, and the second peak value may be the second largest value among the correlation values. According to an embodiment, the frequency offset may be calculated based on at least one of the first peak value and the second peak value and the length of the PRACH preamble.

FIG. 41 is a block diagram illustrating an internal structure of a base station according to an embodiment of the disclosure.

Referring to FIG. 41, a base station according to the disclosure may include a base station receiver 4100, a base station transmitter 4120, and a base station processor 4110. The base station may be a terrestrial base station or may be part of a satellite. The base station receiver 4100 and the base station transmitter 4120 may collectively be referred to as a transceiver in the embodiment of the disclosure. The base station processor 4110 may be referred to as a controller or a processor.

The transceiver may transmit or receive signals to/from the UE. The signals may include control information and data. To that end, the transceiver may include a radio frequency (RF) transmitter for frequency-up converting and amplifying signals transmitted and an RF receiver for low-noise amplifying signals received and frequency-down converting the frequency of the received signals. The transceiver may receive signals via a radio channel, output the signals to the base station processor 4110, and transmit signals output from the base station processor 4110 via a radio channel.

The base station processor 4110 may control a series of processes for the base station to be able to operate according to the above-described embodiments. For example, the base station processor 4110 may previously transmit an RAR according to the configuration information set on its own.

A base station for estimating a frequency offset in a wireless communication system according to an embodiment of the disclosure may include a transceiver and a controller connected to the transceiver to control the transceiver. The controller of the base station may control to receive a first signal, control to receive a physical random access channel (PRACH) preamble from the user equipment (UE), obtain correlation values by performing a correlation operation based on the first signal and the PRACH preamble, identify a first peak value which is the largest among the correlation values and a second peak value which is the second largest among the correlation values, and estimate the frequency offset based on at least one of the first peak value and the second peak value.

According to an embodiment, the controller of the base station may control to transmit a second signal obtained by correcting the frequency by the frequency offset to the UE during communication with the UE through the satellite.

In an embodiment, the first peak value may be the largest value among the correlation values, and the second peak value may be the second largest value among the correlation values. According to an embodiment, the frequency offset may be calculated based on at least one of the first peak value and the second peak value and the length of the PRACH preamble.

According to an embodiment, the controller of the base station may control to transmit at least one of the frequency offset, the unit of the frequency offset, and the change rate of the frequency offset to the UE through the medium access control control element (MAC CE) or radio resource control (RRC) signaling. According to another embodiment, the controller of the base station may control to transmit, to the UE, downlink control information (DCI) including at least one of the frequency offset, the unit of the frequency offset, and the change rate of the frequency offset. According to another embodiment, the controller of the base station may control to transmit, to the UE, a random access response (RAR) message or msg B including at least one of the frequency offset, the unit of the frequency offset, and the change rate of the frequency offset.

The embodiments herein are provided merely for better understanding of the present invention, and the present invention should not be limited thereto or thereby. In other words, it is apparent to one of ordinary skill in the art that various changes may be made thereto without departing from the scope of the present invention. Further, the embodiments may be practiced in combination. Further, the above-described embodiments may be changed or modified based on their technical spirit and applied to LTE systems or 5G systems.

The invention claimed is:

1. A method of a network entity in a wireless communication system, the method comprising:

receiving, from a user equipment (UE) via a satellite, a physical random access channel (PRACH) preamble;

obtaining, based on a correlation operation, correlation values for the PRACH preamble and identifying a first peak value that includes a largest value among the correlation values and a second peak value that includes a second largest value among the correlation values;

estimating a frequency offset based on the first peak value, the second peak value, and a length of the PRACH preamble; and transmitting, to the UE via the satellite, the frequency offset, a unit of the frequency offset, and a change rate of the frequency offset, wherein the unit of the frequency offset is determined based on a radius of a beam and a center frequency provided by the satellite, and wherein the change rate of the frequency offset is a variation in the frequency offset to be applied at a specific time.

2. The method of claim 1, further comprising: transmitting, to the UE via the satellite, a signal obtained, by correcting a frequency, based on the frequency offset during a communication with the UE via the satellite.

3. The method of claim 1, wherein the first peak value is a value with a largest absolute value among the correlation values and the second peak value is a value with a second largest absolute value among the correlation values.

4. The method of claim 1, further comprising:

transmitting, via a medium access control control element (MAC CE) or a radio resource control (RRC) signaling, at least one of the frequency offset, the unit of the frequency offset, or the change rate of the frequency offset to the UE via the satellite.

5. The method of claim 1, further comprising:

transmitting, to the UE via the satellite, downlink control information (DCI) including at least one of the frequency offset, the unit of the frequency offset, or the change rate of the frequency offset.

6. The method of claim 1, further comprising:

transmitting, to the UE via the satellite, a random access response (RAR) message or a message B (msg B) including at least one of the frequency offset, the unit of the frequency offset, or the change rate of the frequency offset.

7. A method of a user equipment (UE) in a wireless communication system, the method comprising:

transmitting, to a network entity via a satellite, a physical random access channel, (PRACH) preamble; and receiving, from the network entity via the satellite, a frequency offset, a unit of the frequency offset, and a change rate of the frequency offset, wherein the frequency offset is estimated based on a first peak value, a second peak, and a length of the PRACH preamble, wherein the first peak value comprises a largest value among correlation values obtained based on a correlation operation for the PRACH preamble, and a second peak value comprises a second largest value among the correlation values obtained based on the correlation operation for the PRACH preamble, wherein the unit of the frequency offset is determined based on a radius of a beam and a center frequency provided by the satellite, and wherein the change rate of the frequency offset is a variation in the frequency offset to be applied at a specific time.

8. The method of claim 7, further comprising:

transmitting, to the network entity via the satellite, a signal obtained, by correcting a frequency, based on the frequency offset during a communication with the network entity via the satellite.

9. The method of claim 7, wherein the first peak value is a value with a largest absolute value among the correlation values and the second peak value is a value with a second largest absolute value among the correlation values.

10. The method of claim 7, wherein the frequency offset, the unit of the frequency offset, and the change rate of the frequency offset are received via a medium access control control element (MAC CE) or a radio resource control (RRC) signaling.

11. The method of claim 7, wherein the frequency offset, the unit of the frequency offset, and the change rate of the frequency offset are received via downlink control information (DCI).

12. The method of claim 7, wherein the frequency offset, the unit of the frequency offset, and the change rate of the frequency offset are received via a random access response (RAR) message or a message B (msg B).

13. A network entity in a wireless communication system, the network entity comprising:

a transceiver; and a controller operably coupled with the transceiver, the controller configured to:

receive, from a user equipment (UE) via a satellite, a physical random access channel (PRACH) preamble, obtain, based on a correlation operation, correlation values for the PRACH preamble and identify a first peak value that includes a largest value among the correlation values and a second peak value that includes a second largest value among the correlation values, estimate a frequency offset based the first peak value, the second peak value, and a length of the PRACH preamble, and transmit, to the UE via the satellite, the frequency offset, a unit of the frequency offset, and a change rate of the frequency offset, wherein the unit of the frequency offset is determined based on a radius of a beam and a center frequency provided by the satellite, and wherein the change rate of the frequency offset is a variation in the frequency offset to be applied at a specific time.

14. The network entity of claim 13, wherein the controller is further configured to transmit, to the UE via the satellite, a signal obtained, by correcting a frequency, based on the frequency offset during a communication with the UE via the satellite.

15. The network entity of claim 13, wherein the first peak value is a value with a largest absolute value among the correlation values and the second peak value is a value with a second largest absolute value among the correlation values.

16. The network entity of claim 13, wherein the controller is further configured to:

transmit, via medium access control control element (MAC CE) or radio resource control (RRC) signaling, at least one of the frequency offset, the unit of the frequency offset, or the change rate of the frequency offset to the UE via the satellite.

17. The network entity of claim 13, wherein the controller is further configured to:

transmit, to the UE via the satellite, downlink control information (DCI) including at least one of the frequency offset, the unit of the frequency offset, or the change rate of the frequency offset.

18. The network entity of claim 13, wherein the controller is further configured to:

transmit, to the UE via the satellite, a random access response (RAR) message or a message B (msg B) including at least one of the frequency offset, the unit of the frequency offset, or the change rate of the frequency offset.

19. A user equipment (UE) in a wireless communication system, the UE comprising:

a transceiver; and a controller operably coupled with the transceiver, the controller configured to:

transmit, to a network entity via a satellite, a physical random access channel (PRACH) preamble, and receive, from the network entity via the satellite, a frequency offset, a unit of the frequency offset, and a change rate of the frequency offset, wherein the frequency offset is estimated based on a first peak value, a second peak value, and a length of the PRACH preamble, wherein the first peak value comprises a largest value among correlation values obtained based on a correlation operation for the PRACH preamble, and the second peak value comprises a second largest value among the correlation values obtained based on the correlation operation for the PRACH preamble, wherein the unit of the frequency offset is determined based on a radius of a beam and a center frequency provided by the satellite, and wherein the change rate of the frequency offset is a variation in the frequency offset to be applied at a specific time.

20. The UE of claim 19, wherein the controller is further configured to:

transmit, to the network entity via the satellite, a signal obtained, by correcting a frequency, based on the frequency offset during a communication with the network entity via the satellite.

\* \* \* \* \*